United States Patent [19]
Tackbary et al.

[11] Patent Number: 5,960,412
[45] Date of Patent: *Sep. 28, 1999

[54] METHOD AND APPARATUS FOR COMMUNICATING WITH A CARD DISTRIBUTION CENTER FOR MANAGEMENT, SELECTION, AND DELIVERY OF SOCIAL EXPRESSION CARDS

[76] Inventors: Mary Thomasma Tackbary, 2880 Orange Brace, Riverwoods, Ill. 60015; Dan G. Friedrich, 5526 S. Cornell Ave., Apt. #2, Chicago, Ill. 60637

[*] Notice: This patent is subject to a terminal disclaimer.

[21] Appl. No.: 08/709,573

[22] Filed: Sep. 6, 1996

Related U.S. Application Data

[63] Continuation of application No. 08/239,251, May 6, 1994, Pat. No. 5,555,496.

[51] Int. Cl.⁶ .......................... G06F 17/60; G06F 17/00; G06F 7/00
[52] U.S. Cl. .................. 705/27; 705/26; 364/479.03; 364/479.05
[58] Field of Search .................. 705/1, 14, 26, 705/27; 235/383; 395/200.47, 200.49; 707/104; 364/468.24, 479.01, 479.03, 479.04, 479.05

[56] References Cited

U.S. PATENT DOCUMENTS

| | | | |
|---|---|---|---|
| 4,528,643 | 7/1985 | Freeny, Jr. | 380/4 |
| 4,616,327 | 10/1986 | Rosewarne et al. | 345/435 |
| 4,712,174 | 12/1987 | Minkler, II | 364/231 |
| 4,845,634 | 7/1989 | Vitek et al. | 364/468.03 |
| 4,951,203 | 8/1990 | Halamka | 707/500 |
| 4,965,727 | 10/1990 | Halamka | 707/500 |
| 4,992,940 | 2/1991 | Dworkin | 705/26 |
| 5,029,099 | 7/1991 | Goodman | 364/479.03 |
| 5,036,472 | 7/1991 | Buckley et al. | 364/479.03 |
| 5,056,029 | 10/1991 | Cannon | 364/479.03 |
| 5,235,519 | 8/1993 | Miura | 364/479.03 |
| 5,426,594 | 6/1995 | Wright et al. | 395/200.36 |
| 5,552,994 | 9/1996 | Cannon et al. | 364/468.01 |
| 5,555,496 | 9/1996 | Tackbary et al. | 705/27 |
| 5,600,563 | 2/1997 | Cannon et al. | 364/468.24 |

*Primary Examiner*—Stephen R. Tkacs
*Attorney, Agent, or Firm*—Welsh & Katz, Ltd.

[57] ABSTRACT

A system for communicating with a card distribution center for selecting, ordering, and sending social expression cards using a personal computer. The user can enter names and addresses of card recipients into the system wherein the information is maintained in a database. The system displays digitized images of the cards on a display screen which are retrieved from a card database. From the cards displayed, the user can select cards for designated recipients and enter personalized messages and a digitized signature. The user may then send the order to a card distribution center, which processes the order, retrieves and prints the selected card images, including any user messages or user signature, and mails the cards to designated recipients or customers. The system maintains a database of all recipients, addresses, associated occasions and dates, card preferences, relationships and order history.

85 Claims, 12 Drawing Sheets

ADDRESS BOOK 710

MENU BAR 440
TOOL BAR

715 JAN. 1 — (RECIPIENT)
FEB 14 — (RECIPIENT)
APRIL 12 — (RECIPIENT)
JAN. 9, 1971 — (RECIPIENT) 745, 750
MAR 17 — (RECIPIENT)
JUL 4 — (RECIPIENT)

720

755 — A, B, C, D ... Z

725 — NAME: (RECIPIENT)
ADDRESS 1:
ADDRESS 2:
CITY:
STATE: 730
ZIP:
PHONE: 735
RELATIONSHIP:
CARD PREFERENCE: 740

DATES:
| JAN 1 | NEW YEAR'S DAY |
| JAN 9, 1971 | BIRTHDAY |
| FEB 14 | VALENTINE'S DAY | 770
| MAR 17 | ST. PATRICK'S DAY |
| APR 12 | EASTER |
| JUL 4 | INDEPENDENCE DAY |
| JUL 15 | BASTILLE DAY |
| OCT 1 | HALLOWE'EN |

760 PREV    765 NEXT    775 RETURN TO MAIN VIEW

FIG. 8

CARD SELECTION 940

MENU BAR
TOOL BAR — 440

SORT BY:
- 950 — PRICE
- 955 — TEXT
- 960 — TONE

FIND KEYWORD: 1005

SHOW:
- 980 — ALL
- 965 — HUMOROUS
- 975 — RELIGIOUS
- 970 — SERIOUS

ADD RECIPIENT — 1010

Cards (945): 3×3 grid of (CARD) thumbnails

Tabs: BIRTHDAY 990 | CHRISTMAS 985 | GET WELL 995 | VALENTINE 1000

SELECTED (OCCASION) CARD FOR RECIPIENT — 1025

- HOLD — 1015
- CANCEL — 1030
- ORDER — 1080
- TRASH — 1020

FIG.9

EXPANDED CARD 1050

MENU BAR
TOOL BAR — 440

(FRONT OF CARD) 1055

(INSIDE OF CARD) 1060
1065 — (BUYER'S MESSAGE)
1070 — (BUYER'S SIGNATURE)

(OCCASION) CARD FOR (RECIPIENT)
1080 — ORDER
1030 — CANCEL
1075 — RETURN

METHOD AND APPARATUS FOR COMMUNICATING WITH A CARD DISTRIBUTION CENTER FOR MANAGEMENT, SELECTION, AND DELIVERY OF SOCIAL EXPRESSION CARDS

This application is a continuation of application Ser. No. 08/239,251 filed May 6, 1994 which application is now issued on Sep. 10, 1996, U.S. Pat. No. 5,555,496.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention relates generally to computerized data communications and more particularly to an apparatus for interactive communication and processing for selecting, ordering, and delivering social expression cards.

Social expression cards have traditionally been merchandised in card specialty shops, supermarkets, drugstores, department stores, and other retail or wholesale establishments. Card merchants display cards in specially designed shelves and group them according to occasion and/or recipient attributes such as age, sex, or family relationship. Typically, merchants rotate their card stock seasonally based on the availability of new cards.

Today, many people are extremely busy, and have less spare time than in the past. Individuals waste time and are inconvenienced when required to patronize a store to purchase the cards. Supplying the appropriate postage may require a special trip to the post office or other facility to purchase stamps. Additional time and effort is required to address, seal, and mail the cards. As a further inconvenience, card buyers must maintain the names, addresses, occasion, and important dates corresponding to persons to whom they send cards. Due to the above problems and difficulties, social expression cards are often sent in an untimely manner, or not at all. Yet, it is generally considered a socially important way to keep in touch. In fact, business organizations are increasingly finding that personal communication products such as cards improve client, employer, and/or prospect satisfaction.

Card merchants, particularly those having limited space for card displays, such as supermarkets, may not be able to display a sufficiently wide variety of cards. Cards which are stocked may become missorted on the rack or may be soiled or damaged by constant handling. Since card buyers cannot temporarily set aside cards in which they are interested, but for which they do not have an immediate use, they must purchase the card at that time.

A number of different methods for purchasing cards are available in addition to the traditional card shop. For example, individuals may purchase cards from automated kiosks which print cards. However, buying cards from such kiosks still requires that each card be selected on an individual basis for each recipient. The user cannot automatically maintain records of card recipients and card purchases. Another limitation of these kiosks is that the buyer can only view a limited selection of cards, depending on the season. Furthermore, the buyer is inconvenienced by travelling to the site of the kiosk and waiting for the cards to be printed. The purchaser is further inconvenienced by the necessity of addressing and posting the card by hand.

It is also known that card buyers can design their own cards on personal computers. However, many individuals do not wish to spend time designing cards. Moreover, the card quality is limited by user constraints such as the quality of the user's printer, quality of the available graphics and papers, and the design ability and creativity of the user.

Thus, social expression card buyers need a method of card purchasing which does not inconvenience them with its method of selecting and sending the cards. In addition, it would be advantageous to have a method that provides a wide selection of cards which also automatically maintains recipient and purchase information about the buyer's card purchases, card recipients and associated dates.

Many of the foregoing problems are solved by the present invention. The present method and apparatus for corresponding with a card distribution center for selecting, ordering, and sending social expression cards provides a convenient and efficient alternative to methods currently available.

Accordingly, it is an object of the present invention to permit the card buyer to select, address, and order social expression cards using a personal computer.

It is another object of the present invention to permit the card buyer to enter information into an integrated database program wherein the information may include recipient name, recipient address, occasion, and card delivery date.

It is yet another object of the present invention to present the card buyer with digitized images of a wide variety of cards which may be sorted according to occasion and content.

It is a further object of the present invention to permit the card buyer to include in a selected card a message of the buyer's choice, a digitized replica of the buyer's signature, and selected gifts or enclosures.

It is still another object of the present invention to permit the user, having selected a number of cards for a number of recipients, to send this order either via mail, telephone, or electronically, to a card repository and distribution center for processing.

It is yet another object of the present invention to permit the card repository and distribution center, upon receiving an order, to select designated cards from its stock or print the card from blank card stock, print the buyer's messages on the cards, and send the cards to the buyer or to the recipients.

The present invention uses a computer system for permitting buyers to communicate with a card distribution center for selecting, ordering, and sending social expression cards and for maintaining records of intended recipients, occasion dates and orders made. The user selects a recipient from a recipient database wherein at least a name and an address of the recipient is stored in the database. The user selects a card from a card database based upon the selected recipient name and based upon a card-giving occasion stored in a master occasion database. The selected recipient name and card-giving occasion appear on a video display device as textual and graphical images.

Each independent customer or buyer communicates from a remote site to the distribution center. The system includes a customer access terminal at each remote site having an input device for customer input of card recipient data, recipient occasion data, card design data, and card selection data. The system also includes a memory device for storage of data including the card recipient data, recipient occasion data, card design data, and card selection data. A video display device displays textual and graphical information representative of the card recipient data, recipient occasion data, card design data, and card selection data. A processor coupled to the video display device, the memory device, and the input device processes and controls the display of card recipient data, recipient occasion data, card design data, and card selection data to facilitate card selection and ordering for generating a card order responsive thereto and for generating and storing in memory, order history and order status. Additionally, a communication link couples the customer access terminal to the distribution center to permit the communication of the card order to the distribution center for processing of the card order.

A user occasion database is operatively linked to the master occasion database and is further operatively linked to the recipient database, card database, and an order history database. The user then orders the selected card from the card distribution center wherein the computer system is in operative communication with the distribution center. The card distribution center, upon receiving the order, pulls the selected cards or prints the cards from blank card stock, prints the user's message and signature on the cards, places the applicable enclosures into the cards, prints the address on the envelope, and sends the card to the designated recipients or the customer. The system can prompt the buyer to buy cards in time for given occasions and allows the user to automatically address cards. The database information may be manually entered by the user or imported into the program from another source.

BRIEF DESCRIPTION OF THE DRAWINGS

The features of the present invention which are believed to be novel are set forth with particularity in the appended claims. The invention, together with further objects and advantages thereof, may best be understood by reference to the following description when taken in conjunction with the accompanying drawings.

FIG. 4 is a representation of a video image of a specific embodiment of the default desktop configuration screen as shown on the video display device when the software program is initiated.

FIG. 8 is a representation of a video image of a specific embodiment of the card selection screen according to the present invention.

FIG. 9 is an expanded view of the card image shown in FIG. 8.

DETAILED DESCRIPTION

Figure 1:
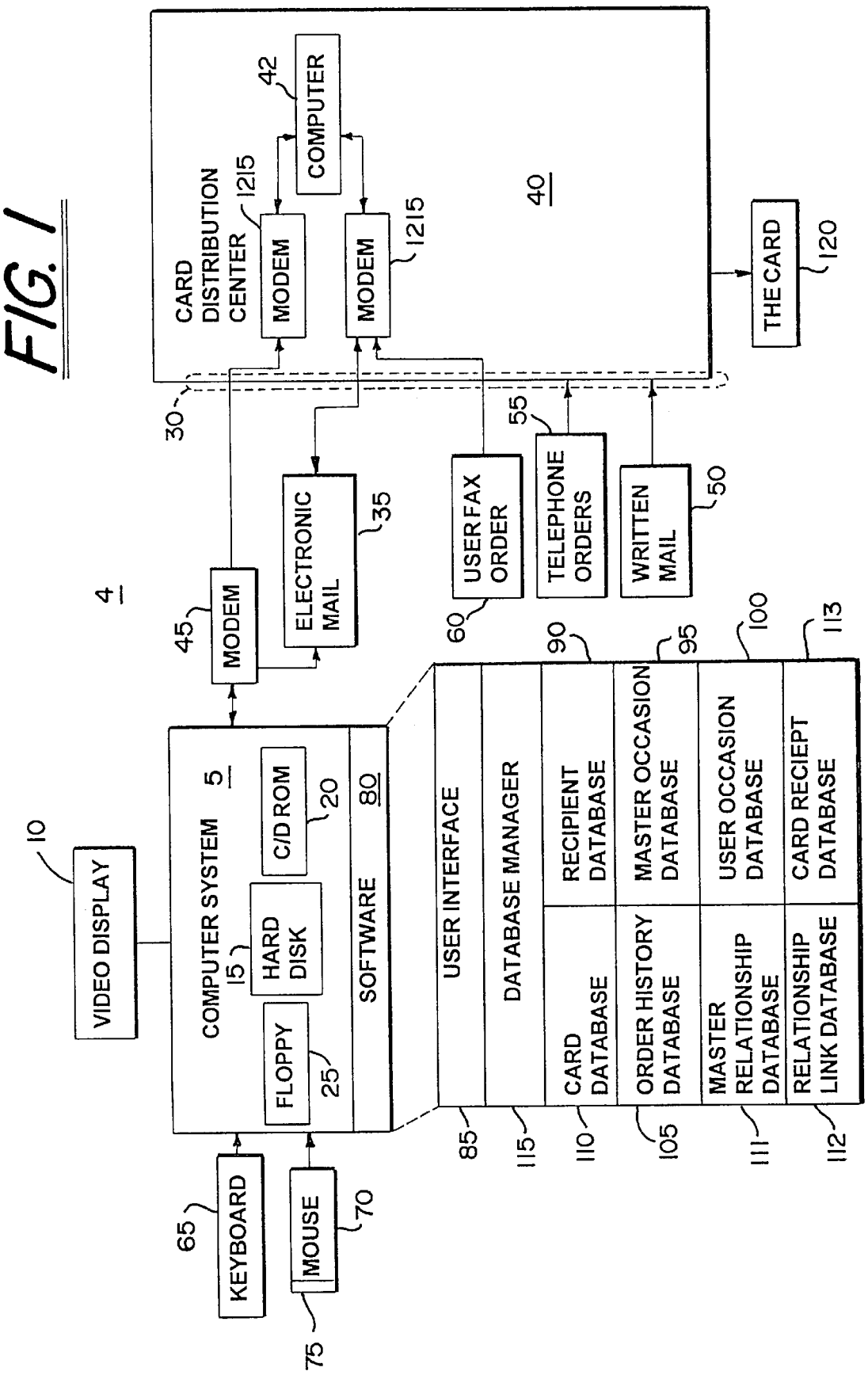
FIG. 1 is a generalized block diagram illustrating a specific embodiment of the hardware and software of a system according to the present invention.

Referring now to FIG. 1, there is illustrated a computerized order selection, processing and delivery system 4 according to the present invention. The present invention includes a computer system 5 and a video display device 10, such as a high-resolution color monitor manufactured by Wyse, Model 670, or an LCD display or other suitable image display device. The computer system 5 may be an IBM® or IBM® compatible computer, Apple Macintosh™ computer, or other suitable personal computer or computer system. The present invention is developed to run on most personal computer platforms using conventional operating systems such as Microsoft DOS® and compatible operating systems, Microsoft Windows®, Apple Macintosh®, UNIX, and IBM OS/2®. However, other future operating systems are contemplated.

The computer system 5 includes a hard disk drive 15 and preferably further includes a compact disk read-only-memory (CD-ROM) drive 20. A floppy disk drive 25 is also included. The hard disk drive 15 and CD-ROM drive 20 are preferably integral with and contained inside of the computer system 5. However, any suitable configuration of hard disk drive 15 and CD-ROM drive 20 or other mass storage devices may be used. The CD-ROM drive 20 may be a Sony, Model CDU-33A, and the hard disk drive may be a Western Digital, Model Caviar.

To permit a user to place a card order 30 via electronic means such as electronic mail 35 to a card distribution center 40, the computer system 5 includes a modem 45 (e.g. a 14,400 baud modem by Intel, Model FaxModem). However, other methods for corresponding with the card distribution center 40 are available such as written mail 50, telephone ordering 55, or fax ordering 60. The electronic order is coupled via the modem 45 and telephone lines to a computer 42 at the card distribution center 40.

In the illustrated embodiment of the system 4, the user may communicate to the computer system 5 through data entry devices such as a standard keyboard 65 and a pointing device such as a mouse 70. However, other data entry devices may be used such as speech recognition devices. The term "click-on" or "clicking", as will be used hereinafter, is well known to computer users familiar with mouse devices 70. These terms mean that a particular action is taken by the computer system 5 when the user depresses a button 75 on the mouse 70 while a symbol corresponding to the position of the mouse relative to a graphical image on the video display device 10 is shown.

The software 80 of the present invention is executed by the computer system 5 and includes a user interface 85 for interacting with the user through the keyboard 65 or the mouse 70. Included are five main databases: a recipient database 90, a master occasion database 95, a user occasion database 100, an order history database 105, and a card database 110. Also, included are three supplemental databases: a master relationship database 111, a relationship link database 112 and a card receipt database 113. The databases are managed by a database manager program 115 such as Q&E MultiLink/VB Version 2.0, published by Q&E Software, but any suitable database management program may be used.

Figure 2:
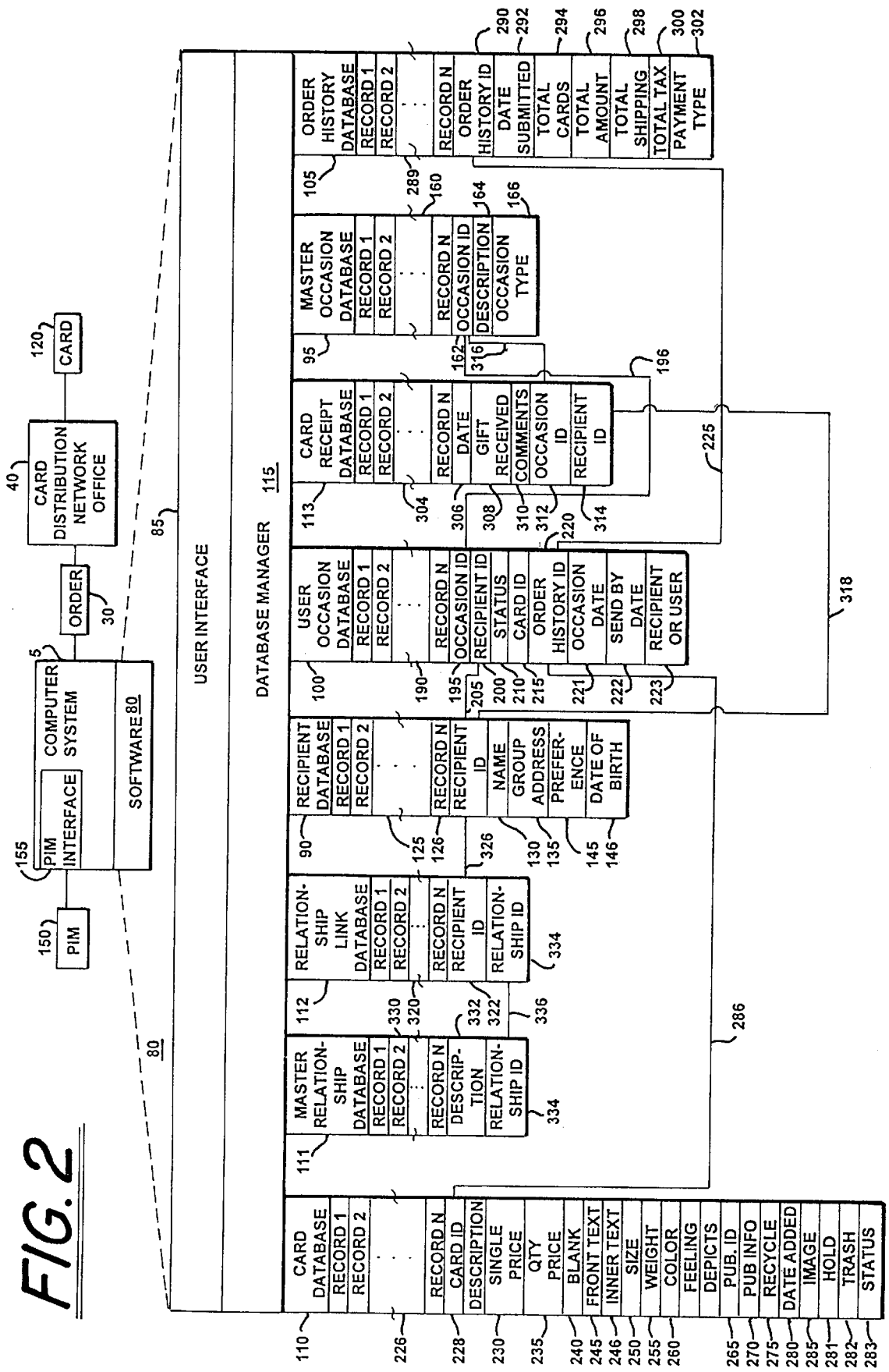
FIG. 2 is an enlarged view of the software block as shown in FIG. 1, illustrating a specific embodiment of a data structure of the databases according to the present invention.
Figure 3:
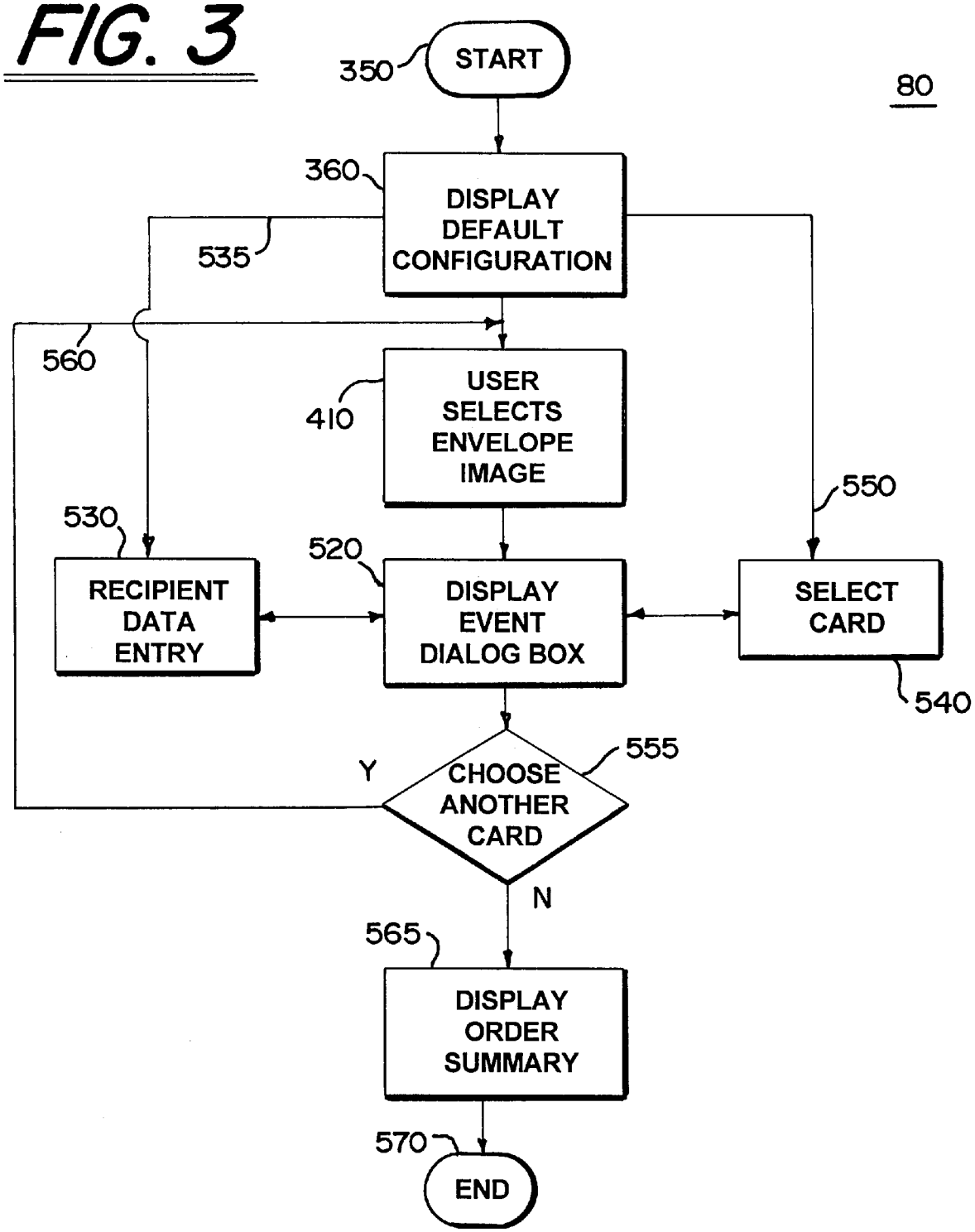
FIG. 3 is a diagram depicting a flow chart illustrating the logical flow of a specific embodiment of the software according to the present invention.

Referring now to FIG. 2, there is shown a diagrammatic illustration of a specific embodiment of the software structure for the system 4. The user interface 85 allows the user to enter information into the recipient database 90 and the card receipt database 113, select cards for various recipients from the card database 110, and place card orders 30 with the card distribution center 40. The recipient database 90 is maintained by the user on the computer system 5 and is stored, in the illustrated embodiment, on the hard disk drive 15 (FIG. 1). The user enters information into the recipient database 90 concerning persons to whom the user desires cards to be sent. The recipient database 90 includes multiple records 125 where each record corresponds to one particular recipient.

The information in each record 125 includes a recipient identification field 126, a name field 130, a group of address fields 135, a card preference field 145, and a date of birth field 146. Alternatively, a separate database may exist which includes the date of birth field 146 and other origin dates linked to the master occasion database 95 and the recipient database 90. The user may either manually enter the information into the database, or may import the information into the recipient database 90 from a database or a personal information manager (PIM) 150 coupled through a PIM interface 155 of the computer system 5. However, any suitable information device, such as a personal digital assistant or an electronic list device may be used. The PIM interface 155 is configurable to accept a variety of database formats from widely used software products such as those marketed by Lotus Development Corp., WordPerfect Corp., Microsoft Corp., and Borland International.

The master occasion database 95 includes multiple records 160 of information wherein each record includes information concerning particular generic occasions such as a holiday, birthdays, an undated anniversary, a get-well occasion, a graduation occasion, and many others as designated by a master occasion identification field 162, an occasion description field 164, and an occasion type field 166. The master occasion database 95 serves as a general library from which an occasion may be imported into the user occasion database 100.

The user occasion database 100 contains multiple records 190 where each record corresponds to one occasion for one recipient. Each record contains an occasion identification field 195 that is linked to the occasion identification field 162 in the master occasion database. The link is visually shown as 196. Also included is a recipient identification field 200 linking that record to the recipient identification field 126 in the recipient database 90. The link is visually shown as 205. Each record also includes a status field 210, a card identification field 215, an order history identification field 220, an occasion date 221, a send by date 222, and a recipient or customer field 223 indicating whether the card is to be sent to the recipient or to the customer. The order history identification field 220 links that record to a particular order history record in the order history database 105. The link is visually shown as 225.

The card database 110 contains multiple records 226 containing information about each card 120 where each card is identified by a card identification field 228. The following information is included in the card database 110: description 230; single quantity price 231; volume quantity price 235; whether the card is blank or contains text 240; front text 245; inner text 246; size 250; weight 255; color 260; feelings 261; depicts 262; publisher ID 265; whether the card is still published 270; whether the card is made of recycled paper 275; the date that the card was added 280 to the card database; a hold field 281; a trash field 282; and a status field 283. The card database 110 also contains a compressed digitized image 285 of the card 120 (or a file name containing the compressed image). Additionally, a link is provided which links the card identification field 228 in the card database 110 with the card identification field 215 in the user occasion database 100. The link is visually shown as 286. The information pertaining to each card 120 is a single record and many hundreds or even thousands of such records may be included in the card database 110.

The order history database 105 includes records that summarize every card order 30 the user has placed. The order history database 105 includes multiple records 289 of information including fields such as: an order history identification field 290; a date submitted field 292; total number of cards 294; total amount 296; total shipping cost 298; total tax 300; and payment type 302.

The card receipt database 113 contains multiple records 304 where each record pertains to a particular card received. The card receipt database 113 includes a date field 306, a gift received field 308, a comment field 310, an occasion identification field 312, and a recipient identification field 314. The occasion identification field 312 in the card receipt database 113 is linked to the occasion identification field 162 in the master occasion database 95. The link is visually shown by 316. Additionally, the recipient identification field 314 in the card receipt database 113 is linked to the recipient identification field 126 in the recipient database 90. The link is visually shown in 318.

The relationship link database 112 includes multiple records 320 pertaining to various relationships between the recipients and the customer. The relationship link database 112 allows the customer to designate multiple relationships with recipients to allow for an added search criterion (i.e. card for mother or other relative) as well as the ability to group multiple cards sent through the lists screen (described later). The relationship link database 112 contains a recipient identification field 322 and a relationship identification field 324. The recipient identification field 322 in the relationship link database 112 is linked to the recipient identification field 126 in the recipient database 90. The link is visually shown in 326.

The master relationship database 111 includes multiple records 330, both predefined and user defined, pertaining to the relationships between the customer and various recipients. The database includes a description field 332 and a relationship identification field 334 which is linked to the relationship identification field 324 in the relationship link database 112. This link is visually shown as 336.

Referring back to FIG. 1, the card database 110 preferably resides on the CD-ROM drive 20 but may reside on the floppy disk 25 or on the hard disk drive 15 of the computer system 5, or some combination thereof. Storage on the CD-ROM 20 allows for maximum storage capacity of card database 110 information, and is the most efficient and convenient method. Alternatively, the card database 110 may be remotely located from the computer system 5. If remotely located, the card database 110 may be accessed via an external source such as an on-line service as will be discussed in greater detail hereinafter. When the card database 110 is not accessed remotely, updated copies from a master card database maintained at the card distribution center 40 can be transferred into the card database 110 media (computer disk, floppy disk).

If the card database 110 is integral with the computer system 5, and not remote, the user may update the copy of the card database 110 depending upon the manner in which the card database is accessed. If it is accessed on the hard disk drive 15 or the floppy disk drive 25, it may be updated from new floppy disks using the floppy disk drive 25, or new information may be downloaded through the modem 45. If the card database 110 is accessed on the CD-ROM drive 20, the user may periodically receive updated copies of the CD-ROM or supplementary card data 110 for the hard drive 15. Alternatively, a writable CD system, such as a WORM drive, can be used allowing downloading of card data to the CD.

Figure 4:
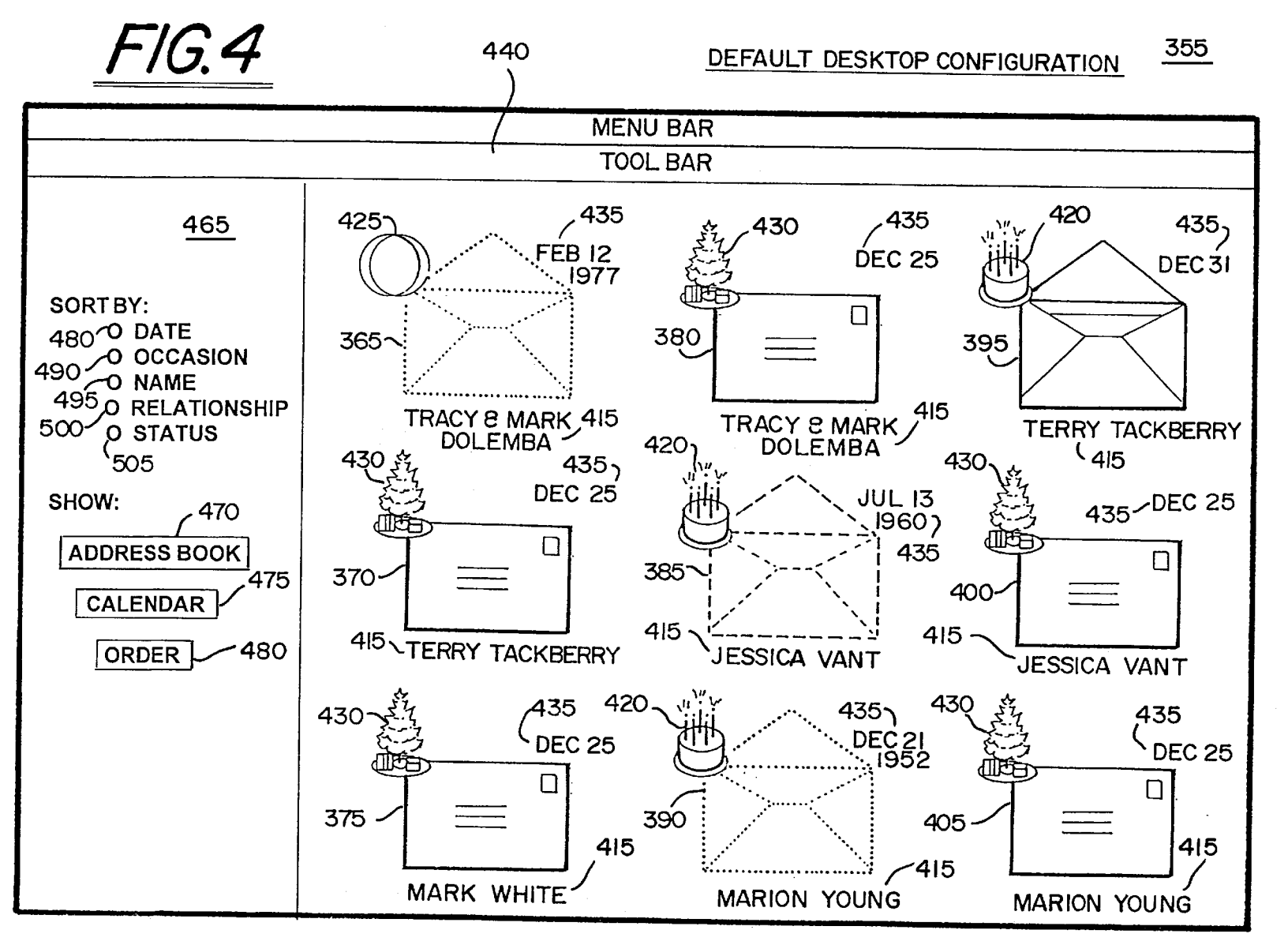

Referring now to FIGS. 3–6A, the software 80 begins as shown in step 350 and a default desktop configuration view 355 is displayed as shown in step 360. The default desktop configuration view 355 depicts an array of images resembling envelopes 365–405. The image is shown in FIG. 4 in a Microsoft Windows® format, but any suitable operating environment may be used.

Next, the user may select a particular envelope, as shown in step 410, by clicking an envelope image 365–405 shown in the default desktop configuration view 355. Each envelope image 365–405 corresponds to one or more recipients as defined by a recipient name 415 appearing in text under the envelope.

Each envelope image 365–405 represents a specific card-giving occasion for which the recipient 415 may receive a card. A symbol, known as an icon, appears next to the envelope image 365–405 and may represent for example, a birthday cake 420, if the occasion is a birthday, an anniversary symbol, if the occasion is an anniversary, or a Christmas tree 430, if the occasion is Christmas. The date of the occasion 435 is also shown.

Additionally, the image of the envelopes 365–405 conveys information regarding the urgency of the occasions. The image of the envelope informs the user how urgently he must attend to the order, based upon the date when the occasion associated with the envelope image will occur. If the occasion will not occur for a relatively long period of time, the image of the envelope appears as a faint outline of an envelope, as shown by envelope image 385. If the occasion will occur fairly soon, the image appears partially grey as shown by envelope image 365. If the occasion will occur very soon and requires immediate attention, the image appears as a normal envelope as illustrated by envelope images 370, 375, 380, 395, 400 and 405. Finally, if the occasion is past due and the user has not placed the order, the card is tinted red as shown by envelope image 390. The periods of time referenced above are automatically provided by the software 80 as reasonable default values, but may be changed by the user either globally or on an occasion-by-occasion basis.

The image of the envelope also conveys the status of the order. If the envelope appears open and empty (e.g. image 365), then the user has not yet chosen a card for the event. If the envelope appears open and contains a card inside (e.g., image 395), the user has tentatively chosen a card for the event but has yet to finalize the order. If the envelope appears as a normal sealed envelope as illustrated by envelope image 370, then the user has chosen a card for the event, selected a method of delivery for the card, and has finalized the order.

The user also can view at the top of the default desktop configuration view 355 a toolbar 440 containing buttons (not shown) which allow the user one-click access to frequently used windows which are opened and closed in response to the user. Other frequently used windows include a card sort window 465, an address book window 470 for entering recipient data, a calendar window 475, and an order summary window 480. The address book window 470 and calendar window 475 permit the user to alter the appearance of the default desktop configuration screen 355 by displaying view screens that filter and group the envelope images. Additionally, the user may sort the array of envelope images 365–405 by date 485, occasion 490, name 495, relationship 500, or status 505, directly from the current screen.

Once the user selects an envelope for an event shown in the default desktop configuration view 355, as shown in step 410, a card event dialog box 515 appears as shown in step 520. The card event dialog box 515 provides the user with information about the selected card-giving occasion through additional boxes and text including the name 60 and address 605 of the selected recipient, the status of the selected event 640, and selected occasion 670, as shown.

From within the card event dialog box 515, the user may update the card recipient data on card recipient screen 525 for one recipient or for all recipients, as shown in step 530 by clicking the address book button 645. Additionally, the card recipient data entry screen 525 can be accessed directly from the default desktop configuration screen 355 without the intermediate step of displaying the card event dialog box 515, as shown by branch 535 by clicking the address book button 470.

Also, from within the card event dialog box 515, the user can select a card for one occasion as shown in step 540, by clicking the select card button 545 within the card event dialog box. As shown in branch 550, the user can select the card directly from the default desktop configuration screen 355 without the intermediate step of displaying the card event dialog box 515 by clicking an occasion envelope, such as 365, and then clicking the toolbar 440.

Once the card and recipient information is entered, the user can choose another card as shown in step 555. If the user chooses to select another card, the program branches back to step 410, shown as branch 560, where the card event dialog box 515 is again displayed. While the user views the card event dialog box 515, he can complete the information for that occasion. When the user has completed the dialog box to his satisfaction, he can click a check box labeled "this card ready to order" 549. The user indicates that he is done with the card event dialog box 515 by clicking on an Ok button 650 or a cancel button 655. When the user clicks on the Ok button 650, the program saves the changes the user has made in the event dialog, closes the dialog, and returns the user to the desktop view that the user was in before the user invoked the event dialog (updating the desktop view to show the changed status of the current occasion). When the user clicks on the cancel button 655, if the user made any changes, the program asks the user to confirm that he wants to discard these changes. If the user answers yes (or if the user has made no changes), the program closes the dialog and takes the user back to his previous desktop view (with no status update).

From any desktop view, the user can switch to another desktop view. For example, in response to clicking the address book box 470 while viewing the default desktop configuration screen 355, the address book view as shown in FIG. 6A is displayed.

Finally, from any desktop view, the user can decide when to switch to the order view (described later) to place an order for all of the occasions with the order ready status (indicated by the check box labeled, "this card ready to order"). This is shown as step 565. After the user has completed the order summary view screen and exits the program, the program ends as shown in step 570 of the flow chart.

However, this is not a linear process. For example, although step 555 indicates whether the user chooses another card, no prompt appears asking the user whether he wishes to choose another card. Instead, when the user is done with the present card he may simply choose another, or he may click the order view button 480. Again, multiple options are available to the user by clicking a particular button. Rigid flow-chart paths as shown in FIG. 4 need not be followed precisely as is shown in the figure.

From the address book view 710, the user can enter information about the recipient. Here, the user may enter new information about the chosen recipient 725, and may update or delete existing information. Once in the address book view 710, the user may click the return button 775 to return the user to the default desktop configuration view 355. To enter information about other recipients, the user again may click the address book button 470.

A mail mode box 615 displayed within the card event dialog box 515 allows the user to choose the method by which the card is to be sent, such as by Federal Express® 620, United Parcel Service 625, United States Mail 630, or Overnight delivery 635. If the user has chosen a service which may not deliver the card in time for the chosen occasion, the program suggests that the user consider a speedier method of delivery.

The status 640 of the selected event for which the recipient is to receive a card is also displayed within the card event dialog box 515. The status line 640 provides general information concerning the urgency of the occasion and the state of the envelope (open, closed etc.). The card event dialog box 515 shows the select card button 545, an address book button 645, the check box labeled "this card ready to order" 549, an Ok button 650, and a cancel button 655. The user activates the select card button 545, as previously shown in step 540 to chose a particular card for the occasion.

Once the user has selected a card for an occasion after clicking the select card button 545 and has completed the associated card selection screen, an image of the front 660 and the inside 665 of the selected card appears in a selected card box 672 within the card event dialog box 515. The selected card box 672 may optionally display the price 675 of the card. At this time, the user may choose to update or add a personalized message 680 to the card, based on a font of their choice. The user may also choose to add a digitized image of a signature 685 or may choose to have items inserted into or included along with the selected card 670. In the illustrated embodiment, by clicking the appropriate selection in the insert box 690 the user may insert a check 695, a charitable donation 700, confetti 705, or gifts selected from a gift catalog into the selected card 670.

Figure 5:
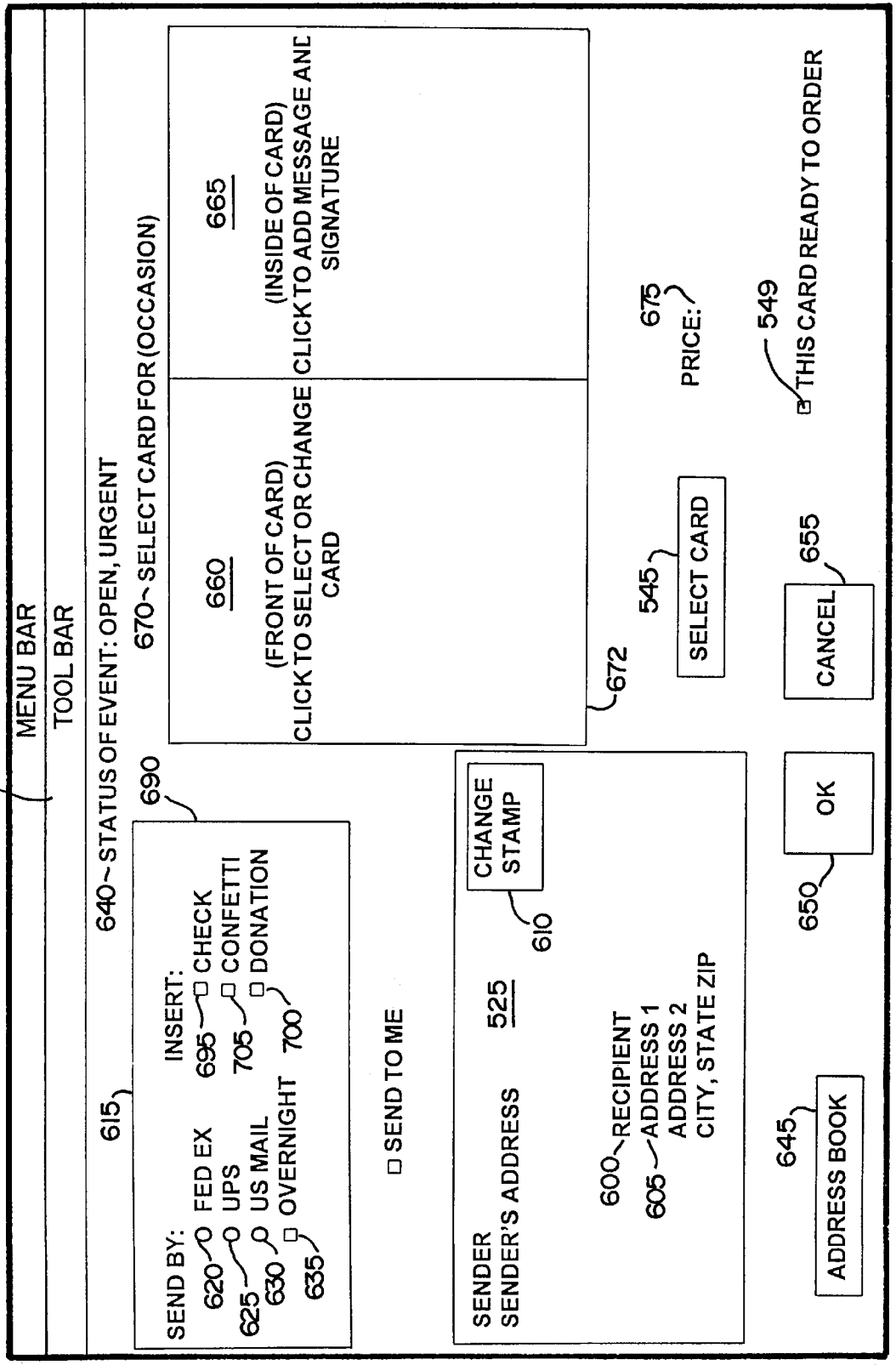
FIG. 5 is a representation of a video image of a specific embodiment of the card event dialog box according to the present invention.
Figure 6:
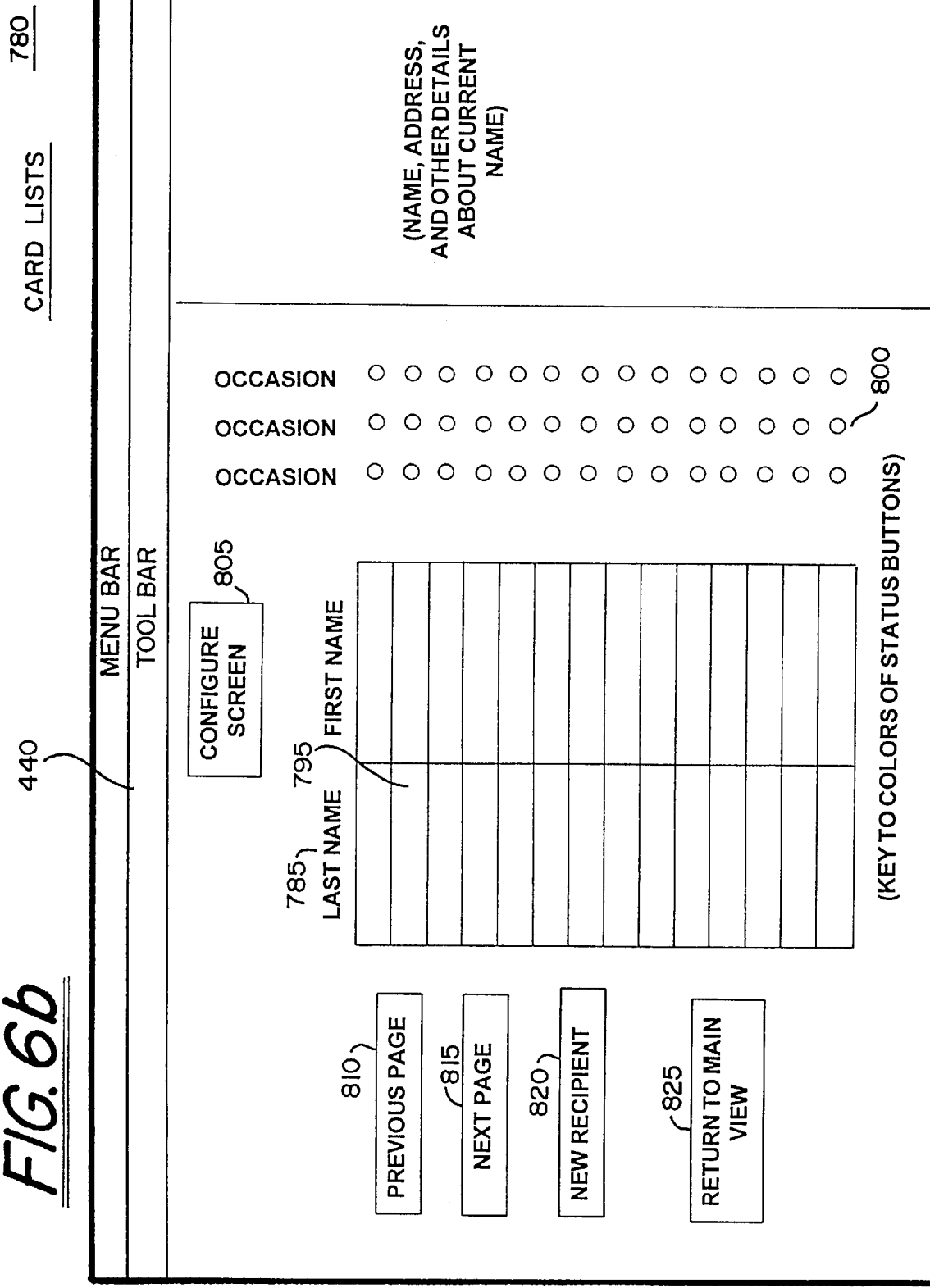
FIG. 6A is a representation of a video image of a specific embodiment of the address book view screen according to the present invention.
FIG. 6B is a representation of a video image of a specific embodiment of the card lists screen according to the present invention.

Referring now to FIGS. 4, 5 and 6A, in response to clicking the address book box shown in either FIG. 4 (470) or FIG. 5 (645), an address book view screen 710 is displayed as shown in FIG. 6A. The screen is split between a desktop configuration view 715 (similar to the default desktop configuration view 355 shown in FIG. 4) and an address book view 720 into which the user enters information regarding recipients such as name 725, address 730, relationship to the user 735, and card type preference 740. Here, the user can view all of the occasions for a selected named recipient 725, as shown by the displayed occasion icons 745 and an occasion list 770. The user also views the status of the order, as indicated by the appearance of the envelope images 750 for that recipient (open, closed, or empty etc.). The user may also view occasions for other recipients by navigating the address book view 720 using alphabetical tabs 755 and using previous 760 and next 765 buttons. For the recipient 725 shown, all occasion dates are listed in the occasion list 770. The user returns to the default desktop configuration 355 of FIG. 4 by clicking the return to main view button 775.

Referring to FIG. 6B, rather than selecting individual cards for individual events, the user may compile lists of people who should receive cards on given occasions, such as a Christmas mailing list. The user clicks the lists button (not shown) on the toolbar 440 within the default desktop configuration screen 355 and a card lists screen 780 is displayed. In this screen the user may edit a recipient list 785 by first clicking the configure screen button 805 to display the selected mailing list. The configure screen button 805 allows the user to customize the cards list 780 so that only certain information is displayed. For example, the user can customize the screen 780 to display summary information about a number of occasions for the listed recipients; to display more detail about one occasion, including whether the recipients have sent cards to the user in the past; to display or turn off display of the address and other details for the currently selected name, and the like. Users can also configure the screen to filter the displayed recipients so that, for example, only business prospects of the user are displayed, or only relatives are displayed. The customization options are saved from session to session.

The user may then selectively add and remove named recipients from mailing list 785. To add a new name to the list 795 the user clicks the new recipient button 820 and enters the new name by typing their name onto a blank line which then allows the user to add that individual to the list.

Figure 7:
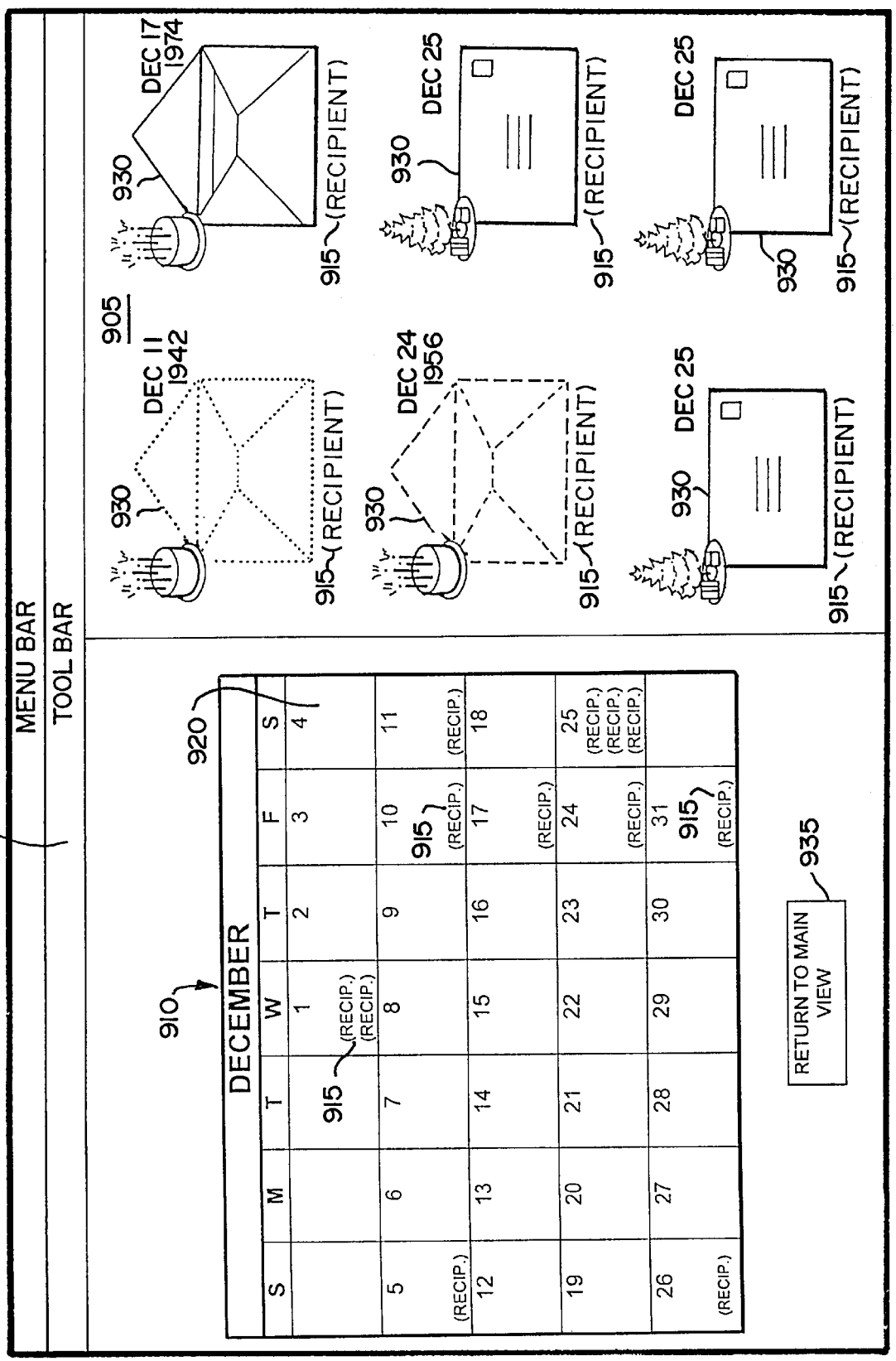
FIG. 7 is a representation of a video image of a specific embodiment of the calendar view screen according to the present invention.
Figure 10:
FIG. 10 is a representation of a video image of a specific embodiment of the order view screen according to the present invention.

Referring now to FIG. 7, in response to clicking the calendar button 475 shown in FIG. 4, a calendar view screen 900 is displayed. The calendar view screen 900 is split between a desktop configuration view 905 (similar to the default desktop configuration view 355 shown in FIG. 4) and a calendar 910 showing all days for a given period of time, such as for one month. The calendar 910 displays events for all recipients within that period of time shown. A recipient name 915 (or multiple names) is shown within a calendar date box 920. Again, the appearance of the envelope images 930 in the desktop configuration view 900 indicates the status of the respective orders for each named recipient 915. The user returns to the default desktop configuration 355 (FIG. 4) by clicking a return to main view button 935.

Referring now to FIGS. 2, 5, and 8, in response to clicking the select card button 545 shown in FIG. 5, a card selection screen 940 is displayed. Within this screen the user chooses a card for the selected occasion. The card selection screen 940 presents an array of digitized images of social expression cards 945 which are retrieved from the card database 110 containing information about hundreds or even thousands of card images. To allow the user to efficiently select the right card, the card images 945 must be sorted.

Initial sorting and filtering is performed automatically. Sorting allows the user to group data according to certain criteria such as by alphabetical order, date of birth etc. Filtering removes data from the presentation so that it is not shown to the user. When the user accesses the card selection screen 940 from within the card event dialog box 515 of FIG. 5, the cards are filtered to show only those cards relevant to the card-giving occasion. The cards may also be filtered based on the year of the selected occasion. For example, if the user is selecting a card for a recipient's 40th birthday, then the card selection screen may automatically filter and present only cards for 40th birthdays, if this option had been previously enabled. Automatic filtering may also include filtering cards depending upon the type of card the recipient is known to prefer. For example, only humorous or serious cards are displayed if specified in the card preference field 145 of the recipient database 90 record corresponding to that recipient. Thus, the user may click the check boxes that filter the card images by criteria such as humor 965, seriousness 970, or religious denomination 975.

The user may also sort the card images manually by clicking the sort by price 950, sort by text 955, or sort by tone 960 button in the card selection screen 940.

The user may also choose to access the entire card database by clicking an all button 980 and then use the images resembling notebook tabs 985–1000 shown at the button of the card selection screen 940. By clicking the notebook tabs 985–1000, the user can view the card database sorted by broad categories such as Christmas 985, birthday 990, get well 955, Valentine's Day 1000, and so forth. The user may also find cards in the card database 110 by querying it for key words and phrases by entering text into a find key word box 1005.

While in the card selection screen 940, the user may select a card for a recipient not found in the recipient database. To add a recipient not found in the recipient database 90, the user selects a card image 945 and then clicks the add recipient button 1010, which causes the address book screen 710 (FIG. 6A) to be displayed.

The user may set aside cards of interest, but which he has not yet selected, by dragging the card image 945 from the card image array to a hold box 1015 portion of the card selection screen 940. Selected card images 945 remain "held" from session to session. Card images are removed by dragging them to a trash can icon 1020. The user may also hold cards by selecting "hold" from a context sensitive menu (not shown) which may be displayed by activating a designated key on the keyboard or by pressing the right mouse button.

The user can select a card by dragging it from the card image array 945 or from the held set, to a selected card box 1025. The user may also select by using the right mouse button to display a context-sensitive menu (not shown) and choosing the select card button. Selecting a card image 945 closes the card selection screen 940 and returns the user to the card event dialog box 515 of FIG. 5. If the user does not wish to make a card selection at this time, a cancel button 1030 is clicked.

Referring now to FIGS. 8 and 9, for many card images 945 to fit on the screen, the images are reduced and are relatively small, low detail images. However, if the user double-clicks one of the card images 945, the image expands as shown in FIG. 9 showing a close-up expanded card screen 1050. This allows the user to see the card image in greater detail. The front 1055 and inside 1060 of the card are displayed. The user may customize the card by adding a personal message 1065 or a digitized signature image 1070 to the card image. The user clicks a return button 1075 to return to the card selection screen 940.

Referring now to FIGS. 4, 8–10, the order summary view screen 1090 is displayed when the order button 480 is clicked while in the default desktop configuration screen 355. The order summary view screen 1090 is split between a card occasion desktop configuration screen 1100 (similar to the default desktop configuration view 355 shown in FIG. 4.) and an order window 1105 showing details about the user's order. An itemized cost of the order 1110 is displayed along with the means of payment 1115. The order desktop configuration view 1100 shows only those cards 1120 which are ready to be ordered. After the user confirms that the order is complete by clicking the send button 1095, the envelope images of the cards appear as sealed and addressed envelopes. At this point, the user may send the completed order to the distribution center 40 or the order may be processed using a suitable printer located at the user's site (discussed below). Clicking a return to main view button 1125 causes the default desktop configuration view 355 of FIG. 4 to be displayed.

Figure 11:
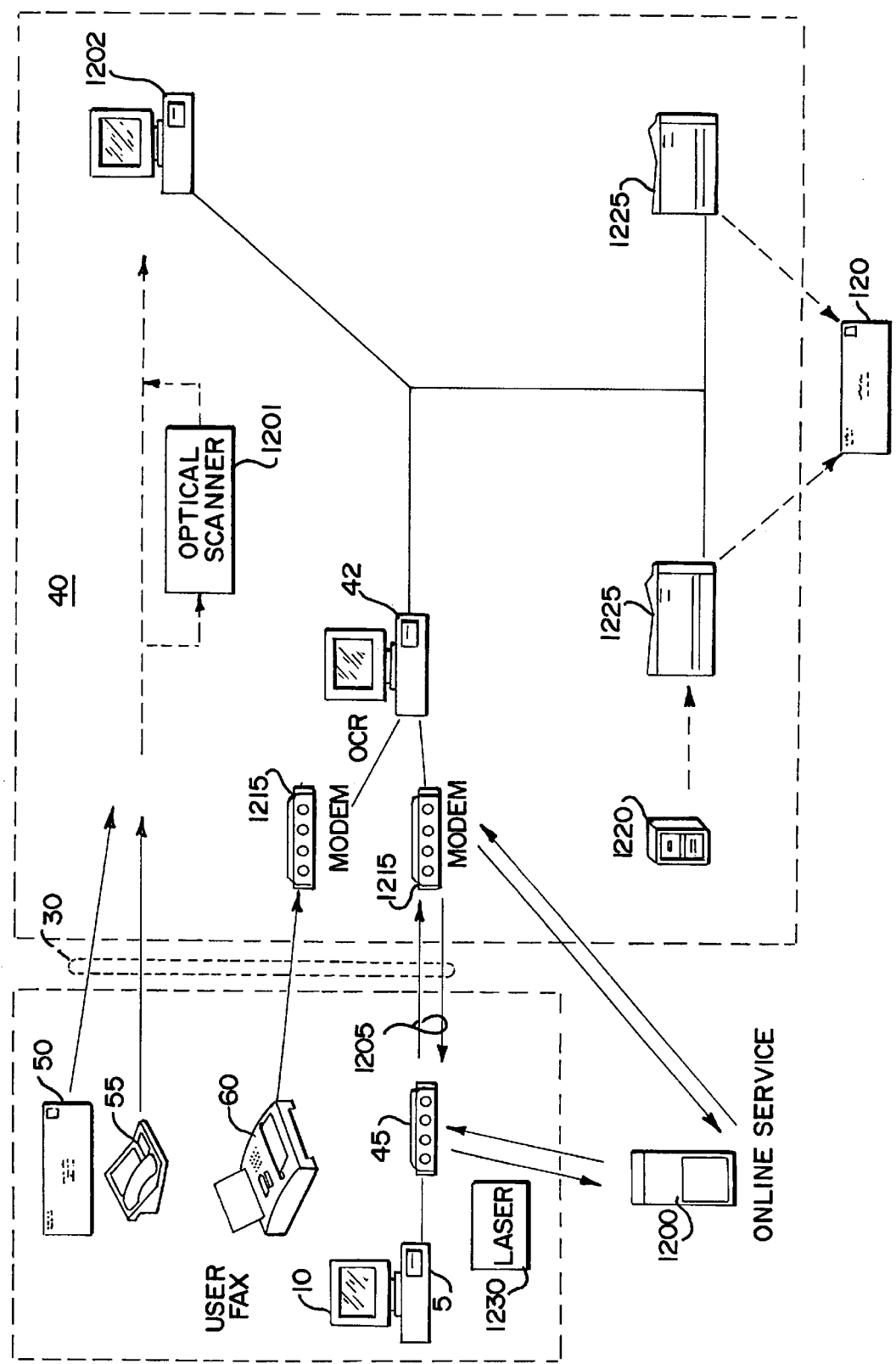
FIG. 11 is a generalized pictorial diagram depicting a specific embodiment of the hardware and the connections between the hardware and the card distribution center according to the present invention.

Referring now to FIGS. 1 and 11, FIG. 11 shows an expanded pictorial diagram of FIG. 1 without the software block. Like reference numbers are used to identify the same items shown in the figures. Several modes of transmission of the order 30 from the computer system 5 to the card distribution center 40 are available to the user depending upon the hardware present and the manner in which the system was originally configured. These modes include written mail 50, telephone orders 55, facsimile orders 60, on-line service orders 1200 and direct dial-up 1205 to the distribution center 40.

If the order 30 is sent via written mail 50 or facsimile 60, the computer system 5 prepares and prints the user's order on a form (not shown). This form is optimized for optical character recognition, and need only be optically scanned by an optical scanner 1201 at the card distribution center 40 and automatically processed. The optical scanner may be an HP Scanjet IIC marketed by Hewlett-Packard Corporation.

If the user transmits the order 30 by telephone 55, the computer system 5 displays all relevant information on the video display device 10 so that the user can read the order directly from the screen to personnel using a computer 1202 at the card distribution center 40 or the user can enter all relevant information using a touchtone keypad of the telephone 55. If the user sends the order 30 electronically, either by direct modem link 1205 or through the on-line service 1200, the computer system 5 generates a computer file containing the order and transmits this file to the computer 42 at the card distribution center 40. Transmission occurs between the computer system modem 45 and one or more modems 1215 at the card distribution center 40.

In an alternate embodiment, the computer system 5 is connected to the on-line service 1200 through the modem 45. This allows the user to communicate the order 30 to the card distribution center 40 without establishing a dedicated communication line between the user and the card distribution center 40.

Additionally, connection via the on-line service 1200 allows the user to select cards from an external card database. The on-line service 1200 has access to more cards than are available to the user of a fixed medium such as the cards residing on the hard disk 15.

In another alternate embodiment, the user may access a remote computing center via interactive television and may enter all information through a television control device. Once the information has been entered, the cards can be ordered from the card distribution center 40.

In another alternate embodiment, the user not only sends the order 30 electronically to the card distribution center 40, but also may send the card order to a co-user via electronic mail 35. The co-user may then add his own personalized message or signature to the card. Once the co-user has added the message or signature, he may send the order to the distribution center 40 or he may send the order back to the original user. In either event, the order is sent to the distribution center 40.

In operation, the method according to the present invention proceeds as follows: The user enters all necessary information into the computer system 5 described above and places the order 30 with the card distribution center 40. Once the card distribution center 40 receives the order 30, it retrieves the selected cards from a stock of inventory cards 1220. The personalized message or signature is then printed on the card by laser printer 1225 or other suitable printer. Alternatively, the laser printer 1225 may print the graphical card design on blank paper stock. In this way, the distribution center 40 need not stack each of the various cards but rather, can print each card from blank card stock on a high quality color printer. The cards 120 are then shipped to the recipients or to the customer via the user's carrier of choice at the appropriate time.

In another alternate embodiment, the user may print cards without use of the card distribution center 40. In this situation, the user enters all necessary information into the system 4 as described above, and directly prints the card on an attached printer 1230. Of course, the quality of the user printed cards depends upon the quality of the user's printer 1230 and the paper quality. The printer may be a color printer such as a Model BJC-600 marketed by Canon Corporation.

As best shown in Appendix A, a source code listing for the above-described software may be viewed which, for example, may be run on an IBM 486 compatible computer, running at 66 MHz under Microsoft Windows® Version 3.1. The software may be developed, for example, using Microsoft Visual Basic 3.0 Professional Edition using the custom control libraries, Q&E Multilink/VB Version 2.0 by Q&E Corporation, 3-D Gizmos 2.10, published by MicroHelp, Inc., ImageMan/VB 3.00, published by Data Techniques, Inc., VB Tools 3.1, published by MicroHelp, Inc., and VideoSoft Custom Control Library, published by VideoSoft.

Specific embodiments of the method and apparatus for selecting and ordering social expression cards according to the invention have been described for the purpose of illustrating the manner in which the invention may be made and used. It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

Table of Contents

Project Name: INTOUCH.DOC

05/03/94

CARDMAIN.FRM ............................................................................................................................ 4
    Sub CardQuery_eRecLeave (RowIndex As Integer, AbortFunction As Integer) ......10
    Sub Command3D1_Click () ....................................................................10
    Sub FileName_Change () .....................................................................10
    Sub Form_Load () ............................................................................10
    Sub Form_Unload (Cancel As Integer) ........................................................11
    Sub Lookup_Click () .........................................................................11
    Sub Return_Click () .........................................................................11
    Sub Scan1_Scan (Event As Integer, Status As Integer, Filename As String) .....11
    Sub ScanCard_Click () .......................................................................11

CARDS.FRM ............................................................................................................................... 11
    Sub BlankInsideMessage_Click (Value As Integer) ...........................26
    Sub CardQuery_eFetch (RowIndex As Integer) ...............................26
    Sub Command3D1_Click () ....................................................................26
    Sub Command3D2_DragDrop (Source As Control, X As Single, Y As Single) ........26
    Sub CurrTab_Change () ......................................................................26
    Sub DB_Text1_Change (Index As Integer) .....................................27
    Sub DBCurrTab_Change () ....................................................................27
    Sub DVCurrTab_Change () ....................................................................27
    Sub Form_Load () ............................................................................27
    Sub Form_Unload (Cancel As Integer) ........................................................27
    Sub Humorous_Click (Value As Integer) .....................................27
    Sub ImageMan1_Click (Index As Integer) .....................................27
    Sub ImageMan1_DblClick (Index As Integer) ..................................27
    Sub ImageMan1_MouseDown (Index As Integer, Button As Integer, Shift As Integer, X As Single, Y As Single) ........................................................27
    Sub KeywordSearch_KeyPress (KeyAscii As Integer) ...........................28
    Sub KeywordSearch_LostFocus () ..............................................28
    Sub Panel3D1_Click () .......................................................................28
    Sub Panel3D7_Click () .......................................................................28
    Sub RecalcCardQuery () .....................................................................28
    Sub RecycledPaperOnly_Click (Value As Integer) ............................28
    Sub Religious_Click (Value As Integer) .....................................28
    Sub SelectedImage_Click (Index As Integer) .................................28
    Sub SelectedImage_DragDrop (Index As Integer, Source As Control, X As Single, Y As Single) ................................................................29
    Sub SelectedImage_Select (Index As Integer, X1 As Single, Y1 As Single, X2 As Single, Y2 As Single) ..........................................................29
    Sub Serious_Click (Value As Integer) .......................................29
    Sub Text1_Click () ..........................................................................29
    Sub VSIndexTab1_Click () ...................................................................29
    Sub VSIndexTab1_Scroll () ..................................................................29

CHOICES.FRM ........................................................................................................................... 29
    Sub Form_Load () ............................................................................36
    Sub Image1_Click () ........................................................................36
    Sub Image2_Click () ........................................................................36
    Sub Image3_Click () ........................................................................36
    Sub Image4_Click () ........................................................................36
    Sub Image5_Click () ........................................................................36
    Sub Image6_Click () ........................................................................36
    Sub Image8_Click () ........................................................................37
    Sub MhInvisible1_Click (Index As Integer) ..................................37
    Sub Panel3D1_Click () .......................................................................37
    Sub Panel3D2_Click () .......................................................................37
    Sub Panel3D3_Click () .......................................................................37
    Sub Panel3D4_Click () .......................................................................37

```
Sub Panel3D4_DragDrop (Source As Control, X As Single, Y As Single) ..........37
Sub Panel3D6_Click () .......................................................37
Sub Panel3D7_Click () .......................................................37
```
DATES.FRM ..............................................................................37
```
Sub CalculateStartIndex () ..................................................48
Sub Calendar_Click () .......................................................49
Sub Calendar_MonthChange () .................................................49
Sub CardList_DblClick () ....................................................49
Sub Command3D1_Click () .....................................................49
Sub Form_Load () ............................................................49
Sub ListCards () ............................................................50
Sub Mh3dCalendar1_Click () ..................................................51
Sub Return_Click () .........................................................51
Sub SelectCards_Click () ....................................................51
```
MAINMENU.FRM .........................................................................51
```
Sub Command3D1_Click () .....................................................56
Sub Command3D10_Click () ....................................................56
Sub Command3D2_Click () .....................................................56
Sub Command3D3_Click () .....................................................56
Sub Command3D4_Click () .....................................................56
Sub Command3D5_Click () .....................................................56
Sub Command3D6_Click () .....................................................56
Sub Command3D7_Click () .....................................................56
Sub Command3D8_Click () .....................................................56
Sub Command3D9_Click () .....................................................56
Sub Exit_Click () ...........................................................56
Sub FileExit_Click () .......................................................56
Sub FileOpen_Click () .......................................................57
Sub FilePrint_Click () ......................................................57
Sub FileSave_Click () .......................................................57
Sub Form_Load () ............................................................57
Sub Help_Click () ...........................................................57
Sub HelpUsing_Click () ......................................................57
Sub MDIForm_Load () .........................................................57
Sub OptionsCardMaintenance_Click () .........................................57
Sub Panel3D1_Click () .......................................................57
Sub Panel3D2_Click () .......................................................57
Sub Panel3D3_Click () .......................................................57
Sub Panel3D4_Click () .......................................................57
Sub Panel3D6_Click () .......................................................57
Sub Panel3D7_Click () .......................................................57
Sub WindowCards_Click () ....................................................58
Sub WindowDates_Click () ....................................................58
Sub WindowInvoice_Click () ..................................................58
Sub WindowLists_Click () ....................................................58
Sub WindowNames_Click () ....................................................58
Sub WindowOrder_Click () ....................................................58
Sub WindowReviewOrder_Click () ..............................................58
Sub WindowReviewSendList_Click () ...........................................58
Sub WindowSend_Click () .....................................................58
```
NAMES.FRM ..............................................................................58
```
Sub Command1_Click (Index As Integer) .......................................77
Sub Command2_Click (Index As Integer) .......................................77
Sub DBCurrTab_Change () .....................................................77
Sub Form_Load () ............................................................77
Sub Form_Unload (Cancel As Integer) .........................................78
Sub LastName_Change (Index As Integer) ......................................78
Sub Return_Click () .........................................................78
Sub Status_Click (Index As Integer) .........................................78
Sub UpdateStatus () .........................................................78
Sub VSIndexTab1_Click () ....................................................78
Sub VSIndexTab2_Click () ....................................................78
```

ORDER.FRM ............................................................................................................................... 79
   Sub Command3D1_Click () ..................................................... 84
   Sub Command3D2_Click () ..................................................... 84
   Sub Command3D5_Click () ..................................................... 84
   Sub Font_Click () ........................................................... 84
   Sub Form_Load () ............................................................ 84
   Sub Image1_DragDrop (Source As Control, X As Single, Y As Single) ........... 85
   Sub ShipVia_Click (Index As Integer, Value As Integer) ...................... 85
   Sub Stamp_Click () .......................................................... 85
ORDERSUM.FRM ......................................................................................................................... 85
   Sub Command3D1_Click () ..................................................... 99
   Sub Return_Click () ......................................................... 100
   Sub SendOrder_Click () ...................................................... 100
SENDLIST.FRM ......................................................................................................................... 100
   Sub Command1_Click () ....................................................... 131
   Sub CurrNameQuery_eRecLeave (RowIndex As Integer, AbortFunction As Integer) .132
   Sub DBAnniversaryStatus_Change (Index As Integer) ........................... 132
   Sub DBBirthdayStatus_Change (Index As Integer) .............................. 132
   Sub FirstName_GotFocus (Index As Integer) ................................... 132
   Sub Form_Load () ............................................................ 132
   Sub Form_Unload (Cancel As Integer) ......................................... 132
   Sub LastName_Change (Index As Integer) ...................................... 132
   Sub Lastname_GotFocus (Index As Integer) .................................... 133
   Sub NameQuery_eFetch (RowIndex As Integer) .................................. 133
   Sub NameQuery_eRecLeave (RowIndex As Integer, AbortFunction As Integer) ..... 133
   Sub RefreshCurrNameQuery (Index As Integer) ................................. 133
   Sub Return_Click () ......................................................... 133
   Sub ShowAnniversaryStatus () ................................................ 133
   Sub ShowBirthdayStatus () ................................................... 133
ZOOMIMAG.FRM ......................................................................................................................... 134
   Sub Check3D3_Click (Value As Integer) ....................................... 138
   Sub ChooseInsert_Click () ................................................... 138
   Sub Command3D1_Click () ..................................................... 138
   Sub Command3D2_Click () ..................................................... 139
   Sub Font_Click () ........................................................... 139
   Sub Form_Load () ............................................................ 139
   Sub InsertDone_Click () ..................................................... 139
   Sub Next_Click () ........................................................... 139
   Sub Prev_Click () ........................................................... 139
   Sub Preview_Click () ........................................................ 139
   Sub Return_Click () ......................................................... 140
   Sub SelectCards_Click () .................................................... 140
   Sub Send_Click () ........................................................... 140
   Sub YourMessage_Change (Index As Integer) ................................... 140
GLOBAL.BAS ............................................................................................................................ 140
   Sub AssignZoomImage () ...................................................... 140
Summary ............................................................................................................................... 140

4

CARDMAIN.FRM

```
VERSION 2.00
Begin Form CardMaintenance
    BackColor       =   &H00E0FFFF&
    Caption         =   "Card Maintenance"
    ClientHeight    =   7170
    ClientLeft      =   30
    ClientTop       =   1845
    ClientWidth     =   9495
    Height          =   7575
    Left            =   -30
    LinkTopic       =   "Form2"
    ScaleHeight     =   7170
    ScaleWidth      =   9495
    Top             =   1500
    Width           =   9615
    Begin DB_TextClass DB_Text1
        BorderStyle     =   1  'Fixed Single
        Height          =   1215
        Left            =   1320
        MultiLine       =   -1  'True
        pChanged        =   0   'False
        pFormatString   =   ""
        pQBECase        =   0   'Case Sensitive
        pQBEValue       =   ""
        pQueryExpr      =   "FRONTMESSA"
        pQueryName      =   "CardQuery"
        pRecState       =   0
        ScrollBars      =   2   'Vertical
        TabIndex        =   23
        Text            =   ""
        Top             =   1440
        Width           =   4095
    End
    Begin DB_CheckClass DB_Check5
        BackColor       =   &H00FFFFFF&
        Caption         =   "Blank inside message"
        Height          =   255
        Left            =   7320
        pChanged        =   0   'False
        pCheckValues    =   "1"
        pFormatString   =   ""
        pQBECase        =   0   'Case Sensitive
        pQBEValue       =   ""
        pQueryExpr      =   "BLANKINSID"
        pQueryName      =   "CardQuery"
        pRecState       =   0
        pUnCheckValue   =   "0"
        TabIndex        =   22
        Top             =   4440
        Value           =   0   'Unchecked
        Width           =   2175
    End
    Begin DB_CheckClass DB_Check4
        BackColor       =   &H00FFFFFF&
        Caption         =   "Traditional"
        Height          =   252
        Left            =   7320
        pChanged        =   0   'False
        pCheckValues    =   "1"
        pFormatString   =   ""
        pQBECase        =   0   'Case Sensitive
```

```
        pQBEValue       =   ""
        pQueryExpr      =   "SERIOUS"
        pQueryName      =   "CardQuery"
        pRecState       =   0
        pUnCheckValue   =   "0"
        TabIndex        =   21
        Top             =   3480
        Value           =   0   'Unchecked
        Width           =   1212
    End
    Begin ImageMan ImageMan2
        AutoDraw        =   -1  'True
        BackColor       =   &H00FFFFFF&
        Ext             =   ""
        Height          =   4215
        Left            =   1320
        Picture         =   ""
        ScaleHeight     =   0
        ScaleLeft       =   0
        ScaleMode       =   0   'User
        ScaleTop        =   0
        ScaleWidth      =   0
        Scrollbars      =   0   'False
        Select          =   0   'False
        TabIndex        =   20
        Top             =   2760
        Width           =   3975
    End
    Begin SSCommand Command3D1
        Caption         =   "&Save card"
        Height          =   375
        Left            =   5520
        TabIndex        =   19
        Top             =   4800
        Visible         =   0   'False
        Width           =   1455
    End
    Begin SSCommand ScanCard
        Caption         =   "&Scan card"
        Height          =   375
        Left            =   5160
        TabIndex        =   18
        Top             =   120
        Visible         =   0   'False
        Width           =   1455
    End
    Begin IMScan Scan1
        AppName         =   ""
        Destination     =   ""
        Device          =   ""
        Filename        =   ""
        Left            =   4080
        Top             =   240
    End
    Begin ImageMan ImageMan1
        AutoDraw        =   -1  'True
        BackColor       =   &H00FFFFFF&
        Ext             =   ""
        Height          =   1815
        Left            =   5520
        Picture         =   ""
        ScaleHeight     =   0
        ScaleLeft       =   0
        ScaleMode       =   0   'User
```

INTOUCH.DOC printed 5/3/94

```
            ScaleTop         =    0
            ScaleWidth       =    0
            Scrollbars       =    0    'False
            Select           =    0    'False
            TabIndex         =    17
            Top              =    2760
            Width            =    1695
         End
         Begin DB_CheckClass DB_Check3
            BackColor        =    &H00FFFFFF&
            Caption          =    "Recycled paper"
            Height           =    252
            Left             =    7320
            pChanged         =    0    'False
            pCheckValues     =    "1"
            pFormatString    =    ""
            pQBECase         =    0    'Case Sensitive
            pQBEValue        =    ""
            pQueryExpr       =    "RECYCLED"
            pQueryName       =    "CardQuery"
            pRecState        =    0
            pUnCheckValue    =    "0"
            TabIndex         =    16
            Top              =    4200
            Value            =    0    'Unchecked
            Width            =    1692
         End
         Begin DB_CheckClass DB_Check2
            BackColor        =    &H00FFFFFF&
            Caption          =    "Religious"
            Height           =    252
            Left             =    7320
            pChanged         =    0    'False
            pCheckValues     =    "1"
            pFormatString    =    ""
            pQBECase         =    0    'Case Sensitive
            pQBEValue        =    ""
            pQueryExpr       =    "RELIGIOUS"
            pQueryName       =    "CardQuery"
            pRecState        =    0
            pUnCheckValue    =    "0"
            TabIndex         =    15
            Top              =    3720
            Value            =    0    'Unchecked
            Width            =    1212
         End
         Begin DB_CheckClass DB_Check1
            BackColor        =    &H00FFFFFF&
            Caption          =    "Humorous"
            Height           =    252
            Left             =    7320
            pChanged         =    0    'False
            pCheckValues     =    "1"
            pFormatString    =    ""
            pQBECase         =    0    'Case Sensitive
            pQBEValue        =    ""
            pQueryExpr       =    "HUMOROUS"
            pQueryName       =    "CardQuery"
            pRecState        =    0
            pUnCheckValue    =    "0"
            TabIndex         =    14
            Top              =    3240
            Value            =    0    'Unchecked
            Width            =    1212
```

INTOUCH.DOC printed 5/3/94

```
            End
            Begin DB_ComboClass Occasion
                Height          =   300
                Left            =   7320
                pChanged        =   0   'False
                pFormatString   =   ""
                pListQExpr      =   ""
                pListQName      =   ""
                pQBECase        =   0   'Case Sensitive
                pQBEValue       =   ""
                pQueryExpr      =   "OCCASION"
                pQueryName      =   "CardQuery"
                pRecState       =   0
                Sorted          =   0   'False
                Style           =   0   'Dropdown Combo
                TabIndex        =   13
                Top             =   2760
                Width           =   1935
            End
            Begin DB_TextClass Message
                BorderStyle     =   1   'Fixed Single
                Height          =   1212
                Left            =   5520
                MultiLine       =   -1  'True
                pChanged        =   0   'False
                pFormatString   =   ""
                pQBECase        =   0   'Case Sensitive
                pQBEValue       =   ""
                pQueryExpr      =   "MESSAGE"
                pQueryName      =   "CardQuery"
                pRecState       =   0
                ScrollBars      =   2   'Vertical
                TabIndex        =   11
                Text            =   ""
                Top             =   1440
                Width           =   3732
            End
            Begin SSCommand Return
                Caption         =   "&Return"
                Height          =   855
                Left            =   240
                Picture         =   CARDMAIN.FRX:0000
                TabIndex        =   10
                Top             =   6120
                Width           =   855
            End
            Begin SSCommand Lookup
                Caption         =   "&Lookup file"
                Height          =   372
                Left            =   6720
                TabIndex        =   9
                Top             =   120
                Width           =   1452
            End
            Begin CommonDialog CMDialog1
                DialogTitle     =   "Select a picture file"
                Filter          =   "Pictures|*.bmp;*.wmf"
                Left            =   8400
                Top             =   240
            End
            Begin DB_TextClass FileName
                BorderStyle     =   1   'Fixed Single
                Height          =   372
                Left            =   5160
```

8

```
        MultiLine      =   0    'False
        pChanged       =   0    'False
        pFormatString  =   ""
        pQBECase       =   0    'Case Sensitive
        pQBEValue      =   ""
        pQueryExpr     =   "FILENAME"
        pQueryName     =   "CardQuery"
        pRecState      =   0
        ScrollBars     =   0    'None
        TabIndex       =   8
        Text           =   ""
        Top            =   840
        Width          =   3732
     End
     Begin DB_CommandClass New
        Caption        =   "Ne&w"
        Height         =   372
        Left           =   240
        pBefore        =   -1   'True
        pConnectName   =   ""
        pFunction      =   6    ' 6 - New
        pQueryName     =   "CardQuery"
        pRecNumber     =   1
        pRowIndex      =   0
        pSQL           =   ""
        TabIndex       =   6
        Top            =   2640
        Width          =   852
     End
     Begin DB_CommandClass Next
        Caption        =   "&Next"
        Height         =   372
        Left           =   240
        pBefore        =   -1   'True
        pConnectName   =   ""
        pFunction      =   3    ' 3 - Next
        pQueryName     =   "CardQuery"
        pRecNumber     =   1
        pRowIndex      =   0
        pSQL           =   ""
        TabIndex       =   5
        Top            =   840
        Width          =   852
     End
     Begin DB_CommandClass Prev
        Caption        =   "&Prev"
        Height         =   372
        Left           =   240
        pBefore        =   -1   'True
        pConnectName   =   ""
        pFunction      =   4    ' 4 - Previous
        pQueryName     =   "CardQuery"
        pRecNumber     =   1
        pRowIndex      =   0
        pSQL           =   ""
        TabIndex       =   4
        Top            =   480
        Width          =   852
     End
     Begin DB_TextClass Description
        BorderStyle    =   1    'Fixed Single
        Height         =   372
        Left           =   1320
        MultiLine      =   0    'False
```

INTOUCH.DOC printed 5/3/94

```
            pChanged        =   0    'False
            pFormatString   =   ""
            pQBECase        =   0    'Case Sensitive
            pQBEValue       =   ""
            pQueryExpr      =   "DESCRPTION"
            pQueryName      =   "CardQuery"
            pRecState       =   0
            ScrollBars      =   0    'None
            TabIndex        =   2
            Text            =   ""
            Top             =   840
            Width           =   3732
        End
        Begin DB_TextClass ID
            BorderStyle     =   1    'Fixed Single
            Height          =   372
            Left            =   1320
            MultiLine       =   0    'False
            pChanged        =   0    'False
            pFormatString   =   ""
            pQBECase        =   0    'Case Sensitive
            pQBEValue       =   ""
            pQueryExpr      =   "ID"
            pQueryName      =   "CardQuery"
            pRecState       =   0
            ScrollBars      =   0    'None
            TabIndex        =   0
            Text            =   ""
            Top             =   240
            Width           =   852
        End
        Begin QueryClass CardQuery
            Height          =   492
            Left            =   5520
            pConnectName    =   "Connect1"
            pDistinct       =   0    'False
            pErrorOption    =   0    'Display All Errors
            pHDBC           =   0
            pHSTMT          =   0
            pRandEnabled    =   0    'False
            pRecCount       =   1539251486
            pRecNumber      =   -1
            pRowIndex       =   0
            pTables         =   "CARD.DBF"
            pTranPending    =   0    'False
            pVersion        =   2
            pWhere          =   " ORDER BY ID"
            Top             =   6120
            Width           =   1452
        End
        Begin ConnectClass Connect1
            Height          =   612
            Left            =   5520
            pAutoLogon      =   -1   'True
            pErrorOption    =   0    'Display All Errors
            pLogonInfo      =   ""
            pLogonOption    =   0    'Display logon dialog box on error
            pSource         =   "dBASEFile"
            Top             =   5520
            Width           =   1452
        End
        Begin Label Label2
            BackStyle       =   0    'Transparent
            Caption         =   "Front Message"
```

INTOUCH.DOC printed 5/3/94

```
        Height          =   255
        Left            =   1320
        TabIndex        =   24
        Top             =   1200
        Width           =   1455
     End
     Begin Label Label1
        BackStyle       =   0  'Transparent
        Caption         =   "Inside Message"
        Height          =   255
        Left            =   5520
        TabIndex        =   12
        Top             =   1200
        Width           =   1455
     End
     Begin Label FileNameLabel
        BackStyle       =   0  'Transparent
        Caption         =   "File Name"
        Height          =   255
        Left            =   5160
        TabIndex        =   7
        Top             =   600
        Width           =   1335
     End
     Begin Label DescriptionLabel
        BackStyle       =   0  'Transparent
        Caption         =   "Description"
        Height          =   255
        Left            =   1320
        TabIndex        =   3
        Top             =   600
        Width           =   1335
     End
     Begin Label IDLabel
        BackStyle       =   0  'Transparent
        Caption         =   "ID"
        Height          =   255
        Left            =   1320
        TabIndex        =   1
        Top             =   0
        Width           =   855
     End
End
Sub CardQuery_eRecLeave (RowIndex As Integer, AbortFunction As Integer)
  'Force the current record to be updated automatically
  res% = fUpdate(CardQuery, 0)
End Sub Sub Command3D1_Click ()
  ImageMan1.SaveOptions = "Compress = ON"
  ImageMan1.SaveAs = "Dan.tif"
End Sub Sub FileName_Change ()
  'Show the thumbnail and zoomed versions of the images
  ImageMan1.Picture = Filename.Text
  ImageMan2.Picture = Filename.Text
End Sub Sub Form_Load ()
  Occasion.AddItem "Anniversary"
  Occasion.AddItem "Birthday"
  Occasion.AddItem "Christmas"
  Occasion.AddItem "Get Well Soon"

INTOUCH.DOC printed 5/3/94
```

```
  Occasion.AddItem "Wedding"
  'Query card database using Q&E
  res% = fDoQuery(CardQuery)
End Sub Sub Form_Unload (Cancel As Integer)
  'Close Q&E card query
  res% = fEndQuery(CardQuery)
End Sub Sub Lookup_Click ()
  'Open the open file common dialog box
  CMDialog1.Filename = Filename.Text
  CMDialog1.Action = 1
  Filename.Text = CMDialog1.Filename
End Sub Sub Return_Click ()
  CardMaintenance.Hide
End Sub Sub Scan1_Scan (Event As Integer, Status As Integer, Filename As String)
  If Event = 1 Then
    MsgBox "Scan complete"
  Else
    MsgBox "User closed dialog"
  End If
  If Status = 0 Then
    MsgBox "OK"
  Else
    MsgBox "Error " + Str$(Status)
  End If
End Sub Sub ScanCard_Click ()
  'Set scan destination to ImageMan control
  Scan1.Destination = "ImageMan1"
  'Set to RGB color (24 bits per pixel)
'  Scan1.PixelType = 1
  'Set to 200 DPI
'  Scan1.Resolution = 100
  'Start the scan without a dialog box
  Scan1.ScanCommand = 1
End Sub
```

CARDS.FRM

```
VERSION 2.00
Begin Form Cards
    BackColor       =   &H00E0FFFF&
    Caption         =   "Cards"
    ClientHeight    =   5265
    ClientLeft      =   75
    ClientTop       =   1860
    ClientWidth     =   9465
    Height          =   5670
    Left            =   15
    LinkTopic       =   "Form4"
    MDIChild        =   -1  'True
    ScaleHeight     =   5265
    ScaleWidth      =   9465
    Top             =   1515
    Width           =   9585
```

INTOUCH.DOC printed 5/3/94

```
Begin TextBox KeywordSearch
    Height          =   285
    Left            =   0
    TabIndex        =   42
    Top             =   360
    Width           =   1335
End
Begin CommandButton Command1
    Caption         =   "&More Cards"
    Height          =   735
    Left            =   120
    TabIndex        =   40
    Top             =   4200
    Width           =   1215
End
Begin DB_TextClass DBMessage
    Alignment       =   0       'Left Justify
    BorderStyle     =   1       'Fixed Single
    Height          =   255
    HideSelection   =   0       'False
    Index           =   5
    Left            =   0
    MaxLength       =   0
    MultiLine       =   0       'False
    PasswordChar    =   ""
    pAutoTab        =   0       'False
    pChanged        =   0       'False
    pFindValue      =   ""
    pFormatString   =   ""
    pIncLiterals    =   0       'False
    pMask           =   ""
    pMaskDefines    =   ""
    pQBECase        =   0       'Case Sensitive
    pQBEValue       =   ""
    pQueryExpr      =   "MESSAGE"
    pQueryName      =   "CardQuery"
    pRecState       =   0
    ReadOnly        =   0       'False
    ScrollBars      =   0       'None
    TabIndex        =   39
    Text            =   "DBMessage"
    Top             =   3840
    Visible         =   0       'False
    Width           =   1215
End
Begin DB_TextClass DBMessage
    Alignment       =   0       'Left Justify
    BorderStyle     =   1       'Fixed Single
    Height          =   255
    HideSelection   =   0       'False
    Index           =   4
    Left            =   -120
    MaxLength       =   0
    MultiLine       =   0       'False
    PasswordChar    =   ""
    pAutoTab        =   0       'False
    pChanged        =   0       'False
    pFindValue      =   ""
    pFormatString   =   ""
    pIncLiterals    =   0       'False
    pMask           =   ""
    pMaskDefines    =   ""
    pQBECase        =   0       'Case Sensitive
    pQBEValue       =   ""
```

INTOUCH.DOC printed 5/3/94

13

```
        pQueryExpr      =   "MESSAGE"
        pQueryName      =   "CardQuery"
        pRecState       =   0
        ReadOnly        =   0   'False
        ScrollBars      =   0   'None
        TabIndex        =   38
        Text            =   "DBMessage"
        Top             =   2160
        Visible         =   0   'False
        Width           =   1215
    End
    Begin DB_TextClass DBMessage
        Alignment       =   0   'Left Justify
        BorderStyle     =   1   'Fixed Single
        Height          =   255
        HideSelection   =   0   'False
        Index           =   3
        Left            =   -120
        MaxLength       =   0
        MultiLine       =   0   'False
        PasswordChar    =   ""
        pAutoTab        =   0   'False
        pChanged        =   0   'False
        pFindValue      =   ""
        pFormatString   =   ""
        pIncLiterals    =   0   'False
        pMask           =   ""
        pMaskDefines    =   ""
        pQBECase        =   0   'Case Sensitive
        pQBEValue       =   ""
        pQueryExpr      =   "MESSAGE"
        pQueryName      =   "CardQuery"
        pRecState       =   0
        ReadOnly        =   0   'False
        ScrollBars      =   0   'None
        TabIndex        =   37
        Text            =   "DBMessage"
        Top             =   1920
        Visible         =   0   'False
        Width           =   1215
    End
    Begin DB_TextClass DBMessage
        Alignment       =   0   'Left Justify
        BorderStyle     =   1   'Fixed Single
        Height          =   255
        HideSelection   =   0   'False
        Index           =   2
        Left            =   -120
        MaxLength       =   0
        MultiLine       =   0   'False
        PasswordChar    =   ""
        pAutoTab        =   0   'False
        pChanged        =   0   'False
        pFindValue      =   ""
        pFormatString   =   ""
        pIncLiterals    =   0   'False
        pMask           =   ""
        pMaskDefines    =   ""
        pQBECase        =   0   'Case Sensitive
        pQBEValue       =   ""
        pQueryExpr      =   "MESSAGE"
        pQueryName      =   "CardQuery"
        pRecState       =   0
        ReadOnly        =   0   'False
```

INTOUCH.DOC printed 5/3/94

```
                                               14

ScrollBars      =   0   'None
            TabIndex        =   36
            Text            =   "DBMessage"
            Top             =   1680
            Visible         =   0   'False
            Width           =   1215
         End
         Begin DB_TextClass DBMessage
            Alignment       =   0   'Left Justify
            BorderStyle     =   1   'Fixed Single
            Height          =   255
            HideSelection   =   0   'False
            Index           =   1
            Left            =   -120
            MaxLength       =   0
            MultiLine       =   0   'False
            PasswordChar    =   ""
            pAutoTab        =   0   'False
            pChanged        =   0   'False
            pFindValue      =   ""
            pFormatString   =   ""
            pIncLiterals    =   0   'False
            pMask           =   ""
            pMaskDefines    =   ""
            pQBECase        =   0   'Case Sensitive
            pQBEValue       =   ""
            pQueryExpr      =   "MESSAGE"
            pQueryName      =   "CardQuery"
            pRecState       =   0
            ReadOnly        =   0   'False
            ScrollBars      =   0   'None
            TabIndex        =   35
            Text            =   "DBMessage"
            Top             =   1440
            Visible         =   0   'False
            Width           =   1215
         End
         Begin DB_TextClass DBMessage
            Alignment       =   0   'Left Justify
            BorderStyle     =   1   'Fixed Single
            Height          =   255
            HideSelection   =   0   'False
            Index           =   0
            Left            =   -120
            MaxLength       =   0
            MultiLine       =   0   'False
            PasswordChar    =   ""
            pAutoTab        =   0   'False
            pChanged        =   0   'False
            pFindValue      =   ""
            pFormatString   =   ""
            pIncLiterals    =   0   'False
            pMask           =   ""
            pMaskDefines    =   ""
            pQBECase        =   0   'Case Sensitive
            pQBEValue       =   ""
            pQueryExpr      =   "MESSAGE"
            pQueryName      =   "CardQuery"
            pRecState       =   0
            ReadOnly        =   0   'False
            ScrollBars      =   0   'None
            TabIndex        =   34
            Text            =   "DBMessage"
            Top             =   1200
```

INTOUCH.DOC printed 5/3/94

```
    Visible         =   0      'False
    Width           =   1215
End
Begin DB_TextClass DBCurrTab
    Alignment       =   0      'Left Justify
    BorderStyle     =   1      'Fixed Single
    Height          =   255
    HideSelection   =   0      'False
    Left            =   4800
    MaxLength       =   0
    MultiLine       =   0      'False
    PasswordChar    =   ""
    pAutoTab        =   0      'False
    pChanged        =   0      'False
    pFindValue      =   ""
    pFormatString   =   ""
    pIncLiterals    =   0      'False
    pMask           =   ""
    pMaskDefines    =   ""
    pQBECase        =   0      'Case Sensitive
    pQBEValue       =   "?DBCurrTab.Text"
    pQueryExpr      =   ""
    pQueryName      =   ""
    pRecState       =   0
    ReadOnly        =   0      'False
    ScrollBars      =   0      'None
    TabIndex        =   24
    Text            =   ""
    Top             =   0
    Visible         =   0      'False
    Width           =   1575
End
Begin DB_TextClass DB_Text1
    Alignment       =   0      'Left Justify
    BorderStyle     =   1      'Fixed Single
    Height          =   255
    HideSelection   =   0      'False
    Index           =   5
    Left            =   9120
    MaxLength       =   0
    MultiLine       =   0      'False
    PasswordChar    =   ""
    pAutoTab        =   0      'False
    pChanged        =   0      'False
    pFindValue      =   ""
    pFormatString   =   ""
    pIncLiterals    =   0      'False
    pMask           =   ""
    pMaskDefines    =   ""
    pQBECase        =   0      'Case Sensitive
    pQBEValue       =   ""
    pQueryExpr      =   "FILENAME"
    pQueryName      =   "CardQuery"
    pRecState       =   0
    ReadOnly        =   0      'False
    ScrollBars      =   0      'None
    TabIndex        =   22
    Text            =   "DB_Text1"
    Top             =   1800
    Visible         =   0      'False
    Width           =   1095
End
Begin DB_TextClass DB_Text1
    Alignment       =   0      'Left Justify
```

INTOUCH.DOC printed 5/3/94

```
                                        16

BorderStyle      =    1    'Fixed Single
        Height           =    255
        HideSelection    =    0    'False
        Index            =    4
        Left             =    9120
        MaxLength        =    0
        MultiLine        =    0    'False
        PasswordChar     =    ""
        pAutoTab         =    0    'False
        pChanged         =    0    'False
        pFindValue       =    ""
        pFormatString    =    ""
        pIncLiterals     =    0    'False
        pMask            =    ""
        pMaskDefines     =    ""
        pQBECase         =    0    'Case Sensitive
        pQBEValue        =    ""
        pQueryExpr       =    "FILENAME"
        pQueryName       =    "CardQuery"
        pRecState        =    0
        ReadOnly         =    0    'False
        ScrollBars       =    0    'None
        TabIndex         =    21
        Text             =    "DB_Text1"
        Top              =    1560
        Visible          =    0    'False
        Width            =    1095
     End
     Begin DB_TextClass DB_Text1
        Alignment        =    0    'Left Justify
        BorderStyle      =    1    'Fixed Single
        Height           =    255
        HideSelection    =    0    'False
        Index            =    3
        Left             =    9120
        MaxLength        =    0
        MultiLine        =    0    'False
        PasswordChar     =    ""
        pAutoTab         =    0    'False
        pChanged         =    0    'False
        pFindValue       =    ""
        pFormatString    =    ""
        pIncLiterals     =    0    'False
        pMask            =    ""
        pMaskDefines     =    ""
        pQBECase         =    0    'Case Sensitive
        pQBEValue        =    ""
        pQueryExpr       =    "FILENAME"
        pQueryName       =    "CardQuery"
        pRecState        =    0
        ReadOnly         =    0    'False
        ScrollBars       =    0    'None
        TabIndex         =    20
        Text             =    "DB_Text1"
        Top              =    1320
        Visible          =    0    'False
        Width            =    1095
     End
     Begin DB_TextClass DB_Text1
        Alignment        =    0    'Left Justify
        BorderStyle      =    1    'Fixed Single
        Height           =    255
        HideSelection    =    0    'False
        Index            =    2
```

INTOUCH.DOC printed 5/3/94

```
                    17

Left            =    9120
        MaxLength       =    0
        MultiLine       =    0         'False
        PasswordChar    =    ""
        pAutoTab        =    0         'False
        pChanged        =    0         'False
        pFindValue      =    ""
        pFormatString   =    ""
        pIncLiterals    =    0         'False
        pMask           =    ""
        pMaskDefines    =    ""
        pQBECase        =    0         'Case Sensitive
        pQBEValue       =    ""
        pQueryExpr      =    "FILENAME"
        pQueryName      =    "CardQuery"
        pRecState       =    0
        ReadOnly        =    0         'False
        ScrollBars      =    0         'None
        TabIndex        =    19
        Text            =    "DB_Text1"
        Top             =    1080
        Visible         =    0         'False
        Width           =    1095
    End
    Begin DB_TextClass DB_Text1
        Alignment       =    0         'Left Justify
        BorderStyle     =    1         'Fixed Single
        Height          =    255
        HideSelection   =    0         'False
        Index           =    1
        Left            =    9120
        MaxLength       =    0
        MultiLine       =    0         'False
        PasswordChar    =    ""
        pAutoTab        =    0         'False
        pChanged        =    0         'False
        pFindValue      =    ""
        pFormatString   =    ""
        pIncLiterals    =    0         'False
        pMask           =    ""
        pMaskDefines    =    ""
        pQBECase        =    0         'Case Sensitive
        pQBEValue       =    ""
        pQueryExpr      =    "FILENAME"
        pQueryName      =    "CardQuery"
        pRecState       =    0
        ReadOnly        =    0         'False
        ScrollBars      =    0         'None
        TabIndex        =    18
        Text            =    "DB_Text1"
        Top             =    840
        Visible         =    0         'False
        Width           =    1095
    End
    Begin DB_TextClass DB_Text1
        Alignment       =    0         'Left Justify
        BorderStyle     =    1         'Fixed Single
        Height          =    255
        HideSelection   =    0         'False
        Index           =    0
        Left            =    8400
        MaxLength       =    0
        MultiLine       =    0         'False
        PasswordChar    =    ""

INTOUCH.DOC printed 5/3/94
```

```
      pAutoTab        =   0    'False
      pChanged        =   0    'False
      pFindValue      =   ""
      pFormatString   =   ""
      pIncLiterals    =   0    'False
      pMask           =   ""
      pMaskDefines    =   ""
      pQBECase        =   0    'Case Sensitive
      pQBEValue       =   ""
      pQueryExpr      =   "FILENAME"
      pQueryName      =   "CardQuery"
      pRecState       =   0
      ReadOnly        =   0    'False
      ScrollBars      =   0    'None
      TabIndex        =   12
      Text            =   "DB_Text1"
      Top             =   480
      Visible         =   0    'False
      Width           =   1095
   End
   Begin QueryClass CardQuery
      Height          =   375
      Left            =   7920
      pConnectName    =   "Connect1"
      pDistinct       =   0    'False
      pErrorOption    =   0    'Display All Errors
      pHDBC           =   0
      pHSTMT          =   0
      pRandEnabled    =   0    'False
      pRecCount       =   1340022014
      pRecNumber      =   -1
      pRowIndex       =   -1
      pTables         =   "CARD.DBF"
      pTranPending    =   0    'False
      pVersion        =   2
      pWhere          =   ""
      Top             =   4440
      Width           =   1335
   End
   Begin ConnectClass Connect1
      Height          =   375
      Left            =   7920
      pAutoLogon      =   -1   'True
      pErrorOption    =   0    'Display All Errors
      pLogonInfo      =   ""
      pLogonOption    =   0    'Display logon dialog box on error
      pSource         =   "dBASEFile"
      Top             =   4080
      Width           =   1335
   End
   Begin SSCommand Command3D2
      Caption         =   "Trash"
      Height          =   855
      Left            =   7440
      Picture         =   CARDS.FRX:0000
      TabIndex        =   11
      Top             =   4440
      Width           =   855
   End
   Begin SSPanel Panel3D2
      BevelInner      =   1    'Inset
      BevelWidth      =   2
      Height          =   2655
      Left            =   0
```

INTOUCH.DOC printed 5/3/94

```
                                    19

TabIndex        =   4
        Top             =   1200
        Width           =   1455
        Begin SSCheck Religious
            Caption     =   "Religous"
            Height      =   255
            Left        =   120
            TabIndex    =   9
            Top         =   720
            Width       =   1095
        End
        Begin SSCheck Serious
            Caption     =   "Traditional"
            Height      =   255
            Left        =   120
            TabIndex    =   8
            Top         =   480
            Width       =   1215
        End
        Begin SSCheck Humorous
            Caption     =   "Humorous"
            Height      =   255
            Left        =   120
            TabIndex    =   7
            Top         =   240
            Width       =   1215
        End
        Begin SSCheck BlankInsideMessage
            Caption     =   "Blank "
            Height      =   255
            Left        =   120
            TabIndex    =   6
            Top         =   1800
            Width       =   735
        End
        Begin SSCheck RecycledPaperOnly
            Caption     =   "Recycled "
            Height      =   255
            Left        =   120
            TabIndex    =   5
            Top         =   1200
            Width       =   1095
        End
        Begin Label Label3
            BackStyle   =   0  'Transparent
            Caption     =   "Inside Message"
            Height      =   495
            Left        =   360
            TabIndex    =   26
            Top         =   2040
            Width       =   855
            WordWrap    =   -1  'True
        End
        Begin Label Label2
            BackStyle   =   0  'Transparent
            Caption     =   "Paper Only"
            Height      =   255
            Left        =   360
            TabIndex    =   25
            Top         =   1440
            Width       =   975
            WordWrap    =   -1  'True
        End
    End INTOUCH.DOC printed 5/3/94
```

20

```
Begin SSPanel Panel3D1
    BevelInner      =   1   'Inset
    BevelWidth      =   2
    Height          =   2655
    Left            =   7440
    TabIndex        =   2
    Top             =   1080
    Width           =   2055
    Begin ImageMan SelectedImage
        AutoDraw        =   -1  'True
        BackColor       =   &H00FFFFFF&
        DragMode        =   1   'Automatic
        Ext             =   ""
        Height          =   1935
        Index           =   1
        Left            =   120
        Picture         =   ""
        ScaleHeight     =   0
        ScaleLeft       =   0
        ScaleMode       =   0   'User
        ScaleTop        =   0
        ScaleWidth      =   0
        Scrollbars      =   0   'False
        Select          =   0   'False
        TabIndex        =   23
        Top             =   600
        Width           =   1815
    End
    Begin Label Label1
        Alignment       =   2   'Center
        BackStyle       =   0   'Transparent
        Caption         =   "Birthday Card for Terry Tackbury"
        Height          =   495
        Left            =   240
        TabIndex        =   3
        Top             =   120
        Width           =   1575
        WordWrap        =   -1  'True
    End
End
Begin VideoSoftIndexTab VSIndexTab1
    AutoScroll      =   -1  'True
    AutoSwitch      =   -1  'True
    BackColor       =   &H00E0FFFF&
    BackTabColor    =   &H00C0C0C0&
    Caption         =   "Anniversary|Birthday|Christmas|Get Well Soon|Thank You"
    CurrTab         =   0
    FirstTab        =   0
    FontBold        =   -1  'True
    FontItalic      =   0   'False
    FontName        =   "Arial"
    FontSize        =   8.25
    FontStrikethru  =   0   'False
    FontUnderline   =   0   'False
    ForeColor       =   &H00000000&
    FrontTabColor   =   &H00FFFFFF&
    Height          =   5295
    Left            =   1440
    Position        =   0   'Top
    ShowFocusRect   =   -1  'True
    Style           =   3   'Rounded 3D
    TabIndex        =   1
    Top             =   0
    Width           =   6015
```

INTOUCH.DOC printed 5/3/94

21

```
Begin SSPanel Panel3D7
    BevelInner      =   1   'Inset
    BevelWidth      =   2
    Height          =   5055
    Left            =   0
    TabIndex        =   10
    Top             =   240
    Width           =   6015
    Begin ImageMan ImageMan1
        AutoDraw        =   -1  'True
        BackColor       =   &H00FFFFFF&
        Ext             =   ""
        Height          =   1935
        Index           =   0
        Left            =   120
        Picture         =   ""
        ScaleHeight     =   0
        ScaleLeft       =   0
        ScaleMode       =   0   'User
        ScaleTop        =   0
        ScaleWidth      =   0
        Scrollbars      =   0   'False
        Select          =   0   'False
        TabIndex        =   33
        Top             =   120
        Width           =   1815
    End
    Begin DB_TextClass DB_Text3
        Alignment       =   0   'Left Justify
        BorderStyle     =   1   'Fixed Single
        FontBold        =   0   'False
        FontItalic      =   0   'False
        FontName        =   "MS Serif"
        FontSize        =   6.75
        FontStrikethru  =   0   'False
        FontUnderline   =   0   'False
        Height          =   465
        HideSelection   =   0   'False
        Index           =   0
        Left            =   120
        MaxLength       =   0
        MultiLine       =   -1  'True
        PasswordChar    =   ""
        pAutoTab        =   0   'False
        pChanged        =   0   'False
        pFindValue      =   ""
        pFormatString   =   ""
        pIncLiterals    =   0   'False
        pMask           =   ""
        pMaskDefines    =   ""
        pQBECase        =   0   'Case Sensitive
        pQBEValue       =   ""
        pQueryExpr      =   "FRONTMESSA"
        pQueryName      =   "CardQuery"
        pRecState       =   0
        ReadOnly        =   0   'False
        ScrollBars      =   2   'Vertical
        TabIndex        =   32
        Text            =   "DB_Text3"
        Top             =   2040
        Width           =   1815
    End
    Begin DB_TextClass DB_Text3
        Alignment       =   0   'Left Justify
```

INTOUCH.DOC printed 5/3/94

```
            BorderStyle      =    1    'Fixed Single
            FontBold         =    0    'False
            FontItalic       =    0    'False
            FontName         =    "MS Serif"
            FontSize         =    6.75
            FontStrikethru   =    0    'False
            FontUnderline    =    0    'False
            Height           =    465
            HideSelection    =    0    'False
            Index            =    5
            Left             =    3960
            MaxLength        =    0
            MultiLine        =    -1   'True
            PasswordChar     =    ""
            pAutoTab         =    0    'False
            pChanged         =    0    'False
            pFindValue       =    ""
            pFormatString    =    ""
            pIncLiterals     =    0    'False
            pMask            =    ""
            pMaskDefines     =    ""
            pQBECase         =    0    'Case Sensitive
            pQBEValue        =    ""
            pQueryExpr       =    "FRONTMESSA"
            pQueryName       =    "CardQuery"
            pRecState        =    0
            ReadOnly         =    0    'False
            ScrollBars       =    2    'Vertical
            TabIndex         =    31
            Text             =    "DB_Text3"
            Top              =    4410
            Width            =    1815
         End
         Begin DB_TextClass DB_Text3
            Alignment        =    0    'Left Justify
            BorderStyle      =    1    'Fixed Single
            FontBold         =    0    'False
            FontItalic       =    0    'False
            FontName         =    "MS Serif"
            FontSize         =    6.75
            FontStrikethru   =    0    'False
            FontUnderline    =    0    'False
            Height           =    465
            HideSelection    =    0    'False
            Index            =    4
            Left             =    2040
            MaxLength        =    0
            MultiLine        =    -1   'True
            PasswordChar     =    ""
            pAutoTab         =    0    'False
            pChanged         =    0    'False
            pFindValue       =    ""
            pFormatString    =    ""
            pIncLiterals     =    0    'False
            pMask            =    ""
            pMaskDefines     =    ""
            pQBECase         =    0    'Case Sensitive
            pQBEValue        =    ""
            pQueryExpr       =    "FRONTMESSA"
            pQueryName       =    "CardQuery"
            pRecState        =    0
            ReadOnly         =    0    'False
            ScrollBars       =    2    'Vertical
            TabIndex         =    30
```

INTOUCH.DOC printed 5/3/94

```
            Text          =   "DB_Text3"
            Top           =   4410
            Width         =   1815
         End
         Begin DB_TextClass DB_Text3
            Alignment     =   0  'Left Justify
            BorderStyle   =   1  'Fixed Single
            FontBold      =   0  'False
            FontItalic    =   0  'False
            FontName      =   "MS Serif"
            FontSize      =   6.75
            FontStrikethru =  0  'False
            FontUnderline =   0  'False
            Height        =   465
            HideSelection =   0  'False
            Index         =   3
            Left          =   120
            MaxLength     =   0
            MultiLine     =   -1 'True
            PasswordChar  =   ""
            pAutoTab      =   0  'False
            pChanged      =   0  'False
            pFindValue    =   ""
            pFormatString =   ""
            pIncLiterals  =   0  'False
            pMask         =   ""
            pMaskDefines  =   ""
            pQBECase      =   0  'Case Sensitive
            pQBEValue     =   ""
            pQueryExpr    =   "FRONTMESSA"
            pQueryName    =   "CardQuery"
            pRecState     =   0
            ReadOnly      =   0  'False
            ScrollBars    =   2  'Vertical
            TabIndex      =   29
            Text          =   "DB_Text3"
            Top           =   4410
            Width         =   1815
         End
         Begin DB_TextClass DB_Text3
            Alignment     =   0  'Left Justify
            BorderStyle   =   1  'Fixed Single
            FontBold      =   0  'False
            FontItalic    =   0  'False
            FontName      =   "MS Serif"
            FontSize      =   6.75
            FontStrikethru =  0  'False
            FontUnderline =   0  'False
            Height        =   465
            HideSelection =   0  'False
            Index         =   2
            Left          =   3960
            MaxLength     =   0
            MultiLine     =   -1 'True
            PasswordChar  =   ""
            pAutoTab      =   0  'False
            pChanged      =   0  'False
            pFindValue    =   ""
            pFormatString =   ""
            pIncLiterals  =   0  'False
            pMask         =   ""
            pMaskDefines  =   ""
            pQBECase      =   0  'Case Sensitive
            pQBEValue     =   ""
```

INTOUCH.DOC printed 5/3/94

24

```
        pQueryExpr      =   "FRONTMESSA"
        pQueryName      =   "CardQuery"
        pRecState       =   0
        ReadOnly        =   0   'False
        ScrollBars      =   2   'Vertical
        TabIndex        =   28
        Text            =   "DB_Text3"
        Top             =   2040
        Width           =   1815
    End
    Begin DB_TextClass DB_Text3
        Alignment       =   0   'Left Justify
        BorderStyle     =   1   'Fixed Single
        FontBold        =   0   'False
        FontItalic      =   0   'False
        FontName        =   "MS Serif"
        FontSize        =   6.75
        FontStrikethru  =   0   'False
        FontUnderline   =   0   'False
        Height          =   465
        HideSelection   =   0   'False
        Index           =   1
        Left            =   2040
        MaxLength       =   0
        MultiLine       =   -1  'True
        PasswordChar    =   ""
        pAutoTab        =   0   'False
        pChanged        =   0   'False
        pFindValue      =   ""
        pFormatString   =   ""
        pIncLiterals    =   0   'False
        pMask           =   ""
        pMaskDefines    =   ""
        pQBECase        =   0   'Case Sensitive
        pQBEValue       =   ""
        pQueryExpr      =   "FRONTMESSA"
        pQueryName      =   "CardQuery"
        pRecState       =   0
        ReadOnly        =   0   'False
        ScrollBars      =   2   'Vertical
        TabIndex        =   27
        Text            =   "DB_Text3"
        Top             =   2040
        Width           =   1815
    End
    Begin ImageMan ImageMan1
        AutoDraw        =   -1  'True
        BackColor       =   &H00FFFFFF&
        Ext             =   ""
        Height          =   1935
        Index           =   5
        Left            =   3960
        Picture         =   ""
        ScaleHeight     =   0
        ScaleLeft       =   0
        ScaleMode       =   0   'User
        ScaleTop        =   0
        ScaleWidth      =   0
        Scrollbars      =   0   'False
        Select          =   0   'False
        TabIndex        =   17
        Top             =   2490
        Width           =   1815
    End
```

INTOUCH.DOC printed 5/3/94

25

```
Begin ImageMan ImageMan1
    AutoDraw        =   -1  'True
    BackColor       =   &H00FFFFFF&
    Ext             =   ""
    Height          =   1935
    Index           =   4
    Left            =   2040
    Picture         =   ""
    ScaleHeight     =   0
    ScaleLeft       =   0
    ScaleMode       =   0   'User
    ScaleTop        =   0
    ScaleWidth      =   0
    Scrollbars      =   0   'False
    Select          =   0   'False
    TabIndex        =   16
    Top             =   2490
    Width           =   1815
End
Begin ImageMan ImageMan1
    AutoDraw        =   -1  'True
    BackColor       =   &H00FFFFFF&
    Ext             =   ""
    Height          =   1935
    Index           =   3
    Left            =   120
    Picture         =   ""
    ScaleHeight     =   0
    ScaleLeft       =   0
    ScaleMode       =   0   'User
    ScaleTop        =   0
    ScaleWidth      =   0
    Scrollbars      =   0   'False
    Select          =   0   'False
    TabIndex        =   15
    Top             =   2490
    Width           =   1815
End
Begin ImageMan ImageMan1
    AutoDraw        =   -1  'True
    BackColor       =   &H00FFFFFF&
    Ext             =   ""
    Height          =   1935
    Index           =   2
    Left            =   3960
    Picture         =   ""
    ScaleHeight     =   0
    ScaleLeft       =   0
    ScaleMode       =   0   'User
    ScaleTop        =   0
    ScaleWidth      =   0
    Scrollbars      =   0   'False
    Select          =   0   'False
    TabIndex        =   14
    Top             =   120
    Width           =   1815
End
Begin ImageMan ImageMan1
    AutoDraw        =   -1  'True
    BackColor       =   &H00FFFFFF&
    Ext             =   ""
    Height          =   1935
    Index           =   1
    Left            =   2040
```

INTOUCH.DOC printed 5/3/94

26

```
            Picture         =   ""
            ScaleHeight     =   0
            ScaleLeft       =   0
            ScaleMode       =   0  'User
            ScaleTop        =   0
            ScaleWidth      =   0
            Scrollbars      =   0  'False
            Select          =   0  'False
            TabIndex        =   13
            Top             =   120
            Width           =   1815
         End
      End
   End
   Begin SSCommand Command3D1
      Caption         =   "&Return"
      Height          =   855
      Left            =   8640
      Picture         =   CARDS.FRX:0302
      TabIndex        =   0
      Top             =   4440
      Width           =   855
   End
   Begin Label Label4
      BackColor       =   &H00E0FFFF&
      Caption         =   "Search keyword:"
      Height          =   255
      Left            =   0
      TabIndex        =   41
      Top             =   120
      Width           =   1455
   End
End
'Force all variables to be declared
Option Explicit Sub BlankInsideMessage_Click (Value As Integer)
   RecalcCardQuery
End Sub Sub CardQuery_eFetch (RowIndex As Integer)
    'Force the current record to be updated automatically
    'res% = fUpdate(CardQuery, 0)
End Sub Sub Command3D1_Click ()
   Unload Cards
End Sub Sub Command3D2_DragDrop (Source As Control, X As Single, Y As Single)
   If TypeOf Source Is Image Then
     'Clear the picture
     Source.Picture = LoadPicture()
   Else
     If TypeOf Source Is ImageMan Then
        Source.Picture = ""
     End If
   End If
End Sub Sub CurrTab_Change ()
   Dim res As Integer
   CardQuery.pWhere = "Occasion ='" + DBCurrTab.Text + "'"
   res% = fDoQuery(CardQuery)
```

INTOUCH.DOC printed 5/3/94

```
    res% = fEndQuery(CardQuery)
End Sub

Sub DB_Text1_Change (Index As Integer)
    ImageMan1(Index).Picture = DB_Text1(Index).Text
End Sub Sub DBCurrTab_Change ()
    'MsgBox "Changed"
    'CardQuery.pWhere = "Occasion = '" + DBCurrTab.Text + "'"
    ''CardQuery.pWhere = "Occasion = ?DBCurrTab"
    'res% = fDoQuery(CardQuery)
    'res% = fEndQuery(CardQuery)
    RecalcCardQuery
End Sub Sub DVCurrTab_Change ()
    Dim res As Integer CardQuery.pWhere = "Occasion = '" + DBCurrTab + "'"
    res% = fDoQuery(CardQuery)
    res% = fEndQuery(CardQuery)
End Sub Sub Form_Load ()
    'Initialize card query
    'res% = fDoQuery(CardQuery)
    Humorous.Value = True
    Serious.Value = True
    Religious.Value = True
    DBCurrTab.Text = "Anniversary"
End Sub Sub Form_Unload (Cancel As Integer)
    Dim res As Integer 'If a query is active, end it.
    If CardQuery.pMode = 1 Then
        res% = fEndQuery(CardQuery)
    End If
End Sub Sub Humorous_Click (Value As Integer)
    RecalcCardQuery
End Sub Sub ImageMan1_Click (Index As Integer)
    'MsgBox "Called Click"
    'Load ZoomImage
    'Text1.Text = ImageMan1(0).ErrCode
    'MsgBox "file name: " + ImageMan1(Index).Picture
    'ZoomImage.ImageMan1.Picture = Cards.ImageMan1(Index).Picture
    'ZoomImage.Show
    'Text1.Text = ImageMan1(0).ErrCode
End Sub Sub ImageMan1_DblClick (Index As Integer)
    CurrIndex = Index    'Set global index variable to current index
    Load ZoomImage       'Load (but do not yet show) zoom form
    AssignZoomImage
    ZoomImage.Show
End Sub Sub ImageMan1_MouseDown (Index As Integer, Button As Integer, Shift As Integer, X As Single, Y As Single)
```

```
  ImageMan1(Index).Drag 1    'Drag image
End Sub

Sub KeywordSearch_KeyPress (KeyAscii As Integer)
  If KeyAscii = 13 Then
    RecalcCardQuery
    KeyAscii = 0
  End If
End Sub Sub KeywordSearch_LostFocus ()
  RecalcCardQuery
End Sub Sub Panel3D1_Click ()
  'MsgBox "clicked me"
End Sub Sub Panel3D7_Click ()
  MsgBox "Clicked me"
End Sub Sub RecalcCardQuery ()
  Dim res As Integer 'If a query is already active, end it.
  If CardQuery.pMode = 1 Then
    res% = fEndQuery(CardQuery)
  End If CardQuery.pWhere = "Occasion = '" + DBCurrTab.Text + "'"
  'CardQuery.pWhere = "Occasion = ?DBCurrTab"
  If Humorous.Value = False Then
    CardQuery.pWhere = CardQuery.pWhere + " And Humorous = .F."
  End If
  If Serious.Value = False Then
    CardQuery.pWhere = CardQuery.pWhere + " And Serious = .F."
  End If
  If Religious.Value = False Then
    CardQuery.pWhere = CardQuery.pWhere + " And Religious = .F."
  End If
  If RecycledPaperOnly.Value = True Then
    CardQuery.pWhere = CardQuery.pWhere + "And Recycled = .T."
  End If
  If KeywordSearch.Text = "" Then
  Else CardQuery.pWhere = CardQuery.pWhere + "And Descrption like '%" + KeywordSearch.Text + "%'"
  End If
  res% = fDoQuery(CardQuery)
  'res% = fEndQuery(CardQuery)

End Sub

Sub RecycledPaperOnly_Click (Value As Integer)
  RecalcCardQuery
End Sub

Sub Religious_Click (Value As Integer)
  RecalcCardQuery
End Sub

Sub SelectedImage_Click (Index As Integer)
  'MsgBox "Clicked me"
End Sub
```

INTOUCH.DOC printed 5/3/94

```
Sub SelectedImage_DragDrop (Index As Integer, Source As Control, X As Single, Y As
Single)
  If TypeOf Source Is Image Then
    SelectedImage(Index).Picture = Source.Picture
  Else
    If TypeOf Source Is DB_PictureClass Then
      SelectedImage(Index).Picture = Source.Picture
    Else
      If TypeOf Source Is ImageMan Then
        SelectedImage(Index).Picture = Source.Picture
      End If
    End If
  End If
End Sub Sub SelectedImage_Select (Index As Integer, X1 As Single, Y1 As Single, X2 As
Single, Y2 As Single)
  MsgBox "Selected me"
End Sub Sub Serious_Click (Value As Integer)
  RecalcCardQuery
End Sub Sub Text1_Click ()
  'Text1.Text = "ErrCode"
End Sub Sub VSIndexTab1_Click ()
  'MsgBox "Clicked me"
  'DBCurrTab.Text = VSIndexTab1.CurrTab
  'If VSIndexTab1.CurrTab = 0 Then
  '  DBCurrTab.Text = "Anniversary"
  'Else
  '  If VSIndexTab1.CurrTab = 1 Then
  '    DBCurrTab.Text = "Birthday"
  '  'Else DBCurrTab.Text = VSIndexTab1.CurrTab
  '  'End If
  'End If
  Select Case VSIndexTab1.CurrTab
    Case 0
      DBCurrTab.Text = "Anniversary"
    Case 1
      DBCurrTab.Text = "Birthday"
    Case 2
      DBCurrTab.Text = "Christmas"
    Case 3
      DBCurrTab.Text = "Get Well Soon"
    Case 4
      DBCurrTab.Text = "Wedding"
  End Select End Sub Sub VSIndexTab1_Scroll ()
  DBCurrTab.Text = VSIndexTab1.CurrTab
End Sub
```

CHOICES.FRM

```
VERSION 2.00
Begin Form Choices
   BackColor       =   &H00E0FFFF&
```

INTOUCH.DOC printed 5/3/94

30

```
      BorderStyle        =   0    'None
      ClientHeight       =   5955
      ClientLeft         =   2535
      ClientTop          =   1440
      ClientWidth        =   9315
      ControlBox         =   0    'False
      Height             =   6360
      Left               =   2475
      LinkTopic          =   "Form2"
      MDIChild           =   -1   'True
      ScaleHeight        =   5955
      ScaleWidth         =   9315
      Top                =   1095
      Width              =   9435
      WindowState        =   2    'Maximized
      Begin MhInvisible MhInvisible1
         Height          =   3375
         Index           =   2
         Left            =   6360
         TabIndex        =   22
         Top             =   5520
         Width           =   2295
      End
      Begin MhInvisible MhInvisible1
         Height          =   3375
         Index           =   1
         Left            =   3480
         TabIndex        =   21
         Top             =   5640
         Width           =   2295
      End
      Begin MhInvisible MhInvisible1
         Height          =   3375
         Index           =   0
         Left            =   120
         TabIndex        =   20
         Top             =   5400
         Width           =   2295
      End
      Begin SSPanel Panel3D1
         BevelInner      =   2    'Raised
         BevelWidth      =   2
         Height          =   3360
         Left            =   360
         TabIndex        =   7
         Top             =   1815
         Width           =   2295
         Begin Label Label19
            AutoSize        =   -1   'True
            BackColor       =   &H00C0C0C0&
            Caption         =   "&&"
            FontBold        =   -1   'True
            FontItalic      =   0    'False
            FontName        =   "MS Sans Serif"
            FontSize        =   18
            FontStrikethru  =   0    'False
            FontUnderline   =   0    'False
            Height          =   435
            Left            =   960
            TabIndex        =   24
            Top             =   1500
            Width           =   270
         End
         Begin Label Label6
```

INTOUCH.DOC printed 5/3/94

```
            Alignment       =   2  'Center
            BackStyle       =   0  'Transparent
            Caption         =   "Enter Dates"
            FontBold        =   -1 'True
            FontItalic      =   0  'False
            FontName        =   "Arial"
            FontSize        =   8.25
            FontStrikethru  =   0  'False
            FontUnderline   =   0  'False
            Height          =   255
            Left            =   120
            TabIndex        =   0
            Top             =   1080
            Width           =   2055
         End
         Begin Image Image2
            Height          =   480
            Left            =   840
            Picture         =   CHOICES.FRX:0000
            Top             =   360
            Width           =   480
         End
         Begin Image Image1
            Height          =   480
            Left            =   840
            Picture         =   CHOICES.FRX:0302
            Top             =   2160
            Width           =   480
         End
         Begin Label Label5
            Alignment       =   2  'Center
            BackStyle       =   0  'Transparent
            Caption         =   "Enter Names"
            FontBold        =   -1 'True
            FontItalic      =   0  'False
            FontName        =   "Arial"
            FontSize        =   8.25
            FontStrikethru  =   0  'False
            FontUnderline   =   0  'False
            Height          =   255
            Left            =   0
            TabIndex        =   8
            Top             =   2880
            Width           =   2295
         End
      End
      Begin SSPanel Panel3D2
         BevelInner      =   2  'Raised
         BevelWidth      =   2
         Height          =   3375
         Left            =   3360
         TabIndex        =   5
         Top             =   1800
         Width           =   2295
         Begin Label Label14
            AutoSize        =   -1 'True
            BackColor       =   &H00C0C0C0&
            Caption         =   "&&"
            FontBold        =   -1 'True
            FontItalic      =   0  'False
            FontName        =   "MS Sans Serif"
            FontSize        =   18
            FontStrikethru  =   0  'False
            FontUnderline   =   0  'False
```

```
        Height          =   435
        Left            =   1080
        TabIndex        =   23
        Top             =   1500
        Width           =   270
     End
     Begin Image Image8
        Height          =   480
        Left            =   840
        Picture         =   CHOICES.FRX:0604
        Top             =   2160
        Width           =   480
     End
     Begin Label Label13
        Alignment       =   2  'Center
        BackStyle       =   0  'Transparent
        Caption         =   "Custom Message"
        FontBold        =   -1 'True
        FontItalic      =   0  'False
        FontName        =   "Arial"
        FontSize        =   8.25
        FontStrikethru  =   0  'False
        FontUnderline   =   0  'False
        Height          =   255
        Left            =   240
        TabIndex        =   1
        Top             =   2880
        Width           =   1815
     End
     Begin Image Image3
        Height          =   615
        Left            =   840
        Picture         =   CHOICES.FRX:0906
        Stretch         =   -1 'True
        Top             =   240
        Width           =   525
     End
     Begin Label Label7
        Alignment       =   2  'Center
        BackStyle       =   0  'Transparent
        Caption         =   "Choose Card"
        FontBold        =   -1 'True
        FontItalic      =   0  'False
        FontName        =   "Arial"
        FontSize        =   8.25
        FontStrikethru  =   0  'False
        FontUnderline   =   0  'False
        Height          =   255
        Left            =   240
        TabIndex        =   2
        Top             =   1080
        Width           =   1815
     End
  End
  Begin SSPanel Panel3D3
     BevelInner      =   2  'Raised
     BevelWidth      =   2
     Height          =   3375
     Left            =   6600
     TabIndex        =   3
     Top             =   1800
     Width           =   2295
     Begin Label Label20
        AutoSize        =   -1 'True
```

INTOUCH.DOC printed 5/3/94

```
        BackColor       =   &H00C0C0C0&
        Caption         =   "&&"
        FontBold        =   -1  'True
        FontItalic      =   0   'False
        FontName        =   "MS Sans Serif"
        FontSize        =   18
        FontStrikethru  =   0   'False
        FontUnderline   =   0   'False
        Height          =   435
        Left            =   1080
        TabIndex        =   25
        Top             =   1500
        Width           =   270
    End
    Begin Image Image4
        Height          =   480
        Left            =   960
        Picture         =   CHOICES.FRX:3180
        Top             =   360
        Width           =   480
    End
    Begin Image Image6
        Height          =   480
        Left            =   960
        Picture         =   CHOICES.FRX:3482
        Top             =   2160
        Width           =   480
    End
    Begin Label Label15
        Alignment       =   2   'Center
        BackStyle       =   0   'Transparent
        Caption         =   "Send for Delivery"
        FontBold        =   -1  'True
        FontItalic      =   0   'False
        FontName        =   "Arial"
        FontSize        =   8.25
        FontStrikethru  =   0   'False
        FontUnderline   =   0   'False
        Height          =   255
        Left            =   240
        TabIndex        =   4
        Top             =   2880
        Width           =   1815
    End
    Begin Label Label8
        Alignment       =   2   'Center
        BackStyle       =   0   'Transparent
        Caption         =   "Review Address"
        FontBold        =   -1  'True
        FontItalic      =   0   'False
        FontName        =   "Arial"
        FontSize        =   8.25
        FontStrikethru  =   0   'False
        FontUnderline   =   0   'False
        Height          =   255
        Left            =   360
        TabIndex        =   6
        Top             =   1080
        Width           =   1695
    End
End
Begin Label Label18
    Alignment       =   2   'Center
    BackStyle       =   0   'Transparent
```

34

```
        Caption         =   "Select Card"
        FontBold        =   -1  'True
        FontItalic      =   0   'False
        FontName        =   "Arial"
        FontSize        =   8.25
        FontStrikethru  =   0   'False
        FontUnderline   =   0   'False
        Height          =   255
        Left            =   3480
        TabIndex        =   9
        Top             =   1440
        Width           =   2055
     End
     Begin Label Label6
        Alignment       =   2   'Center
        BackStyle       =   0   'Transparent
        Caption         =   "Send"
        FontBold        =   -1  'True
        FontItalic      =   0   'False
        FontName        =   "Arial"
        FontSize        =   8.25
        FontStrikethru  =   0   'False
        FontUnderline   =   0   'False
        Height          =   255
        Left            =   6720
        TabIndex        =   13
        Top             =   1440
        Width           =   2055
     End
     Begin Label Label4
        Alignment       =   2   'Center
        BackStyle       =   0   'Transparent
        Caption         =   "Who Needs Card"
        FontBold        =   -1  'True
        FontItalic      =   0   'False
        FontName        =   "Arial"
        FontSize        =   8.25
        FontStrikethru  =   0   'False
        FontUnderline   =   0   'False
        Height          =   255
        Left            =   480
        TabIndex        =   15
        Top             =   1440
        Width           =   2055
     End
     Begin Label Label17
        BackStyle       =   0   'Transparent
        Caption         =   "X"
        FontBold        =   -1  'True
        FontItalic      =   -1  'True
        FontName        =   "Arial"
        FontSize        =   22.5
        FontStrikethru  =   0   'False
        FontUnderline   =   0   'False
        ForeColor       =   &H00FF0000&
        Height          =   495
        Left            =   4320
        TabIndex        =   18
        Top             =   60
        Width           =   375
     End
     Begin Label Label9
        BackStyle       =   0   'Transparent
        Caption         =   "PRESS"
```

INTOUCH.DOC printed 5/3/94

35

```
            FontBold       =   -1   'True
            FontItalic     =   -1   'True
            FontName       =   "Arial"
            FontSize       =   18.75
            FontStrikethru =   0    'False
            FontUnderline  =   0    'False
            ForeColor      =   &H00FF0000&
            Height         =   495
            Left           =   4620
            TabIndex       =   19
            Top            =   120
            Width          =   2055
         End
         Begin Label Label2
            BackStyle      =   0    'Transparent
            Caption        =   "2"
            FontBold       =   -1   'True
            FontItalic     =   0    'False
            FontName       =   "Arial"
            FontSize       =   28.5
            FontStrikethru =   0    'False
            FontUnderline  =   0    'False
            Height         =   735
            Left           =   4320
            TabIndex       =   17
            Top            =   855
            Width          =   375
         End
         Begin Label Label3
            BackStyle      =   0    'Transparent
            Caption        =   "3"
            FontBold       =   -1   'True
            FontItalic     =   0    'False
            FontName       =   "Arial"
            FontSize       =   28.5
            FontStrikethru =   0    'False
            FontUnderline  =   0    'False
            Height         =   735
            Left           =   7560
            TabIndex       =   16
            Top            =   855
            Width          =   375
         End
         Begin Label Label1
            BackStyle      =   0    'Transparent
            Caption        =   "1"
            FontBold       =   -1   'True
            FontItalic     =   0    'False
            FontName       =   "Arial"
            FontSize       =   28.5
            FontStrikethru =   0    'False
            FontUnderline  =   0    'False
            Height         =   735
            Left           =   1320
            TabIndex       =   14
            Top            =   855
            Width          =   375
         End
         Begin Label Label10
            BackStyle      =   0    'Transparent
            Caption        =   "Card"
            FontBold       =   -1   'True
            FontItalic     =   0    'False
            FontName       =   "Arial"
```

INTOUCH.DOC printed 5/3/94

```
        FontSize        =   18.75
        FontStrikethru  =   0   'False
        FontUnderline   =   0   'False
        Height          =   495
        Left            =   3450
        TabIndex        =   12
        Top             =   105
        Width           =   975
    End
    Begin Label Label11
        BackStyle       =   0   'Transparent
        Caption         =   "TM"
        Height          =   255
        Left            =   6000
        TabIndex        =   11
        Top             =   120
        Width           =   375
    End
    Begin Label Label12
        Alignment       =   2   'Center
        BackStyle       =   0   'Transparent
        Caption         =   "Copyright (C) 1993, InTouch Technologies, Inc."
        Height          =   255
        Left            =   2400
        TabIndex        =   10
        Top             =   600
        Width           =   4695
    End
End
Option Explicit Sub Form_Load ()
    'Place the invisible controls
    MhInvisible1(0).Left = 360
    MhInvisible1(0).Top = 1800
    MhInvisible1(1).Left = 3360
    MhInvisible1(1).Top = 1800
    MhInvisible1(2).Left = 6600
    MhInvisible1(2).Top = 1800
End Sub Sub Image1_Click ()
    Names.Show
End Sub Sub Image2_Click ()
    Dates.Show
End Sub Sub Image3_Click ()
    Cards.Show
End Sub Sub Image4_Click ()
    Order.Show
End Sub Sub Image5_Click ()
    OrderSum.Show
End Sub Sub Image6_Click ()
    SendList.Show
End Sub INTOUCH.DOC printed 5/3/94
```

```
Sub Image8_Click ()
  OrderSum.Show

End Sub

Sub MhInvisible1_Click (Index As Integer)
  Select Case Index
    Case 0
      Panel3D1_Click
    Case 1
      Panel3D2_Click
    Case 2
      Panel3D3_Click
  End Select
End Sub Sub Panel3D1_Click ()
  Dates.Show
End Sub Sub Panel3D2_Click ()
  Cards.Show
End Sub Sub Panel3D3_Click ()
  Order.Show
End Sub Sub Panel3D4_Click ()
  Order.Show
End Sub Sub Panel3D4_DragDrop (Source As Control, X As Single, Y As Single)
  Order.Show
End Sub Sub Panel3D6_Click ()
  OrderSum.Show
End Sub Sub Panel3D7_Click ()
  SendList.Show
End Sub
```

DATES.FRM

```
VERSION 2.00
Begin Form Dates
   BackColor       =   &H00E0FFFF&
   Caption         =   "Dates"
   ClientHeight    =   5280
   ClientLeft      =   75
   ClientTop       =   1845
   ClientWidth     =   9465
   Height          =   5685
   Left            =   15
   LinkTopic       =   "Form3"
   MDIChild        =   -1  'True
   ScaleHeight     =   5280
   ScaleWidth      =   9465
   Top             =   1500
   Visible         =   0   'False
```

INTOUCH.DOC printed 5/3/94

```
   Width           =   9585
Begin Mh3dButn SelectCards
   Alignment       =   2  'Center
   Caption         =   "&Select Cards"
   CaptionBottom   =   90
   CaptionLeft     =   45
   CaptionRight    =   45
   CaptionTop      =   200
   FontTransParent =   -1  'True
   Height          =   975
   Left            =   6360
   LightColor      =   &H00FFFFFF&
   MultiLine       =   -1  'True
   OuterFillColor  =   &H00C0C0C0&
   PictureAutosize =   0   'False
   ShadowColor     =   &H00808080&
   TabIndex        =   4
   TextFillColor   =   &H00C0C0C0&
   Top             =   4080
   Width           =   1095
End
Begin Frame Frame1
   Height          =   3735
   Left            =   6360
   TabIndex        =   2
   Top             =   240
   Width           =   2775
   Begin MhTree CardList
      Archive        =   0   'False
      BackColor      =   &H00FFFFFF&
      BitmapTransparent=  -1  'True
      BorderColor    =   &H80000006&
      Caption        =   "CardList"
      ColBackColor   =   DATES.FRX:0000
      ColForeColor   =   DATES.FRX:0084
      ColHighColor   =   DATES.FRX:0108
      ColTitle       =   DATES.FRX:018C
      Column         =   0
      Columns        =   32
      ColWidth       =   DATES.FRX:01D0
      ControlBox     =   0   'False
      DefaultPics    =   0   'False
      Dir            =   0   'False
      FillColor      =   &H00FFFFFF&
      Fonts          =   0
      GroupBackColor =   DATES.FRX:0214
      GroupForeColor =   DATES.FRX:0220
      GroupHighColor =   DATES.FRX:022C
      Groups         =   2
      Height         =   3135
      Hidden         =   0   'False
      HighColor      =   &H8000000E&
      Left           =   120
      LightColor     =   &H80000005&
      LineColor      =   &H00000000&
      LineWidth      =   1
      ListCount      =   1000
      MaxButton      =   0   'False
      MDI            =   0   'False
      MinButton      =   0   'False
      Normal         =   0   'False
      Path           =   "."
      ReadOnly       =   -1  'True
      ScaleMode      =   3   'Pixel
```

```
            ScreenUpdate      =    -1    'True
            SelectedColor     =    &H8000000D&
            ShadowColor       =    &H00FFFFFF&
            Sizeable          =    0     'False
            System            =    0     'False
            TabIndex          =    6
            TabStop           =    0     'False
            TextColor         =    &H80000008&
            TitleBold         =    0     'False
            Top               =    480
            Width             =    2295
         End
         Begin VScrollBar VScroll1
            Height            =    3135
            Left              =    2400
            TabIndex          =    7
            Top               =    480
            Width             =    255
         End
         Begin TextBox MonthValue
            Alignment         =    1     'Right Justify
            BorderStyle       =    0     'None
            FontBold          =    -1    'True
            FontItalic        =    0     'False
            FontName          =    "CG Times"
            FontSize          =    9.75
            FontStrikethru    =    0     'False
            FontUnderline     =    0     'False
            Height            =    285
            Left              =    1040
            TabIndex          =    5
            Text              =    "Month"
            Top               =    240
            Width             =    1455
         End
         Begin TextBox Text2
            BorderStyle       =    0     'None
            FontBold          =    -1    'True
            FontItalic        =    0     'False
            FontName          =    "CG Times"
            FontSize          =    9.75
            FontStrikethru    =    0     'False
            FontUnderline     =    0     'False
            Height            =    315
            Left              =    120
            TabIndex          =    3
            Text              =    "Cards for "
            Top               =    240
            Width             =    975
         End
      End
      Begin Mh3dCalendar Calendar
         Alignment         =    2     'Center
         AutoSize          =    -1    'True
         BackColor         =    &H00FF0000&
         BevelSize         =    2
         BevelSizeCap      =    2
         BevelSizeDate     =    2
         BevelStyleCap     =    1     'Raised
         BevelStyleDate    =    1     'Raised
         BorderColor       =    &H80000006&
         BorderStyle       =    2     'Single Line with Rounded Corners
         Caption           =    "Mh3dCalendar1"
         DateFormat        =    2     'Verbose
```

INTOUCH.DOC printed 5/3/94

40

```
Day              =   1
DividerStyle     =   1    'Single (BorderColor)
FillColor        =   &H00FFFF80&
FontBold         =   -1   'True
FontItalic       =   0    'False
FontName         =   "Arial"
FontSize         =   8.25
FontStrikethru   =   0    'False
FontUnderline    =   0    'False
Height           =   4815
HighBackColor    =   &H80000010&
HighColor        =   &H000000FF&
Language         =   "WWW"
Left             =   240
LightColor       =   &H80000005&
Month            =   5
ShadowColor      =   &H80000010&
TabIndex         =   1
TextColor        =   &H80000008&
TitleColor       =   &H00FF0000&
TitleFontBold    =   -1   'True
TitleFontItalic  =   0    'False
TitleFontName    =   "Arial"
TitleFontSize    =   9.75
TitleFontStrike  =   0    'False
TitleFontStyle   =   2    'Raised with more shading
TitleFontUnder   =   0    'False
TitleHeight      =   0
Top              =   240
Width            =   5775
Year             =   1993
Begin Image EventIcon
   Enabled       =   0    'False
   Height        =   480
   Index         =   41
   Left          =   5160
   Picture       =   DATES.FRX:0238
   Top           =   4200
   Visible       =   0    'False
   Width         =   480
End
Begin Image EventIcon
   Enabled       =   0    'False
   Height        =   480
   Index         =   40
   Left          =   4320
   Picture       =   DATES.FRX:053A
   Top           =   4200
   Visible       =   0    'False
   Width         =   480
End
Begin Image EventIcon
   Enabled       =   0    'False
   Height        =   480
   Index         =   39
   Left          =   3480
   Picture       =   DATES.FRX:083C
   Top           =   4200
   Visible       =   0    'False
   Width         =   480
End
Begin Image EventIcon
   Enabled       =   0    'False
   Height        =   480
```

41

```
        Index       =   38
        Left        =   2640
        Picture     =   DATES.FRX:0B3E
        Top         =   4200
        Visible     =   0   'False
        Width       =   480
     End
     Begin Image EventIcon
        Enabled     =   0   'False
        Height      =   480
        Index       =   37
        Left        =   1800
        Picture     =   DATES.FRX:0E40
        Top         =   4200
        Visible     =   0   'False
        Width       =   480
     End
     Begin Image EventIcon
        Enabled     =   0   'False
        Height      =   480
        Index       =   36
        Left        =   1080
        Picture     =   DATES.FRX:1142
        Top         =   4200
        Visible     =   0   'False
        Width       =   480
     End
     Begin Image EventIcon
        Enabled     =   0   'False
        Height      =   480
        Index       =   35
        Left        =   240
        Picture     =   DATES.FRX:1444
        Top         =   4200
        Visible     =   0   'False
        Width       =   480
     End
     Begin Image EventIcon
        Enabled     =   0   'False
        Height      =   480
        Index       =   34
        Left        =   5160
        Picture     =   DATES.FRX:1746
        Top         =   3600
        Visible     =   0   'False
        Width       =   480
     End
     Begin Image EventIcon
        Enabled     =   0   'False
        Height      =   480
        Index       =   33
        Left        =   4320
        Picture     =   DATES.FRX:1A48
        Top         =   3600
        Visible     =   0   'False
        Width       =   480
     End
     Begin Image EventIcon
        Enabled     =   0   'False
        Height      =   480
        Index       =   32
        Left        =   3480
        Picture     =   DATES.FRX:1D4A
        Top         =   3600
```

INTOUCH.DOC printed 5/3/94

```
            Visible         =   0      'False
            Width           =   480
         End
         Begin Image EventIcon
            Enabled         =   0      'False
            Height          =   480
            Index           =   31
            Left            =   2640
            Picture         =   DATES.FRX:204C
            Top             =   3600
            Visible         =   0      'False
            Width           =   480
         End
         Begin Image EventIcon
            Enabled         =   0      'False
            Height          =   480
            Index           =   30
            Left            =   1800
            Picture         =   DATES.FRX:234E
            Top             =   3600
            Visible         =   0      'False
            Width           =   480
         End
         Begin Image EventIcon
            Enabled         =   0      'False
            Height          =   480
            Index           =   29
            Left            =   1080
            Picture         =   DATES.FRX:2650
            Top             =   3600
            Visible         =   0      'False
            Width           =   480
         End
         Begin Image EventIcon
            Enabled         =   0      'False
            Height          =   480
            Index           =   28
            Left            =   240
            Picture         =   DATES.FRX:2952
            Top             =   3600
            Visible         =   0      'False
            Width           =   480
         End
         Begin Image EventIcon
            Enabled         =   0      'False
            Height          =   480
            Index           =   26
            Left            =   4320
            Picture         =   DATES.FRX:2C54
            Top             =   2880
            Visible         =   0      'False
            Width           =   480
         End
         Begin Image EventIcon
            Enabled         =   0      'False
            Height          =   480
            Index           =   25
            Left            =   3480
            Picture         =   DATES.FRX:2F56
            Top             =   2880
            Visible         =   0      'False
            Width           =   480
         End
         Begin Image EventIcon
```

43

```
        Enabled         =    0    'False
        Height          =    480
        Index           =    23
        Left            =    1800
        Picture         =    DATES.FRX:3258
        Top             =    2880
        Visible         =    0    'False
        Width           =    480
     End
     Begin Image EventIcon
        Enabled         =    0    'False
        Height          =    480
        Index           =    22
        Left            =    1080
        Picture         =    DATES.FRX:355A
        Top             =    2880
        Visible         =    0    'False
        Width           =    480
     End
     Begin Image EventIcon
        Enabled         =    0    'False
        Height          =    480
        Index           =    21
        Left            =    240
        Picture         =    DATES.FRX:385C
        Top             =    2880
        Visible         =    0    'False
        Width           =    480
     End
     Begin Image EventIcon
        Enabled         =    0    'False
        Height          =    480
        Index           =    20
        Left            =    5160
        Picture         =    DATES.FRX:3B5E
        Top             =    2280
        Visible         =    0    'False
        Width           =    480
     End
     Begin Image EventIcon
        Enabled         =    0    'False
        Height          =    480
        Index           =    19
        Left            =    4320
        Picture         =    DATES.FRX:3E60
        Top             =    2280
        Visible         =    0    'False
        Width           =    480
     End
     Begin Image EventIcon
        Enabled         =    0    'False
        Height          =    480
        Index           =    18
        Left            =    3480
        Picture         =    DATES.FRX:4162
        Top             =    2280
        Visible         =    0    'False
        Width           =    480
     End
     Begin Image EventIcon
        Enabled         =    0    'False
        Height          =    480
        Index           =    16
        Left            =    1800
```

INTOUCH.DOC printed 5/3/94

```
                                    44

Picture        =    DATES.FRX:4464
         Top            =    2280
         Visible        =    0     'False
         Width          =    480
      End
      Begin Image EventIcon
         Enabled        =    0     'False
         Height         =    480
         Index          =    15
         Left           =    1080
         Picture        =    DATES.FRX:4766
         Top            =    2280
         Visible        =    0     'False
         Width          =    480
      End
      Begin Image EventIcon
         Enabled        =    0     'False
         Height         =    480
         Index          =    11
         Left           =    3480
         Picture        =    DATES.FRX:4A68
         Top            =    1560
         Visible        =    0     'False
         Width          =    480
      End
      Begin Image EventIcon
         Enabled        =    0     'False
         Height         =    480
         Index          =    10
         Left           =    2640
         Picture        =    DATES.FRX:4D6A
         Top            =    1560
         Visible        =    0     'False
         Width          =    480
      End
      Begin Image EventIcon
         Enabled        =    0     'False
         Height         =    480
         Index          =    9
         Left           =    1800
         Picture        =    DATES.FRX:506C
         Top            =    1560
         Visible        =    0     'False
         Width          =    480
      End
      Begin Image EventIcon
         Enabled        =    0     'False
         Height         =    480
         Index          =    4
         Left           =    3480
         Picture        =    DATES.FRX:536E
         Top            =    880
         Visible        =    0     'False
         Width          =    480
      End
      Begin Image EventIcon
         Enabled        =    0     'False
         Height         =    480
         Index          =    2
         Left           =    1800
         Picture        =    DATES.FRX:5670
         Top            =    880
         Visible        =    0     'False
         Width          =    480

INTOUCH.DOC printed 5/3/94
```

45

```
      End
      Begin Image EventIcon
         Enabled       =   0    'False
         Height        =   480
         Index         =   1
         Left          =   1080
         Picture       =   DATES.FRX:5972
         Top           =   880
         Visible       =   0    'False
         Width         =   480
      End
      Begin Image EventIcon
         Enabled       =   0    'False
         Height        =   480
         Index         =   0
         Left          =   240
         Picture       =   DATES.FRX:5C74
         Top           =   880
         Visible       =   0    'False
         Width         =   480
      End
      Begin Image EventIcon
         Enabled       =   0    'False
         Height        =   480
         Index         =   13
         Left          =   5160
         Picture       =   DATES.FRX:5F76
         Top           =   1560
         Visible       =   0    'False
         Width         =   480
      End
      Begin Image EventIcon
         Enabled       =   0    'False
         Height        =   480
         Index         =   6
         Left          =   5160
         Picture       =   DATES.FRX:6278
         Top           =   880
         Visible       =   0    'False
         Width         =   480
      End
      Begin Image EventIcon
         Enabled       =   0    'False
         Height        =   480
         Index         =   17
         Left          =   2640
         Picture       =   DATES.FRX:657A
         Top           =   2280
         Visible       =   0    'False
         Width         =   480
      End
      Begin Image EventIcon
         Enabled       =   0    'False
         Height        =   480
         Index         =   14
         Left          =   240
         Picture       =   DATES.FRX:687C
         Top           =   2280
         Visible       =   0    'False
         Width         =   480
      End
      Begin Image EventIcon
         Enabled       =   0    'False
         Height        =   480
```

```
            Index           =   5
            Left            =   4320
            Picture         =   DATES.FRX:6B7E
            Top             =   880
            Visible         =   0   'False
            Width           =   480
         End
         Begin Image EventIcon
            Enabled         =   0   'False
            Height          =   480
            Index           =   27
            Left            =   5160
            Picture         =   DATES.FRX:6E80
            Stretch         =   -1  'True
            Top             =   2880
            Visible         =   0   'False
            Width           =   480
         End
         Begin Image EventIcon
            Enabled         =   0   'False
            Height          =   480
            Index           =   24
            Left            =   2640
            Picture         =   DATES.FRX:7182
            Top             =   2880
            Visible         =   0   'False
            Width           =   480
         End
         Begin Image EventIcon
            Enabled         =   0   'False
            Height          =   480
            Index           =   12
            Left            =   4320
            Picture         =   DATES.FRX:7484
            Top             =   1560
            Visible         =   0   'False
            Width           =   480
         End
         Begin Image EventIcon
            Enabled         =   0   'False
            Height          =   480
            Index           =   8
            Left            =   1080
            Picture         =   DATES.FRX:7786
            Top             =   1560
            Visible         =   0   'False
            Width           =   480
         End
         Begin Image EventIcon
            Enabled         =   0   'False
            Height          =   480
            Index           =   7
            Left            =   240
            Picture         =   DATES.FRX:7A88
            Top             =   1560
            Visible         =   0   'False
            Width           =   480
         End
         Begin Image EventIcon
            Enabled         =   0   'False
            Height          =   495
            Index           =   3
            Left            =   2640
            Picture         =   DATES.FRX:7D8A
```

```
            Stretch         =   -1    'True
            Top             =   880
            Visible         =   0     'False
            Width           =   495
         End
      End
      Begin SSCommand Return
         Caption         =   "&Return"
         Height          =   972
         Left            =   8040
         Picture         =   DATES.FRX:808C
         TabIndex        =   0
         Top             =   4080
         Width           =   1092
      End
      Begin Image SourceIcon
         Height          =   480
         Index           =   8
         Left            =   8880
         Picture         =   DATES.FRX:838E
         Top             =   0
         Visible         =   0     'False
         Width           =   480
      End
      Begin Image SourceIcon
         Height          =   480
         Index           =   7
         Left            =   8520
         Picture         =   DATES.FRX:8690
         Top             =   0
         Visible         =   0     'False
         Width           =   480
      End
      Begin Image SourceIcon
         Height          =   480
         Index           =   5
         Left            =   7680
         Picture         =   DATES.FRX:8992
         Top             =   0
         Visible         =   0     'False
         Width           =   480
      End
      Begin Image SourceIcon
         Height          =   480
         Index           =   4
         Left            =   7200
         Picture         =   DATES.FRX:8C94
         Top             =   0
         Visible         =   0     'False
         Width           =   480
      End
      Begin Image SourceIcon
         Height          =   480
         Index           =   6
         Left            =   8160
         Picture         =   DATES.FRX:8F96
         Top             =   0
         Visible         =   0     'False
         Width           =   480
      End
      Begin Image SourceIcon
         Height          =   480
         Index           =   3
         Left            =   6720
```

```
            Picture         =   DATES.FRX:9298
            Top             =   0
            Visible         =   0   'False
            Width           =   480
         End
         Begin Image SourceIcon
            Height          =   480
            Index           =   2
            Left            =   6240
            Picture         =   DATES.FRX:959A
            Top             =   0
            Visible         =   0   'False
            Width           =   480
         End
         Begin Image SourceIcon
            Height          =   480
            Index           =   1
            Left            =   5760
            Picture         =   DATES.FRX:989C
            Top             =   0
            Visible         =   0   'False
            Width           =   480
         End
         Begin Image SourceIcon
            Height          =   480
            Index           =   0
            Left            =   5280
            Picture         =   DATES.FRX:9B9E
            Top             =   0
            Visible         =   0   'False
            Width           =   480
         End
         Begin Image Image1
            Height          =   375
            Index           =   1
            Left            =   2160
            Top             =   2640
            Width           =   375
         End
      End
End
Dim StartIndex As Integer Sub CalculateStartIndex ()
  'Generate correct index number for date fed into function
  StartIndex = Calendar.WeekDay - 1

'Generate icons for each month
  Select Case Calendar.Year
  Case 1993
    Select Case Calendar.Month
    Case 12
      'Load images
      EventIcon(StartIndex + 1).Picture = SourceIcon(1).Picture
      EventIcon(StartIndex + 5).Picture = SourceIcon(1).Picture
      EventIcon(StartIndex + 6).Picture = SourceIcon(1).Picture
      EventIcon(StartIndex + 10).Picture = SourceIcon(3).Picture
      EventIcon(StartIndex + 22).Picture = SourceIcon(0).Picture
      EventIcon(StartIndex + 25).Picture = SourceIcon(2).Picture
      'Make icons visible
      EventIcon(StartIndex + 1).Visible = True
      EventIcon(StartIndex + 5).Visible = True
      EventIcon(StartIndex + 6).Visible = True
      EventIcon(StartIndex + 10).Visible = True
      EventIcon(StartIndex + 22).Visible = True
```

```
      EventIcon(StartIndex + 25).Visible = True
    End Select
  Case 1994
    Select Case Calendar.Month
      Case 1
        EventIcon(StartIndex + 1).Picture = SourceIcon(4).Picture
        EventIcon(StartIndex + 1).Visible = True
      Case 2
        EventIcon(StartIndex + 14).Picture = SourceIcon(5).Picture
        EventIcon(StartIndex + 14).Visible = True
      Case 3
        EventIcon(StartIndex + 17).Picture = SourceIcon(6).Picture
        EventIcon(StartIndex + 17).Visible = True
      Case 4
        EventIcon(StartIndex + 3).Visible = True
        EventIcon(StartIndex + 3).Picture = SourceIcon(7).Picture
      Case 5
        EventIcon(StartIndex + 8).Picture = SourceIcon(8).Picture
        EventIcon(StartIndex + 8).Visible = True
    End Select
End Select End Sub Sub Calendar_Click ()
  'Update heading for card list
  MonthValue.Text = Calendar.MonthText & " " & Calendar.Day & ":"
  ListCards
End Sub Sub Calendar_MonthChange ()
  'Set day to always be 1 when month changes
  Calendar.Day = 1

'Turn off whatever EventIcons are on
  Dim IndexNumber As Integer
  For IndexNumber = 0 To 41 Step 1
    If EventIcon(IndexNumber).Visible = True Then
      EventIcon(IndexNumber).Visible = False
    Else EventIcon(IndexNumber).Visible = False
    End If
  Next IndexNumber 'Clear the CardList
    'CardList.Clear 'Calculate what index number corresponds to first day-of-week of month
  CalculateStartIndex 'Assign and make visible icons for individual months (the integer in the expression (StartIndex
+ x) is the day of the month)
End Sub Sub CardList_DblClick ()
  Load Cards
  Unload Dates
End Sub Sub Command3D1_Click ()
  Load Cards
  Unload Dates
End Sub Sub Form_Load ()
```

INTOUCH.DOC printed 5/3/94

```
'Set initial month to December, initial day to 1st
Calendar.Day = 1
Calendar.Month = 12

'Link cards date to calendar
MonthValue.Text = Calendar.MonthText & " " & Calendar.Day & ":"

'Calculate what index number corresponds to first day-of-week of month
CalculateStartIndex 'Show initial card listing
ListCards
```
End Sub

Sub ListCards ()
```
  'Clear all text from the tree
  CardList.ClearBox = 0

'Set the number of fonts the tree will use
  CardList.Fonts = 2

'Define a second non-bold font for the card recipients
  CardList.FontNameArr(1) = "MS Sans Serif"
  CardList.FontSizeArr(1) = 8.25
  CardList.FontBoldArr(1) = False Select Case Calendar.Month
    Case 12
      Select Case Calendar.Day
        Case 1
          'Load the tree control
          CardList.ListFontIndex(0) = 0
          CardList.AddItem "Birthday", 0
          CardList.ListFontIndex(1) = 1
          CardList.AddItem "   Jessica Vant", 1
          CardList.AddItem "   Terry", 2
        Case 5
          CardList.ListFontIndex(0) = 0
          CardList.AddItem "Birthday", 0
          CardList.ListFontIndex(1) = 1
          CardList.AddItem "   Brad", 1
          CardList.AddItem "   Hillary", 2
        Case 6
          CardList.ListFontIndex(0) = 0
          CardList.AddItem "Birthday", 0
          CardList.ListFontIndex(1) = 1
          CardList.AddItem "   Mother-in-law", 1
        Case 10
          CardList.ListFontIndex(0) = 0
          CardList.AddItem "Special", 0
          CardList.ListFontIndex(1) = 1
          CardList.AddItem "   Santa Claus", 1
        Case 22
          CardList.ListFontIndex(0) = 0
          CardList.AddItem "House", 0
          CardList.ListFontIndex(1) = 1
          CardList.AddItem "   Mr. & Mrs. Lee Crabtree", 1
        Case 25
          CardList.ListFontIndex(0) = 0
          CardList.AddItem "Christmas", 0
          CardList.ListFontIndex(1) = 1
          CardList.AddItem "   Trayce & Mark Dolemba", 1
          CardList.AddItem "   Doug Dowell", 2
```

```
                CardList.AddItem "   Marta Lamb", 3
                CardList.AddItem "   Sarah Orange", 4
                CardList.AddItem "   Jim Vestel", 5
                CardList.AddItem "   Erica Tipps", 6
        End Select
    End Select
End Sub Sub Mh3dCalendar1_Click ()
    'If Mh3dCalendar1.Day = 23 Then
       'Text1(2).Visible = True
    'Else Text1(2).Visible = False
       'If Mh3dCalendar1.Day = 14 Then
          'Text1(1).Visible = True
       'Else Text1(1).Visible = False
          'If Mh3dCalendar1.Day = 7 Then
             'Text1(0).Visible = True
          'Else Text1(0).Visible = False
          'End If
       'End If
    'End If
    'Text3(0).Text = Calendar.Day + ":"
    'Text4.Text = Mh3dCalendar1.MonthText
    'If Mh3dCalendar1.Day = 7 Then
       'Text5(0).Text = "Joan of Arc"
       'Text5(1).Text = "Jerry Lewis"
       'Text5(2).Text = "Lyle and Julia"
       'Text5(3).Text = "Ron and Nancy"
    'Else
       'If Mh3dCalendar1.Day = 14 Then
          'Text5(0).Text = "Charlemagne"
          'Text5(1).Text = "Norm Crosby"
          'Text5(2).Text = "Steve and Edie"
          'Text5(3).Text = "Desi and Lucy"
       'Else
          'If Mh3dCalendar1.Day = 23 Then
             'Text5(0).Text = "Albert Camus"
             'Text5(1).Text = "Dorothy Parker"
             'Text5(2).Text = "John and Yoko"
             'Text5(3).Text = "Woody and Mia"
          'Else
          'Text5(0) = ""
          'Text5(1) = ""
          'Text5(2) = ""
          'Text5(3) = ""
          'End If
       'End If
    'End If
End Sub Sub Return_Click ()
    Unload Dates
End Sub Sub SelectCards_Click ()
    Load Cards
    Unload Dates
End Sub
```

MAINMENU.FRM

VERSION 2.00
Begin MDIForm MainMenu

INTOUCH.DOC printed 5/3/94

52

```
Caption          =   "CardXpress"
ClientHeight     =   6540
ClientLeft       =   60
ClientTop        =   930
ClientWidth      =   9495
Height           =   7230
Left             =   0
LinkTopic        =   "MDIForm1"
ScrollBars       =   0   'False
Top              =   300
Width            =   9615
Begin PictureBox Picture1
   Align         =   1   'Align Top
   BackColor     =   &H00C0C0C0&
   Height        =   855
   Left          =   0
   ScaleHeight   =   825
   ScaleWidth    =   9465
   TabIndex      =   0
   Top           =   0
   Width         =   9495
   Begin SSCommand Command3D11
      Caption    =   "History"
      Height     =   855
      Left       =   5040
      Picture    =   MAINMENU.FRX:0000
      TabIndex   =   12
      Top        =   0
      Width      =   855
   End
   Begin PictureBox Picture2
      Height     =   5175
      Left       =   0
      ScaleHeight=   5145
      ScaleWidth =   8865
      TabIndex   =   11
      Top        =   840
      Width      =   8895
   End
   Begin SSCommand Command3D10
      Caption    =   "Lists"
      Height     =   855
      Left       =   4200
      Picture    =   MAINMENU.FRX:0302
      TabIndex   =   10
      Top        =   0
      Width      =   855
   End
   Begin SSCommand Command3D9
      Caption    =   "Invoice"
      Height     =   855
      Left       =   3360
      Picture    =   MAINMENU.FRX:0604
      TabIndex   =   9
      Top        =   0
      Width      =   855
   End
   Begin SSCommand Command3D8
      Caption    =   "Send"
      Height     =   855
      Left       =   2520
      Picture    =   MAINMENU.FRX:0906
      TabIndex   =   8
      Top        =   0
```

INTOUCH.DOC printed 5/3/94

```
            Width           =   855
         End
         Begin SSCommand Command3D7
            Caption         =   "Cards"
            Height          =   855
            Left            =   1680
            Picture         =   MAINMENU.FRX:0C08
            TabIndex        =   7
            Top             =   0
            Width           =   855
         End
         Begin SSCommand Command3D6
            Caption         =   "Dates"
            Height          =   855
            Left            =   840
            Picture         =   MAINMENU.FRX:0F0A
            TabIndex        =   6
            Top             =   0
            Width           =   855
         End
         Begin CommonDialog CMDialog1
            Flags           =   8
            InitDir         =   "contack"
            Left            =   7800
            Top             =   120
         End
         Begin SSCommand Command3D5
            Caption         =   "Names"
            Height          =   855
            Left            =   0
            Picture         =   MAINMENU.FRX:120C
            TabIndex        =   5
            Top             =   0
            Width           =   855
         End
         Begin SSCommand Command3D4
            Caption         =   "Exit"
            Height          =   855
            Left            =   7800
            Picture         =   MAINMENU.FRX:150E
            TabIndex        =   4
            Top             =   0
            Width           =   855
         End
         Begin SSCommand Command3D3
            Caption         =   "Save"
            Height          =   855
            Left            =   6960
            Picture         =   MAINMENU.FRX:1810
            TabIndex        =   3
            Top             =   0
            Width           =   855
         End
         Begin SSCommand Command3D2
            Caption         =   "Print"
            Height          =   855
            Left            =   6120
            Picture         =   MAINMENU.FRX:1B12
            TabIndex        =   2
            Top             =   0
            Width           =   855
         End
         Begin SSCommand Command3D1
            Caption         =   "Help"
```

INTOUCH.DOC printed 5/3/94

```
            Height          =    855
            Left            =    8640
            Picture         =    MAINMENU.FRX:1E14
            TabIndex        =    1
            Top             =    0
            Width           =    855
        End
    End
    Begin Menu FileMenu
        Caption         =    "&File"
        Begin Menu FileNew
            Caption         =    "&New"
            Shortcut        =    {F2}
        End
        Begin Menu FileOpen
            Caption         =    "&Open"
        End
        Begin Menu FileClose
            Caption         =    "&Close"
        End
        Begin Menu FileSave
            Caption         =    "&Save"
            Shortcut        =    ^S
        End
        Begin Menu FileSeparator3
            Caption         =    "-"
        End
        Begin Menu FileImport
            Caption         =    "&Import"
            Begin Menu FileImport123
                Caption         =    "1-2-3"
            End
            Begin Menu FileImportAct
                Caption         =    "ACT!"
            End
            Begin Menu FileImportASCII
                Caption         =    "ASCII"
            End
            Begin Menu FileImportdBASE
                Caption         =    "dBASE"
            End
            Begin Menu FileImportLotusOrganizer
                Caption         =    "Lotus Organizer"
            End
            Begin Menu FileImportWindowsCardfile
                Caption         =    "Windows Cardfile"
            End
        End
        Begin Menu FileExport
            Caption         =    "&Export"
            Begin Menu FileExport123
                Caption         =    "1-2-3"
            End
            Begin Menu FileExportAct
                Caption         =    "ACT!"
            End
            Begin Menu FileExportASCII
                Caption         =    "ASCII"
            End
            Begin Menu FileExportdBASE
                Caption         =    "dBASE"
            End
            Begin Menu FileExportLotusOrganizer
                Caption         =    "Lotus Organizer"
```

```
        End
        Begin Menu FileExportWindowsCardfile
            Caption         =   "Windows Cardfile"
        End
    End
    Begin Menu FileSeparator
        Caption         =   "-"
    End
    Begin Menu FilePrintSetup
        Caption         =   "Prin&t Setup"
    End
    Begin Menu FilePrint
        Caption         =   "&Print"
        Shortcut        =   ^P
    End
    Begin Menu FileSeparator2
        Caption         =   "-"
    End
    Begin Menu FileExit
        Caption         =   "E&xit"
    End
End
Begin Menu EditMenu
    Caption         =   "&Edit"
    Begin Menu EditPaste
        Caption         =   "Paste"
        Shortcut        =   ^V
    End
    Begin Menu EditCut
        Caption         =   "Cut"
        Shortcut        =   ^X
    End
    Begin Menu EditCopy
        Caption         =   "Copy"
        Shortcut        =   ^C
    End
End
Begin Menu OptionsMenu
    Caption         =   "&Options"
    Begin Menu OptionsCardMaintenance
        Caption         =   "&Card Maintenance"
    End
    Begin Menu OptionsShipSettings
        Caption         =   "&Ship Settings"
    End
End
Begin Menu WindowMenu
    Caption         =   "&Window"
    Begin Menu WindowNames
        Caption         =   "&Names"
    End
    Begin Menu WindowDates
        Caption         =   "&Dates"
    End
    Begin Menu WindowCards
        Caption         =   "&Cards"
    End
    Begin Menu WindowSend
        Caption         =   "&Send"
    End
    Begin Menu WindowInvoice
        Caption         =   "&Invoice"
    End
    Begin Menu WindowLists
```

```
            Caption         =   "&Lists"
         End
      End
      Begin Menu HelpMenu
         Caption         =   "&Help"
         Begin Menu HelpAbout
            Caption         =   "&About the program"
         End
         Begin Menu HelpUsing
            Caption         =   "&Using the program"
            Shortcut        =   {F1}
         End
      End
   End
End
Option Explicit Sub Command3D1_Click ()
  'Invoke windows help
  CMDialog1.Action = 6
End Sub Sub Command3D10_Click ()
  SendList.Show
End Sub Sub Command3D2_Click ()
  'Invoke print dialog box
  CMDialog1.Action = 5
End Sub Sub Command3D3_Click ()
  'Invoke file save as dialog box
  CMDialog1.Action = 2
End Sub Sub Command3D4_Click ()
  End
End Sub Sub Command3D5_Click ()
  Names.Show
End Sub Sub Command3D6_Click ()
  Dates.Show
End Sub Sub Command3D7_Click ()
  Cards.Show
End Sub Sub Command3D8_Click ()
  Order.Show
End Sub Sub Command3D9_Click ()
  OrderSum.Show
End Sub Sub Exit_Click ()
  End
End Sub Sub FileExit_Click ()
  End
```

INTOUCH.DOC printed 5/3/94

```
End Sub

Sub FileOpen_Click ()
  'Invoke the file open dialog
  CMDialog1.Action = 1
End Sub Sub FilePrint_Click ()
  'Invoke the print dialog box
  CMDialog1.Action = 5
End Sub Sub FileSave_Click ()
  'Invoke Windows file save as dialog
  CMDialog1.Action = 2
End Sub Sub Form_Load ()
  'ChDir "j:\vbwin30\contack"
  'Store current directory (so we can reset this after open file dialogs, etc.)
  'StartupCurDir = CurDir$
  'MsgBox StartupCurDir  'StartupCurDir'
End Sub Sub Help_Click ()
  'Invoke Windows help engine
  CMDialog1.Action = 6
End Sub Sub HelpUsing_Click ()
  'Invoke the Windows help engine
  CMDialog1.Action = 6
End Sub Sub MDIForm_Load ()
  Mainmenu.Top = 0
  Mainmenu.Left = 0
  Choices.Show
End Sub Sub OptionsCardMaintenance_Click ()
  CardMaintenance.Show
End Sub Sub Panel3D1_Click ()
  Load Names
End Sub Sub Panel3D2_Click ()
  Load Dates
End Sub Sub Panel3D3_Click ()
  Cards.Show
End Sub Sub Panel3D4_Click ()
  Order.Show
End Sub Sub Panel3D6_Click ()
  OrderSum.Show
End Sub Sub Panel3D7_Click ()
```

INTOUCH.DOC printed 5/3/94

58

```
        SendList.Show
End Sub

Sub WindowCards_Click ()
    Cards.Show
End Sub

Sub WindowDates_Click ()
    Dates.Show
End Sub

Sub WindowInvoice_Click ()
    OrderSum.Show
End Sub

Sub WindowLists_Click ()
    SendList.Show
End Sub

Sub WindowNames_Click ()
    Names.Show
End Sub

Sub WindowOrder_Click ()
    Order.Show
End Sub

Sub WindowReviewOrder_Click ()
    OrderSum.Show
End Sub

Sub WindowReviewSendList_Click ()
    SendList.Show
End Sub

Sub WindowSend_Click ()
    Order.Show
End Sub
```

NAMES.FRM

```
VERSION 2.00
Begin Form Names
    BackColor       =   &H00E0FFFF&
    Caption         =   "Names"
    ClientHeight    =   5280
    ClientLeft      =   75
    ClientTop       =   1845
    ClientWidth     =   9465
    Height          =   5685
    Left            =   15
    LinkTopic       =   "Form2"
    MDIChild        =   -1  'True
    ScaleHeight     =   5280
    ScaleWidth      =   9465
    Top             =   1500
    Width           =   9585
    Begin Frame Events
        Caption     =   "Events"
        Height      =   4455
        Left        =   4920
        TabIndex    =   53
        Top         =   480
        Visible     =   0   'False
```

INTOUCH.DOC printed 5/3/94

```
    Width           =   3255
Begin DB_TextClass DBAnniversaryStatus
    BorderStyle     =   1   'Fixed Single
    Height          =   255
    Left            =   2280
    MultiLine       =   0   'False
    pChanged        =   0   'False
    pFormatString   =   ""
    pQBECase        =   0   'Case Sensitive
    pQBEValue       =   ""
    pQueryExpr      =   "ANNIVSTATU"
    pQueryName      =   "CurrNameQuery"
    pRecState       =   0
    ScrollBars      =   0   'None
    TabIndex        =   80
    Text            =   "DB_Text1"
    Top             =   2280
    Visible         =   0   'False
    Width           =   255
End
Begin DB_TextClass DBBirthdayStatus
    BorderStyle     =   1   'Fixed Single
    Height          =   255
    Left            =   2640
    MultiLine       =   0   'False
    pChanged        =   0   'False
    pFormatString   =   ""
    pQBECase        =   0   'Case Sensitive
    pQBEValue       =   ""
    pQueryExpr      =   "BIRTHSTATU"
    pQueryName      =   "CurrNameQuery"
    pRecState       =   0
    ScrollBars      =   0   'None
    TabIndex        =   79
    Text            =   "DB_Text1"
    Top             =   2280
    Visible         =   0   'False
    Width           =   255
End
Begin Frame Frame1
    Height          =   1095
    Left            =   720
    TabIndex        =   70
    Top             =   2640
    Width           =   1935
    Begin MhMultiple MhMultiple1
        Autosize    =   -1  'True
        AutoSwitch  =   0   'No 'auto' switching
        Height      =   225
        Index       =   3
        Left        =   120
        Style       =   1   'Large Colored Buttons
        TabIndex    =   74
        Top         =   600
        Value       =   2   'Go / Green
        Width       =   225
    End
    Begin MhMultiple MhMultiple1
        Autosize    =   -1  'True
        AutoSwitch  =   0   'No 'auto' switching
        Height      =   225
        Index       =   2
        Left        =   120
        Style       =   1   'Large Colored Buttons
```

60

```
        TabIndex        =   73
        Top             =   360
        Value           =   1   'Warning / Yellow
        Width           =   225
     End
     Begin MhMultiple MhMultiple1
        Autosize        =   -1  'True
        AutoSwitch      =   0   'No 'auto' switching
        Height          =   225
        Index           =   1
        Left            =   120
        Style           =   1   'Large Colored Buttons
        TabIndex        =   72
        Top             =   120
        Width           =   225
     End
     Begin MhMultiple MhMultiple1
        Autosize        =   -1  'True
        AutoSwitch      =   0   'No 'auto' switching
        Height          =   225
        Index           =   0
        Left            =   120
        Style           =   1   'Large Colored Buttons
        TabIndex        =   71
        Top             =   840
        Value           =   3   ''Greyed' out
        Width           =   225
     End
     Begin Label Label2
        Caption         =   "= Idle"
        Height          =   245
        Index           =   3
        Left            =   480
        TabIndex        =   78
        Top             =   840
        Width           =   975
     End
     Begin Label Label2
        Caption         =   "= Card Ordered"
        Height          =   255
        Index           =   2
        Left            =   480
        TabIndex        =   77
        Top             =   600
        Width           =   1335
     End
     Begin Label Label2
        Caption         =   "= Send List"
        Height          =   255
        Index           =   1
        Left            =   480
        TabIndex        =   76
        Top             =   360
        Width           =   975
     End
     Begin Label Label2
        Caption         =   "= Late"
        Height          =   255
        Index           =   0
        Left            =   480
        TabIndex        =   75
        Top             =   120
        Width           =   975
     End
```

INTOUCH.DOC printed 5/3/94

```
        End
        Begin TextBox Text1
            Height          =   285
            Left            =   1320
            TabIndex        =   67
            Text            =   "9/18/65"
            Top             =   1200
            Width           =   1095
        End
        Begin MhMultiple Status
            AutoSwitch      =   0   'No 'auto' switching
            Height          =   225
            Index           =   2
            Left            =   2760
            Style           =   1   'Large Colored Buttons
            TabIndex        =   66
            Top             =   1200
            Value           =   3   ''Greyed' out
            Width           =   225
        End
        Begin MhMultiple Status
            AutoSwitch      =   0   'No 'auto' switching
            Height          =   225
            Index           =   1
            Left            =   2760
            Style           =   1   'Large Colored Buttons
            TabIndex        =   65
            Top             =   960
            Value           =   1   'Warning / Yellow
            Width           =   225
        End
        Begin MhMultiple Status
            AutoSwitch      =   0   'No 'auto' switching
            Height          =   225
            Index           =   0
            Left            =   2760
            Style           =   1   'Large Colored Buttons
            TabIndex        =   64
            Top             =   720
            Value           =   2   'Go / Green
            Width           =   225
        End
        Begin CommandButton Command2
            Caption         =   "Hide events for this name"
            Enabled         =   0   'False
            Height          =   375
            Index           =   2
            Left            =   360
            TabIndex        =   62
            Top             =   3960
            Visible         =   0   'False
            Width           =   2415
        End
        Begin DB_TextClass Birthday
            BorderStyle     =   1   'Fixed Single
            Height          =   255
            Index           =   0
            Left            =   1320
            MultiLine       =   0   'False
            pChanged        =   0   'False
            pFormatString   =   ""
            pQBECase        =   0   'Case Sensitive
            pQBEValue       =   ""
            pQueryExpr      =   "BIRTHDATE"
```

INTOUCH.DOC printed 5/3/94

```
            pQueryName      =   "CurrNameQuery"
            pRecState       =   0
            ScrollBars      =   0   'None
            TabIndex        =   55
            Text            =   ""
            Top             =   720
            Width           =   1095
         End
         Begin DB_TextClass Anniversary
            BorderStyle     =   1   'Fixed Single
            Height          =   255
            Index           =   0
            Left            =   1320
            MultiLine       =   0   'False
            pChanged        =   0   'False
            pFormatString   =   ""
            pQBECase        =   0   'Case Sensitive
            pQBEValue       =   ""
            pQueryExpr      =   "ANNIVERSAR"
            pQueryName      =   "CurrNameQuery"
            pRecState       =   0
            ScrollBars      =   0   'None
            TabIndex        =   54
            Text            =   ""
            Top             =   960
            Width           =   1095
         End
         Begin Label Label1
            Caption         =   "Graduation"
            Height          =   255
            Left            =   240
            TabIndex        =   63
            Top             =   1250
            Width           =   1095
         End
         Begin Label BirthdayLabel
            Caption         =   "Status"
            FontBold        =   -1  'True
            FontItalic      =   0   'False
            FontName        =   "MS Sans Serif"
            FontSize        =   8.25
            FontStrikethru  =   0   'False
            FontUnderline   =   -1  'True
            Height          =   255
            Index           =   4
            Left            =   2520
            TabIndex        =   59
            Top             =   360
            Width           =   615
         End
         Begin Label BirthdayLabel
            Caption         =   "Date"
            FontBold        =   -1  'True
            FontItalic      =   0   'False
            FontName        =   "MS Sans Serif"
            FontSize        =   8.25
            FontStrikethru  =   0   'False
            FontUnderline   =   -1  'True
            Height          =   255
            Index           =   3
            Left            =   1320
            TabIndex        =   57
            Top             =   360
            Width           =   1095
```

INTOUCH.DOC printed 5/3/94

63

```
            End
            Begin Label BirthdayLabel
                Caption         =   "Event"
                FontBold        =   -1  'True
                FontItalic      =   0   'False
                FontName        =   "MS Sans Serif"
                FontSize        =   8.25
                FontStrikethru  =   0   'False
                FontUnderline   =   -1  'True
                Height          =   255
                Index           =   2
                Left            =   240
                TabIndex        =   56
                Top             =   360
                Width           =   1095
            End
            Begin Label BirthdayLabel
                Caption         =   "Birthday"
                Height          =   255
                Index           =   0
                Left            =   240
                TabIndex        =   50
                Top             =   720
                Width           =   1095
            End
            Begin Label AnniversaryLabel
                Caption         =   "Anniversary"
                Height          =   255
                Index           =   0
                Left            =   240
                TabIndex        =   51
                Top             =   990
                Width           =   1095
            End
        End
    End
    Begin DB_TextClass DBCurrTab
        BorderStyle     =   1   'Fixed Single
        Enabled         =   0   'False
        Height          =   255
        Left            =   120
        MultiLine       =   0   'False
        pChanged        =   0   'False
        pFormatString   =   ""
        pQBECase        =   0   'Case Sensitive
        pQBEValue       =   ""
        pQueryExpr      =   ""
        pQueryName      =   ""
        pRecState       =   0
        ScrollBars      =   0   'None
        TabIndex        =   49
        Text            =   ""
        Top             =   3360
        Visible         =   0   'False
        Width           =   255
    End
    Begin ConnectClass Connect1
        Height          =   495
        Left            =   8280
        pAutoLogon      =   -1  'True
        pErrorOption    =   0   'Display All Errors
        pLogonInfo      =   ""
        pLogonOption    =   0   'Display logon dialog box on error
        pSource         =   "dBASEFile"
        Top             =   0
```

INTOUCH.DOC printed 5/3/94

```
        Width           =   1215
    End
    Begin QueryClass NameQuery
        Height          =   495
        Left            =   8280
        pConnectName    =   "Connect1"
        pDistinct       =   0    'False
        pErrorOption    =   0    'Display All Errors
        pHDBC           =   0
        pHSTMT          =   0
        pRandEnabled    =   0    'False
        pRecCount       =   1539251486
        pRecNumber      =   -1
        pRowIndex       =   0
        pTables         =   "NAME.DBF NAME1"
        pTranPending    =   0    'False
        pVersion        =   2
        pWhere          =   " ORDER BY LASTNAME, FIRSTNAME"
        Top             =   480
        Width           =   1215
    End
    Begin QueryClass CurrNameQuery
        Height          =   495
        Left            =   8280
        pConnectName    =   "Connect1"
        pDistinct       =   0    'False
        pErrorOption    =   0    'Display All Errors
        pHDBC           =   0
        pHSTMT          =   0
        pRandEnabled    =   0    'False
        pRecCount       =   1539251486
        pRecNumber      =   -1
        pRowIndex       =   0
        pTables         =   "NAME.DBF NAME1"
        pTranPending    =   0    'False
        pVersion        =   2
        pWhere          =   ""
        Top             =   960
        Width           =   1215
    End
    Begin VideoSoftIndexTab VSIndexTab2
        AutoScroll      =   -1   'True
        AutoSwitch      =   -1   'True
        BackColor       =   &H00404040&
        BackTabColor    =   &H00C0C0C0&
        Caption         =   "N|O|P|Q|R|S|T|U|V|W|X|Y|Z"
        CurrTab         =   0
        FirstTab        =   0
        FontBold        =   -1   'True
        FontItalic      =   0    'False
        FontName        =   "Arial"
        FontSize        =   7.5
        FontStrikethru  =   0    'False
        FontUnderline   =   0    'False
        ForeColor       =   &H00FF0000&
        FrontTabColor   =   &H00FFFFFF&
        Height          =   4455
        Left            =   5040
        Position        =   3    'Right (True Type fonts only)
        ShowFocusRect   =   -1   'True
        Style           =   2    'Rounded
        TabIndex        =   2
        Top             =   480
        Width           =   3495
```

INTOUCH.DOC printed 5/3/94

```
                                    65

Begin SSPanel Panel3D2
    BackColor       =   &H00FFFFFF&
    BevelInner      =   1  'Inset
    BevelWidth      =   0
    BorderWidth     =   0
    ForeColor       =   &H00000000&
    Height          =   4455
    Left            =   120
    TabIndex        =   4
    Top             =   0
    Width           =   3135
    Begin DB_ComboClass Relationship
        Height          =   300
        Index           =   1
        Left            =   1560
        pChanged        =   0  'False
        pFormatString   =   ""
        pListQExpr      =   ""
        pListQName      =   ""
        pQBECase        =   0  'Case Sensitive
        pQBEValue       =   ""
        pQueryExpr      =   "RELATIONSH"
        pQueryName      =   "CurrNameQuery"
        pRecState       =   0
        Sorted          =   0   'False
        Style           =   0   'Dropdown Combo
        TabIndex        =   69
        Top             =   2880
        Width           =   1455
    End
    Begin CommandButton Command2
        Caption         =   "Hide events for this name"
        Height          =   375
        Index           =   1
        Left            =   360
        TabIndex        =   61
        Top             =   3840
        Visible         =   0   'False
        Width           =   2415
    End
    Begin CommandButton Command1
        Caption         =   "Show events for this name"
        Height          =   375
        Index           =   1
        Left            =   360
        TabIndex        =   52
        Top             =   3960
        Visible         =   0   'False
        Width           =   2415
    End
    Begin DB_TextClass Notes
        BorderStyle     =   1   'Fixed Single
        Height          =   495
        Index           =   1
        Left            =   240
        MultiLine       =   -1  'True
        pChanged        =   0   'False
        pFormatString   =   ""
        pQBECase        =   0   'Case Sensitive
        pQBEValue       =   ""
        pQueryExpr      =   "NOTES"
        pQueryName      =   "CurrNameQuery"
        pRecState       =   0
        ScrollBars      =   2   'Vertical
```

INTOUCH.DOC printed 5/3/94

```
                                    66

TabIndex        =   45
        Text            =   ""
        Top             =   3360
        Width           =   2775
     End
     Begin DB_TextClass HomePhone
        BorderStyle     =   1   'Fixed Single
        Height          =   255
        Index           =   1
        Left            =   240
        MultiLine       =   0       'False
        pChanged        =   0       'False
        pFormatString   =   ""
        pQBECase        =   0       'Case Sensitive
        pQBEValue       =   ""
        pQueryExpr      =   "HOMEPHONE"
        pQueryName      =   "CurrNameQuery"
        pRecState       =   0
        ScrollBars      =   0       'None
        TabIndex        =   44
        Text            =   ""
        Top             =   2880
        Width           =   1215
     End
     Begin DB_TextClass Zip
        BorderStyle     =   1   'Fixed Single
        Height          =   255
        Index           =   1
        Left            =   2280
        MultiLine       =   0       'False
        pChanged        =   0       'False
        pFormatString   =   ""
        pQBECase        =   0       'Case Sensitive
        pQBEValue       =   ""
        pQueryExpr      =   "ZIP"
        pQueryName      =   "CurrNameQuery"
        pRecState       =   0
        ScrollBars      =   0       'None
        TabIndex        =   40
        Text            =   ""
        Top             =   2400
        Width           =   735
     End
     Begin DB_TextClass State
        BorderStyle     =   1   'Fixed Single
        Height          =   255
        Index           =   1
        Left            =   1800
        MultiLine       =   0       'False
        pChanged        =   0       'False
        pFormatString   =   ""
        pQBECase        =   0       'Case Sensitive
        pQBEValue       =   ""
        pQueryExpr      =   "STATE"
        pQueryName      =   "CurrNameQuery"
        pRecState       =   0
        ScrollBars      =   0       'None
        TabIndex        =   39
        Text            =   ""
        Top             =   2400
        Width           =   375
     End
     Begin DB_TextClass City
        BorderStyle     =   1   'Fixed Single
```

INTOUCH.DOC printed 5/3/94

```
                    Height          =   255
                    Index           =   1
                    Left            =   240
                    MultiLine       =   0   'False
                    pChanged        =   0   'False
                    pFormatString   =   ""
                    pQBECase        =   0   'Case Sensitive
                    pQBEValue       =   ""
                    pQueryExpr      =   "City"
                    pQueryName      =   "CurrNameQuery"
                    pRecState       =   0
                    ScrollBars      =   0   'None
                    TabIndex        =   38
                    Text            =   ""
                    Top             =   2400
                    Width           =   1455
                End
                Begin DB_TextClass Title
                    BorderStyle     =   1   'Fixed Single
                    Height          =   255
                    Index           =   1
                    Left            =   240
                    MultiLine       =   0   'False
                    pChanged        =   0   'False
                    pFormatString   =   ""
                    pQBECase        =   0   'Case Sensitive
                    pQBEValue       =   ""
                    pQueryExpr      =   "TITLE"
                    pQueryName      =   "CurrNameQuery"
                    pRecState       =   0
                    ScrollBars      =   0   'None
                    TabIndex        =   32
                    Text            =   ""
                    Top             =   720
                    Width           =   2775
                End
                Begin DB_TextClass Company
                    BorderStyle     =   1   'Fixed Single
                    Height          =   255
                    Index           =   1
                    Left            =   240
                    MultiLine       =   0   'False
                    pChanged        =   0   'False
                    pFormatString   =   ""
                    pQBECase        =   0   'Case Sensitive
                    pQBEValue       =   ""
                    pQueryExpr      =   "Company"
                    pQueryName      =   "CurrNameQuery"
                    pRecState       =   0
                    ScrollBars      =   0   'None
                    TabIndex        =   31
                    Text            =   ""
                    Top             =   1200
                    Width           =   2775
                End
                Begin DB_TextClass Address2
                    BorderStyle     =   1   'Fixed Single
                    Height          =   255
                    Index           =   1
                    Left            =   240
                    MultiLine       =   0   'False
                    pChanged        =   0   'False
                    pFormatString   =   ""
                    pQBECase        =   0   'Case Sensitive
```

```
        pQBEValue       =   ""
        pQueryExpr      =   "Address2"
        pQueryName      =   "CurrNameQuery"
        pRecState       =   0
        ScrollBars      =   0   'None
        TabIndex        =   30
        Text            =   ""
        Top             =   1920
        Width           =   2775
    End
    Begin DB_TextClass Address1
        BorderStyle     =   1   'Fixed Single
        Height          =   255
        Index           =   1
        Left            =   240
        MultiLine       =   0   'False
        pChanged        =   0   'False
        pFormatString   =   ""
        pQBECase        =   0   'Case Sensitive
        pQBEValue       =   ""
        pQueryExpr      =   "Address1"
        pQueryName      =   "CurrNameQuery"
        pRecState       =   0
        ScrollBars      =   0   'None
        TabIndex        =   29
        Text            =   ""
        Top             =   1680
        Width           =   2775
    End
    Begin DB_TextClass FirstName
        BorderStyle     =   1   'Fixed Single
        Height          =   255
        Index           =   1
        Left            =   240
        MultiLine       =   0   'False
        pChanged        =   0   'False
        pFormatString   =   ""
        pQBECase        =   0   'Case Sensitive
        pQBEValue       =   ""
        pQueryExpr      =   "FIRSTNAME"
        pQueryName      =   "CurrNameQuery"
        pRecState       =   0
        ScrollBars      =   0   'None
        TabIndex        =   28
        Text            =   ""
        Top             =   240
        Width           =   1335
    End
    Begin DB_TextClass LastName
        BorderStyle     =   1   'Fixed Single
        Height          =   255
        Index           =   1
        Left            =   1680
        MultiLine       =   0   'False
        pChanged        =   0   'False
        pFormatString   =   ""
        pQBECase        =   0   'Case Sensitive
        pQBEValue       =   ""
        pQueryExpr      =   "LASTNAME"
        pQueryName      =   "CurrNameQuery"
        pRecState       =   0
        ScrollBars      =   0   'None
        TabIndex        =   27
        Text            =   ""
```

```
        Top             =   240
        Width           =   1335
     End
     Begin Label NotesLabel
        BackStyle       =   0  'Transparent
        Caption         =   "Notes"
        Height          =   255
        Index           =   1
        Left            =   240
        TabIndex        =   48
        Top             =   3120
        Width           =   1335
     End
     Begin Label WorkPhoneLabel
        BackStyle       =   0  'Transparent
        Caption         =   "Relationship"
        Height          =   255
        Index           =   1
        Left            =   1560
        TabIndex        =   47
        Top             =   2640
        Width           =   1335
     End
     Begin Label HomePhoneLabel
        BackStyle       =   0  'Transparent
        Caption         =   "Phone"
        Height          =   255
        Index           =   1
        Left            =   240
        TabIndex        =   46
        Top             =   2640
        Width           =   1335
     End
     Begin Label ZipLabel
        BackStyle       =   0  'Transparent
        Caption         =   "Zip"
        Height          =   255
        Index           =   1
        Left            =   2280
        TabIndex        =   43
        Top             =   2160
        Width           =   375
     End
     Begin Label StateLabel
        BackStyle       =   0  'Transparent
        Caption         =   "State"
        Height          =   255
        Index           =   1
        Left            =   1680
        TabIndex        =   42
        Top             =   2160
        Width           =   495
     End
     Begin Label CityLabel
        BackStyle       =   0  'Transparent
        Caption         =   "City"
        Height          =   255
        Index           =   1
        Left            =   240
        TabIndex        =   41
        Top             =   2160
        Width           =   1335
     End
     Begin Label TitleLabel
```

```
                   BackStyle       =   0  'Transparent
                   Caption         =   "Title"
                   Height          =   255
                   Index           =   1
                   Left            =   240
                   TabIndex        =   37
                   Top             =   480
                   Width           =   1335
                End
                Begin Label CompanyLabel
                   BackStyle       =   0  'Transparent
                   Caption         =   "Company"
                   Height          =   255
                   Index           =   1
                   Left            =   240
                   TabIndex        =   36
                   Top             =   960
                   Width           =   1335
                End
                Begin Label AddressLabel
                   BackStyle       =   0  'Transparent
                   Caption         =   "Address"
                   Height          =   255
                   Index           =   1
                   Left            =   240
                   TabIndex        =   35
                   Top             =   1440
                   Width           =   1335
                End
                Begin Label FirstNameLabel
                   BackStyle       =   0  'Transparent
                   Caption         =   "First name"
                   Height          =   255
                   Index           =   1
                   Left            =   240
                   TabIndex        =   34
                   Top             =   0
                   Width           =   1335
                End
                Begin Label LastNameLabel
                   BackStyle       =   0  'Transparent
                   Caption         =   "Last name"
                   Height          =   255
                   Index           =   1
                   Left            =   1680
                   TabIndex        =   33
                   Top             =   0
                   Width           =   1335
                End
             End
          End
       End
       Begin VideoSoftIndexTab VSIndexTab1
          AutoScroll      =   -1  'True
          AutoSwitch      =   -1  'True
          BackColor       =   &H00616161&
          BackTabColor    =   &H00C0C0C0&
          Caption         =   "A|B|C|D|E|F|G|H|I|J|K|L|M"
          CurrTab         =   0
          FirstTab        =   0
          FontBold        =   -1  'True
          FontItalic      =   0   'False
          FontName        =   "Arial"
          FontSize        =   7.5
          FontStrikethru  =   0   'False
```

```
FontUnderline    =   0    'False
ForeColor        =   &H00FF0000&
FrontTabColor    =   &H00FFFFFF&
Height           =   4455
Left             =   480
Position         =   2    'Left (True Type fonts only)
ShowFocusRect    =   -1   'True
Style            =   2    'Rounded
TabIndex         =   1
Top              =   480
Width            =   3735
Begin SSPanel Panel3D1
   BackColor         =   &H00FFFFFF&
   BevelInner        =   1    'Inset
   BevelWidth        =   0
   BorderWidth       =   0
   ForeColor         =   &H00000000&
   Height            =   4455
   Left              =   360
   TabIndex          =   3
   Top               =   0
   Width             =   3008
   Begin DB_ComboClass Relationship
      Height            =   300
      Index             =   0
      Left              =   1440
      pChanged          =   0    'False
      pFormatString     =   ""
      pListQExpr        =   ""
      pListQName        =   ""
      pQBECase          =   0    'Case Sensitive
      pQBEValue         =   ""
      pQueryExpr        =   "RELATIONSH"
      pQueryName        =   "CurrNameQuery"
      pRecState         =   0
      Sorted            =   0    'False
      Style             =   0    'Dropdown Combo
      TabIndex          =   68
      Top               =   2880
      Width             =   1455
   End
   Begin CommandButton Command2
      Caption           =   "Hide events for this name"
      Height            =   375
      Index             =   0
      Left              =   240
      TabIndex          =   60
      Top               =   3960
      Visible           =   0    'False
      Width             =   2415
   End
   Begin CommandButton Command1
      Caption           =   "Show events for this name"
      Height            =   375
      Index             =   0
      Left              =   240
      TabIndex          =   58
      Top               =   3960
      Width             =   2415
   End
   Begin DB_TextClass LastName
      BorderStyle       =   1    'Fixed Single
      Height            =   255
      Index             =   0
```

```
              Left            =   1560
              MultiLine       =   0     'False
              pChanged        =   0     'False
              pFormatString   =   ""
              pQBECase        =   0     'Case Sensitive
              pQBEValue       =   ""
              pQueryExpr      =   "LASTNAME"
              pQueryName      =   "CurrNameQuery"
              pRecState       =   0
              ScrollBars      =   0     'None
              TabIndex        =   26
              Text            =   ""
              Top             =   240
              Width           =   1335
           End
           Begin DB_TextClass FirstName
              BorderStyle     =   1     'Fixed Single
              Height          =   255
              Index           =   0
              Left            =   120
              MultiLine       =   0     'False
              pChanged        =   0     'False
              pFormatString   =   ""
              pQBECase        =   0     'Case Sensitive
              pQBEValue       =   ""
              pQueryExpr      =   "FIRSTNAME"
              pQueryName      =   "CurrNameQuery"
              pRecState       =   0
              ScrollBars      =   0     'None
              TabIndex        =   23
              Text            =   ""
              Top             =   240
              Width           =   1335
           End
           Begin DB_TextClass Address1
              BorderStyle     =   1     'Fixed Single
              Height          =   255
              Index           =   0
              Left            =   120
              MultiLine       =   0     'False
              pChanged        =   0     'False
              pFormatString   =   ""
              pQBECase        =   0     'Case Sensitive
              pQBEValue       =   ""
              pQueryExpr      =   "Address1"
              pQueryName      =   "CurrNameQuery"
              pRecState       =   0
              ScrollBars      =   0     'None
              TabIndex        =   13
              Text            =   ""
              Top             =   1680
              Width           =   2775
           End
           Begin DB_TextClass Address2
              BorderStyle     =   1     'Fixed Single
              Height          =   255
              Index           =   0
              Left            =   120
              MultiLine       =   0     'False
              pChanged        =   0     'False
              pFormatString   =   ""
              pQBECase        =   0     'Case Sensitive
              pQBEValue       =   ""
              pQueryExpr      =   "Address2"
```

73

```
        pQueryName      =   "CurrNameQuery"
        pRecState       =   0
        ScrollBars      =   0   'None
        TabIndex        =   12
        Text            =   ""
        Top             =   1920
        Width           =   2775
    End
    Begin DB_TextClass City
        BorderStyle     =   1   'Fixed Single
        Height          =   255
        Index           =   0
        Left            =   120
        MultiLine       =   0   'False
        pChanged        =   0   'False
        pFormatString   =   ""
        pQBECase        =   0   'Case Sensitive
        pQBEValue       =   ""
        pQueryExpr      =   "City"
        pQueryName      =   "CurrNameQuery"
        pRecState       =   0
        ScrollBars      =   0   'None
        TabIndex        =   11
        Text            =   ""
        Top             =   2400
        Width           =   1455
    End
    Begin DB_TextClass Company
        BorderStyle     =   1   'Fixed Single
        Height          =   255
        Index           =   0
        Left            =   120
        MultiLine       =   0   'False
        pChanged        =   0   'False
        pFormatString   =   ""
        pQBECase        =   0   'Case Sensitive
        pQBEValue       =   ""
        pQueryExpr      =   "Company"
        pQueryName      =   "CurrNameQuery"
        pRecState       =   0
        ScrollBars      =   0   'None
        TabIndex        =   10
        Text            =   ""
        Top             =   1200
        Width           =   2775
    End
    Begin DB_TextClass Title
        BorderStyle     =   1   'Fixed Single
        Height          =   255
        Index           =   0
        Left            =   120
        MultiLine       =   0   'False
        pChanged        =   0   'False
        pFormatString   =   ""
        pQBECase        =   0   'Case Sensitive
        pQBEValue       =   ""
        pQueryExpr      =   "TITLE"
        pQueryName      =   "CurrNameQuery"
        pRecState       =   0
        ScrollBars      =   0   'None
        TabIndex        =   9
        Text            =   ""
        Top             =   720
        Width           =   2775
```

INTOUCH.DOC printed 5/3/94

```
                        74

End
            Begin DB_TextClass State
                BorderStyle     =   1   'Fixed Single
                Height          =   255
                Index           =   0
                Left            =   1680
                MultiLine       =   0    'False
                pChanged        =   0    'False
                pFormatString   =   ""
                pQBECase        =   0    'Case Sensitive
                pQBEValue       =   ""
                pQueryExpr      =   "STATE"
                pQueryName      =   "CurrNameQuery"
                pRecState       =   0
                ScrollBars      =   0    'None
                TabIndex        =   8
                Text            =   ""
                Top             =   2400
                Width           =   375
            End
            Begin DB_TextClass Zip
                BorderStyle     =   1   'Fixed Single
                Height          =   255
                Index           =   0
                Left            =   2160
                MultiLine       =   0    'False
                pChanged        =   0    'False
                pFormatString   =   ""
                pQBECase        =   0    'Case Sensitive
                pQBEValue       =   ""
                pQueryExpr      =   "ZIP"
                pQueryName      =   "CurrNameQuery"
                pRecState       =   0
                ScrollBars      =   0    'None
                TabIndex        =   7
                Text            =   ""
                Top             =   2400
                Width           =   735
            End
            Begin DB_TextClass HomePhone
                BorderStyle     =   1   'Fixed Single
                Height          =   255
                Index           =   0
                Left            =   120
                MultiLine       =   0    'False
                pChanged        =   0    'False
                pFormatString   =   ""
                pQBECase        =   0    'Case Sensitive
                pQBEValue       =   ""
                pQueryExpr      =   "HOMEPHONE"
                pQueryName      =   "CurrNameQuery"
                pRecState       =   0
                ScrollBars      =   0    'None
                TabIndex        =   6
                Text            =   ""
                Top             =   2880
                Width           =   1215
            End
            Begin DB_TextClass Notes
                BorderStyle     =   1   'Fixed Single
                Height          =   495
                Index           =   0
                Left            =   120
                MultiLine       =   -1   'True
```

INTOUCH.DOC printed 5/3/94

```
      pChanged        =   0    'False
      pFormatString   =   ""
      pQBECase        =   0    'Case Sensitive
      pQBEValue       =   ""
      pQueryExpr      =   "NOTES"
      pQueryName      =   "CurrNameQuery"
      pRecState       =   0
      ScrollBars      =   2    'Vertical
      TabIndex        =   5
      Text            =   ""
      Top             =   3360
      Width           =   2775
   End
   Begin Label LastNameLabel
      BackStyle       =   0    'Transparent
      Caption         =   "Last name"
      Height          =   255
      Index           =   0
      Left            =   1560
      TabIndex        =   25
      Top             =   0
      Width           =   1335
   End
   Begin Label FirstNameLabel
      BackStyle       =   0    'Transparent
      Caption         =   "First name"
      Height          =   255
      Index           =   0
      Left            =   120
      TabIndex        =   24
      Top             =   0
      Width           =   1335
   End
   Begin Label AddressLabel
      BackStyle       =   0    'Transparent
      Caption         =   "Address"
      Height          =   255
      Index           =   0
      Left            =   120
      TabIndex        =   22
      Top             =   1440
      Width           =   1335
   End
   Begin Label CityLabel
      BackStyle       =   0    'Transparent
      Caption         =   "City"
      Height          =   255
      Index           =   0
      Left            =   120
      TabIndex        =   21
      Top             =   2160
      Width           =   1335
   End
   Begin Label CompanyLabel
      BackStyle       =   0    'Transparent
      Caption         =   "Company"
      Height          =   255
      Index           =   0
      Left            =   120
      TabIndex        =   20
      Top             =   960
      Width           =   1335
   End
   Begin Label TitleLabel
```

```
                BackStyle       =   0  'Transparent
                Caption         =   "Title"
                Height          =   255
                Index           =   0
                Left            =   120
                TabIndex        =   19
                Top             =   480
                Width           =   1335
             End
             Begin Label StateLabel
                BackStyle       =   0  'Transparent
                Caption         =   "State"
                Height          =   255
                Index           =   0
                Left            =   1560
                TabIndex        =   18
                Top             =   2160
                Width           =   495
             End
             Begin Label ZipLabel
                BackStyle       =   0  'Transparent
                Caption         =   "Zip"
                Height          =   255
                Index           =   0
                Left            =   2160
                TabIndex        =   17
                Top             =   2160
                Width           =   375
             End
             Begin Label HomePhoneLabel
                BackStyle       =   0  'Transparent
                Caption         =   "Phone"
                Height          =   255
                Index           =   0
                Left            =   120
                TabIndex        =   16
                Top             =   2640
                Width           =   1335
             End
             Begin Label WorkPhoneLabel
                BackStyle       =   0  'Transparent
                Caption         =   "Relationship"
                Height          =   255
                Index           =   0
                Left            =   1440
                TabIndex        =   15
                Top             =   2640
                Width           =   1335
             End
             Begin Label NotesLabel
                BackStyle       =   0  'Transparent
                Caption         =   "Notes"
                Height          =   255
                Index           =   0
                Left            =   120
                TabIndex        =   14
                Top             =   3120
                Width           =   1335
             End
          End
       End
    End
    Begin SSCommand Return
       Caption         =   "&Return"
       Height          =   975
```

INTOUCH.DOC printed 5/3/94

```
         Left            =   8640
         Picture         =   NAMES.FRX:0000
         TabIndex        =   0
         Top             =   4200
         Width           =   735
      End
      Begin Image Image1
         Height          =   5175
         Left            =   480
         Picture         =   NAMES.FRX:0302
         Stretch         =   -1  'True
         Top             =   120
         Width           =   8895
      End
End Sub Command1_Click (Index As Integer)
  Select Case Index
    Case 0
      Events.Left = 5040
      Events.Top = 480
      Events.Visible = True
      'Command2(0).Enabled = True
      Command2(0).Visible = True
    Case 1
      Events.Left = 840
      Events.Top = 480
      Events.Visible = True
      ' Command2(1).Enabled = True
      Command2(1).Visible = True
  End Select
End Sub Sub Command2_Click (Index As Integer)
  'Make the events box appear and disappear
  Select Case Index
    Case 0
      Events.Visible = False
      Command2(0).Visible = False
    Case 1
      Events.Visible = False
      Command2(1).Visible = False
  End Select End Sub Sub DBCurrTab_Change ()
  CurrNameQuery.pWhere = "Lastname like '" + DBCurrTab.Text + "%'"

res% = fDoQuery(CurrNameQuery)
  res% = fEndQuery(CurrNameQuery)

End Sub

Sub Form_Load ()
  VSIndexTab1.FrontTabColor = &HFFFFFF
  VSIndexTab2.FrontTabColor = &HC0C0C0
  'rc% = fDoQuery(CurrNameQuery)
  DBCurrTab.Text = Chr(65)
  'rc% = fEndQuery(CurrNameQuery)

End Sub

'Sub Form_Unload (Cancel As Integer)

INTOUCH.DOC printed 5/3/94
```

78

```
    'rc% = fEndQuery(CurrNameQuery)
'End Sub
Sub Form_Unload (Cancel As Integer)
  Dim res As Integer 'If a query is active, end it.
  If CurrNameQuery.pMode = 1 Then
    res% = fEndQuery(CurrNameQuery)
  End If
End Sub Sub LastName_Change (Index As Integer)
  'CurrNameQuery.pWhere LastName
End Sub Sub Return_Click ()
  Unload Names
End Sub Sub Status_Click (Index As Integer)
  Unload Names
  Load Cards
End Sub Sub UpdateStatus ()
  'Make the status symbols for birthday and anniversary change colors
  If DBBirthdayStatus.Text = "" Then
    Status(0).Value = 3
  Else
    Select Case DBBirthdayStatus.Text
      Case 0
        Status(0).Value = 0
      Case 1
        Status(0).Value = 1
      Case 2
        Status(0).Value = 2
    End Select
  End If If DBAnniversaryStatus.Text = "" Then
    Status(1).Value = 3
  Else
    Select Case DBAnniversaryStatus.Text
      Case 0
        Status(1).Value = 0
      Case 1
        Status(1).Value = 1
      Case 2
        Status(1).Value = 2
    End Select
  End If
End Sub Sub VSIndexTab1_Click ()
  VSIndexTab1.FrontTabColor = &HFFFFFF
  VSIndexTab2.FrontTabColor = &HC0C0C0
  DBCurrTab.Text = Chr(VSIndexTab1.CurrTab + 65)

UpdateStatus
End Sub

Sub VSIndexTab2_Click ()
  VSIndexTab2.FrontTabColor = &HFFFFFF
  VSIndexTab1.FrontTabColor = &HC0C0C0
```

INTOUCH.DOC printed 5/3/94

```
  DBCurrTab.Text = Chr(VSIndexTab2.CurrTab + 78)
  UpdateStatus
End Sub
```

ORDER.FRM

```
VERSION 2.00
Begin Form Order
   BackColor       =   &H00E0FFFF&
   Caption         =   "Send"
   ClientHeight    =   5280
   ClientLeft      =   45
   ClientTop       =   1830
   ClientWidth     =   9465
   Height          =   5685
   Left            =   -15
   LinkTopic       =   "Form5"
   MDIChild        =   -1  'True
   ScaleHeight     =   5280
   ScaleWidth      =   9465
   Top             =   1485
   Width           =   9585
   Begin SSPanel Panel3D2
      BevelInner      =   1  'Inset
      BevelWidth      =   2
      Height          =   3372
      Left            =   6840
      TabIndex        =   2
      Top             =   1440
      Width           =   1092
      Begin Image Image2
         DragMode        =   1  'Automatic
         Height          =   852
         Left            =   120
         Picture         =   ORDER.FRX:0000
         Stretch         =   -1  'True
         Top             =   120
         Width           =   852
      End
      Begin Image Image3
         DragMode        =   1  'Automatic
         Height          =   972
         Left            =   120
         Picture         =   ORDER.FRX:027A
         Stretch         =   -1  'True
         Top             =   1080
         Width           =   852
      End
      Begin Image Image4
         DragMode        =   1  'Automatic
         Height          =   972
         Left            =   120
         Picture         =   ORDER.FRX:04F4
         Stretch         =   -1  'True
         Top             =   2160
         Width           =   852
      End
   End
   Begin SSCommand Command3D4
      Caption         =   "&Prev"
      Height          =   375
      Left            =   5160
      TabIndex        =   29
```

INTOUCH.DOC printed 5/3/94

```
            Top             =    4920
            Width           =    615
        End
        Begin SSCommand Command3D3
            Caption         =    "&Next"
            Height          =    375
            Left            =    5760
            TabIndex        =    28
            Top             =    4920
            Width           =    615
        End
        Begin SSCommand Command3D2
            Caption         =    "&Order"
            Height          =    855
            Left            =    8280
            TabIndex        =    27
            Top             =    3960
            Width           =    975
        End
        Begin SSCommand Font
            Caption         =    "&Font"
            Height          =    855
            Left            =    8280
            TabIndex        =    26
            Top             =    1440
            Width           =    975
        End
        Begin SSPanel Panel3D4
            BevelInner      =    1  'Inset
            BevelWidth      =    2
            Height          =    1215
            Left            =    6600
            TabIndex        =    20
            Top             =    120
            Width           =    2655
            Begin SSCheck GiftCertificate
                Caption         =    "Gift Certificate"
                Height          =    255
                Left            =    960
                TabIndex        =    24
                Top             =    600
                Width           =    1575
            End
            Begin SSCheck Donation
                Caption         =    "Donation"
                Height          =    255
                Left            =    960
                TabIndex        =    23
                Top             =    360
                Width           =    1095
            End
            Begin SSCheck Confetti
                Caption         =    "Confetti"
                Height          =    255
                Left            =    960
                TabIndex        =    22
                Top             =    120
                Width           =    975
            End
            Begin SSCheck Letter
                Caption         =    "Letter"
                Height          =    255
                Left            =    960
                TabIndex        =    21
```

```
            Top             =   840
            Width           =   1095
         End
         Begin Label Insert
            BackStyle       =   0  'Transparent
            Caption         =   "Insert:"
            Height          =   255
            Left            =   240
            TabIndex        =   25
            Top             =   480
            Width           =   615
            WordWrap        =   -1  'True
         End
      End
      Begin DB_TextClass DB_Text1
         BorderStyle     =   1  'Fixed Single
         Height          =   255
         Left            =   3720
         MultiLine       =   0  'False
         pChanged        =   0  'False
         pFormatString   =   ""
         pQBECase        =   0  'Case Sensitive
         pQBEValue       =   ""
         pQueryExpr      =   ""
         pQueryName      =   ""
         pRecState       =   0
         ScrollBars      =   0  'None
         TabIndex        =   19
         Text            =   "$1.75"
         Top             =   4890
         Width           =   615
      End
      Begin SSPanel Panel3D3
         BevelInner      =   1  'Inset
         BevelWidth      =   2
         Height          =   1212
         Left            =   240
         TabIndex        =   4
         Top             =   120
         Width           =   6132
         Begin SSOption SendTo
            Caption         =   "Sender"
            Height          =   255
            Index           =   1
            Left            =   1440
            TabIndex        =   18
            Top             =   600
            Width           =   1095
         End
         Begin SSOption SendTo
            Caption         =   "Recipient"
            Height          =   255
            Index           =   0
            Left            =   1440
            TabIndex        =   17
            Top             =   360
            Width           =   1095
         End
         Begin SSOption ShipVia
            Caption         =   "Mail"
            Height          =   252
            Index           =   0
            Left            =   3960
            TabIndex        =   8
```

```
            Top             =   240
            Width           =   972
        End
        Begin SSOption ShipVia
            Caption         =   "FedEx"
            Height          =   252
            Index           =   2
            Left            =   3960
            TabIndex        =   7
            TabStop         =   0   'False
            Top             =   480
            Width           =   972
        End
        Begin SSOption ShipVia
            Caption         =   "UPS"
            Height          =   255
            Index           =   1
            Left            =   3960
            TabIndex        =   6
            TabStop         =   0   'False
            Top             =   720
            Width           =   735
        End
        Begin Label Label3
            BackStyle       =   0   'Transparent
            Caption         =   "Ship via:"
            Height          =   255
            Left            =   3000
            TabIndex        =   9
            Top             =   480
            Width           =   855
        End
        Begin Label Label2
            BackStyle       =   0   'Transparent
            Caption         =   "Send to:"
            Height          =   255
            Left            =   600
            TabIndex        =   5
            Top             =   480
            Width           =   1215
        End
    End
    Begin SSPanel Panel3D1
        BackColor       =   &H00FFFFFF&
        BevelWidth      =   2
        BorderWidth     =   5
        ForeColor       =   &H00FFFFFF&
        Height          =   3372
        Left            =   240
        Outline         =   -1  'True
        TabIndex        =   1
        Top             =   1440
        Width           =   6132
        Begin TextBox Text4
            Height          =   288
            Left            =   1680
            TabIndex        =   13
            Text            =   "                    60015"
            Top             =   2280
            Width           =   2892
        End
        Begin TextBox Text3
            Height          =   288
            Left            =   1680
```

INTOUCH.DOC printed 5/3/94

```
        TabIndex        =   12
        Text            =   "Deerfield, IL "
        Top             =   2040
        Width           =   2892
    End
    Begin TextBox Text2
        Height          =   288
        Left            =   1680
        TabIndex        =   11
        Text            =   "2880 Valencia"
        Top             =   1800
        Width           =   2892
    End
    Begin TextBox Text1
        Height          =   288
        Left            =   1680
        TabIndex        =   10
        Text            =   "Terry Tackbary"
        Top             =   1560
        Width           =   2892
    End
    Begin SSFrame Frame3D1
        Caption         =   "Stamp"
        ForeColor       =   &H00808080&
        Height          =   1092
        Left            =   4920
        TabIndex        =   3
        Top             =   240
        Width           =   972
        Begin Image Image1
            DragMode        =   1  'Automatic
            Height          =   1092
            Left            =   0
            Picture         =   ORDER.FRX:076E
            Stretch         =   -1  'True
            Top             =   0
            Width           =   972
        End
    End
    Begin Label Label6
        BackStyle       =   0  'Transparent
        Caption         =   "Chicago, IL   60201"
        Height          =   252
        Left            =   120
        TabIndex        =   16
        Top             =   720
        Width           =   1692
    End
    Begin Label Label5
        BackStyle       =   0  'Transparent
        Caption         =   "1135 North"
        Height          =   252
        Left            =   120
        TabIndex        =   15
        Top             =   480
        Width           =   1692
    End
    Begin Label Label4
        BackStyle       =   0  'Transparent
        Caption         =   "Susan Wayde"
        Height          =   252
        Left            =   120
        TabIndex        =   14
        Top             =   240
```

```
            Width           =   1692
        End
    End
    Begin SSCommand Command3D1
        Caption         =   "&Return"
        Height          =   855
        Left            =   8280
        Picture         =   ORDER.FRX:0A70
        TabIndex        =   0
        Top             =   2720
        Width           =   975
    End
    Begin CommonDialog CMDialog1
        Flags           =   3
        Left            =   8760
        Top             =   4800
    End
    Begin Label Label7
        BackColor       =   &H00E0FFFF&
        Caption         =   "Price of selected card:"
        Height          =   255
        Left            =   1680
        TabIndex        =   30
        Top             =   4920
        Width           =   2055
    End
    Begin Image Image5
        Height          =   495
        Left            =   4080
        Top             =   2400
        Width           =   1215
    End
End
Sub Command3D1_Click ()
  Unload Order
End Sub Sub Command3D2_Click ()
  Load OrderSum
  Unload Order
End Sub Sub Command3D5_Click ()
  Panel3D2.Visible = False
End Sub Sub Font_Click ()
  'Open font selection dialog box
  CMDialog1.Action = 4
  'Assign the selected font
  'If YourMessage(0).Text = "" Then
    'Else
      'YourMessage(0).FontName = CMDialog1.FontName
      'YourMessage(0).FontSize = CMDialog1.FontSize
  'End If
End Sub Sub Form_Load ()
  'Load the insert combo box
  'Insert.AddItem "(none)"
  'Insert.AddItem "Gift certificate"
  'Insert.AddItem "Savings bond"
  Panel3D2.Left = 6600
  Panel3D2.Top = 1440

INTOUCH.DOC printed 5/3/94
```

```
End Sub

Sub Image1_DragDrop (Source As Control, X As Single, Y As Single)
  If TypeOf Source Is Image Then
    Image1.Picture = Source.Picture
  End If
End Sub Sub ShipVia_Click (Index As Integer, Value As Integer)
  If Index = 0 Then MsgBox "Time not adequate to send via regular mail.  Consider alternative."
End Sub Sub Stamp_Click ()
  'Select Case Panel3D2.Visible
    'Case True
      'Panel3D2.Visible = False
    'Case False
      Panel3D2.Visible = True
  'End Select
End Sub
```

ORDERSUM.FRM

```
VERSION 2.00
Begin Form OrderSum
    BackColor       =   &H00E0FFFF&
    Caption         =   "Order Summary"
    ClientHeight    =   5310
    ClientLeft      =   75
    ClientTop       =   1905
    ClientWidth     =   9495
    Height          =   5715
    Left            =   15
    LinkTopic       =   "Form1"
    MDIChild        =   -1  'True
    ScaleHeight     =   5310
    ScaleWidth      =   9495
    Top             =   1560
    Width           =   9615
    Begin SSPanel Panel3D1
        BevelInner      =   1  'Inset
        BevelWidth      =   2
        ForeColor       =   &H00FFFFFF&
        Height          =   5130
        Left            =   120
        TabIndex        =   0
        Top             =   0
        Width           =   9255
        Begin Mh3dButn SendOrder
            Alignment       =   2  'Center
            Caption         =   "&Send Order"
            CaptionBottom   =   100
            CaptionLeft     =   45
            CaptionRight    =   45
            CaptionTop      =   130
            FontTransParent =   -1  'True
            Height          =   855
            Left            =   7200
            LightColor      =   &H00FFFFFF&
            MultiLine       =   -1  'True
            OuterFillColor  =   &H00C0C0C0&
            PictureAutosize =   0  'False
            ShadowColor     =   &H00808080&
```

INTOUCH.DOC printed 5/3/94

```
        TabIndex        =   61
        TextFillColor   =   &H00C0C0C0&
        Top             =   3960
        Width           =   855
    End
    Begin SSFrame Frame3D5
        Caption         =   "Payment Method"
        ForeColor       =   &H00800000&
        Height          =   1455
        Left            =   7080
        TabIndex        =   57
        Top             =   1320
        Width           =   1815
        Begin SSOption Option3D1
            Caption         =   "AT&&T"
            Height          =   255
            Index           =   2
            Left            =   120
            TabIndex        =   60
            TabStop         =   0   'False
            Top             =   960
            Width           =   855
        End
        Begin SSOption Option3D1
            Caption         =   "VISA"
            Height          =   255
            Index           =   1
            Left            =   120
            TabIndex        =   59
            Top             =   600
            Value           =   -1  'True
            Width           =   855
        End
        Begin SSOption Option3D1
            Caption         =   "AmEx"
            Height          =   255
            Index           =   0
            Left            =   120
            TabIndex        =   58
            TabStop         =   0   'False
            Top             =   240
            Width           =   855
        End
    End
    Begin SSCommand Return
        Caption         =   "&Return"
        Height          =   855
        Left            =   8040
        Picture         =   ORDERSUM.FRX:0000
        TabIndex        =   1
        Top             =   3960
        Width           =   855
    End
    Begin DB_TextClass DB_Text6
        BorderStyle     =   1   'Fixed Single
        Height          =   255
        Left            =   5520
        MultiLine       =   0   'False
        pChanged        =   0   'False
        pFormatString   =   ""
        pQBECase        =   0   'Case Sensitive
        pQBEValue       =   ""
        pQueryExpr      =   ""
        pQueryName      =   ""
```

INTOUCH.DOC printed 5/3/94

```
                                        87
        pRecState       =   0
        ScrollBars      =   0   'None
        TabIndex        =   2
        Text            =   "54.64"
        Top             =   4800
        Width           =   1095
    End
    Begin DB_TextClass DB_Text5
        BorderStyle     =   1   'Fixed Single
        Height          =   255
        Left            =   5520
        MultiLine       =   0   'False
        pChanged        =   0   'False
        pFormatString   =   ""
        pQBECase        =   0   'Case Sensitive
        pQBEValue       =   ""
        pQueryExpr      =   ""
        pQueryName      =   ""
        pRecState       =   0
        ScrollBars      =   0   'None
        TabIndex        =   3
        Text            =   ""
        Top             =   4560
        Width           =   1095
    End
    Begin SSFrame Frame3D4
        ForeColor       =   &H00808080&
        Height          =   1455
        Left            =   120
        TabIndex        =   28
        Top             =   3120
        Width           =   6615
        Begin DB_TextClass DB_Text1
            BorderStyle     =   1   'Fixed Single
            Height          =   255
            Index           =   8
            Left            =   120
            MultiLine       =   0   'False
            pChanged        =   0   'False
            pFormatString   =   ""
            pQBECase        =   0   'Case Sensitive
            pQBEValue       =   ""
            pQueryExpr      =   ""
            pQueryName      =   ""
            pRecState       =   0
            ScrollBars      =   0   'None
            TabIndex        =   48
            Text            =   ""
            Top             =   1080
            Width           =   3015
        End
        Begin DB_TextClass DB_Text2
            BorderStyle     =   1   'Fixed Single
            Height          =   255
            Index           =   8
            Left            =   3120
            MultiLine       =   0   'False
            pChanged        =   0   'False
            pFormatString   =   ""
            pQBECase        =   0   'Case Sensitive
            pQBEValue       =   ""
            pQueryExpr      =   ""
            pQueryName      =   ""
            pRecState       =   0
```

```
            ScrollBars       =   0    'None
            TabIndex         =   47
            Text             =   ""
            Top              =   1080
            Width            =   1215
         End
         Begin DB_TextClass DB_Text3
            BorderStyle      =   1    'Fixed Single
            Height           =   255
            Index            =   8
            Left             =   4320
            MultiLine        =   0    'False
            pChanged         =   0    'False
            pFormatString    =   ""
            pQBECase         =   0    'Case Sensitive
            pQBEValue        =   ""
            pQueryExpr       =   ""
            pQueryName       =   ""
            pRecState        =   0
            ScrollBars       =   0    'None
            TabIndex         =   46
            Text             =   ""
            Top              =   1080
            Width            =   1095
         End
         Begin DB_TextClass DB_Text4
            BorderStyle      =   1    'Fixed Single
            Height           =   255
            Index            =   8
            Left             =   5400
            MultiLine        =   0    'False
            pChanged         =   0    'False
            pFormatString    =   ""
            pQBECase         =   0    'Case Sensitive
            pQBEValue        =   ""
            pQueryExpr       =   ""
            pQueryName       =   ""
            pRecState        =   0
            ScrollBars       =   0    'None
            TabIndex         =   45
            Text             =   ""
            Top              =   1080
            Width            =   1095
         End
         Begin DB_TextClass DB_Text1
            BorderStyle      =   1    'Fixed Single
            Height           =   255
            Index            =   7
            Left             =   120
            MultiLine        =   0    'False
            pChanged         =   0    'False
            pFormatString    =   ""
            pQBECase         =   0    'Case Sensitive
            pQBEValue        =   ""
            pQueryExpr       =   ""
            pQueryName       =   ""
            pRecState        =   0
            ScrollBars       =   0    'None
            TabIndex         =   44
            Text             =   ""
            Top              =   840
            Width            =   3015
         End
         Begin DB_TextClass DB_Text2
```

```
                    BorderStyle         =   1    'Fixed Single
                    Height              =   255
                    Index               =   7
                    Left                =   3120
                    MultiLine           =   0    'False
                    pChanged            =   0    'False
                    pFormatString       =   ""
                    pQBECase            =   0    'Case Sensitive
                    pQBEValue           =   ""
                    pQueryExpr          =   ""
                    pQueryName          =   ""
                    pRecState           =   0
                    ScrollBars          =   0    'None
                    TabIndex            =   43
                    Text                =   ""
                    Top                 =   840
                    Width               =   1215
                 End
                 Begin DB_TextClass DB_Text3
                    BorderStyle         =   1    'Fixed Single
                    Height              =   255
                    Index               =   7
                    Left                =   4320
                    MultiLine           =   0    'False
                    pChanged            =   0    'False
                    pFormatString       =   ""
                    pQBECase            =   0    'Case Sensitive
                    pQBEValue           =   ""
                    pQueryExpr          =   ""
                    pQueryName          =   ""
                    pRecState           =   0
                    ScrollBars          =   0    'None
                    TabIndex            =   42
                    Text                =   ""
                    Top                 =   840
                    Width               =   1095
                 End
                 Begin DB_TextClass DB_Text4
                    BorderStyle         =   1    'Fixed Single
                    Height              =   255
                    Index               =   7
                    Left                =   5400
                    MultiLine           =   0    'False
                    pChanged            =   0    'False
                    pFormatString       =   ""
                    pQBECase            =   0    'Case Sensitive
                    pQBEValue           =   ""
                    pQueryExpr          =   ""
                    pQueryName          =   ""
                    pRecState           =   0
                    ScrollBars          =   0    'None
                    TabIndex            =   41
                    Text                =   ""
                    Top                 =   840
                    Width               =   1095
                 End
                 Begin DB_TextClass DB_Text1
                    BorderStyle         =   1    'Fixed Single
                    Height              =   255
                    Index               =   6
                    Left                =   120
                    MultiLine           =   0    'False
                    pChanged            =   0    'False
                    pFormatString       =   ""
```

INTOUCH.DOC printed 5/3/94

```
                pQBECase        =   0   'Case Sensitive
                pQBEValue       =   ""
                pQueryExpr      =   ""
                pQueryName      =   ""
                pRecState       =   0
                ScrollBars      =   0   'None
                TabIndex        =   36
                Text            =   "Terry Tackbury - Stamp"
                Top             =   360
                Width           =   3015
            End
            Begin DB_TextClass DB_Text2
                BorderStyle     =   1   'Fixed Single
                Height          =   255
                Index           =   6
                Left            =   3120
                MultiLine       =   0   'False
                pChanged        =   0   'False
                pFormatString   =   ""
                pQBECase        =   0   'Case Sensitive
                pQBEValue       =   ""
                pQueryExpr      =   ""
                pQueryName      =   ""
                pRecState       =   0
                ScrollBars      =   0   'None
                TabIndex        =   35
                Text            =   "S403"
                Top             =   360
                Width           =   1215
            End
            Begin DB_TextClass DB_Text3
                BorderStyle     =   1   'Fixed Single
                Height          =   255
                Index           =   6
                Left            =   4320
                MultiLine       =   0   'False
                pChanged        =   0   'False
                pFormatString   =   ""
                pQBECase        =   0   'Case Sensitive
                pQBEValue       =   ""
                pQueryExpr      =   ""
                pQueryName      =   ""
                pRecState       =   0
                ScrollBars      =   0   'None
                TabIndex        =   34
                Text            =   "1"
                Top             =   360
                Width           =   1095
            End
            Begin DB_TextClass DB_Text4
                BorderStyle     =   1   'Fixed Single
                Height          =   255
                Index           =   6
                Left            =   5400
                MultiLine       =   0   'False
                pChanged        =   0   'False
                pFormatString   =   ""
                pQBECase        =   0   'Case Sensitive
                pQBEValue       =   ""
                pQueryExpr      =   ""
                pQueryName      =   ""
                pRecState       =   0
                ScrollBars      =   0   'None
                TabIndex        =   33
```

```
                    Text            =   ".29"
                    Top             =   360
                    Width           =   1095
                End
                Begin DB_TextClass DB_Text1
                    BorderStyle     =   1  'Fixed Single
                    Height          =   255
                    Index           =   5
                    Left            =   120
                    MultiLine       =   0     'False
                    pChanged        =   0     'False
                    pFormatString   =   ""
                    pQBECase        =   0  'Case Sensitive
                    pQBEValue       =   ""
                    pQueryExpr      =   ""
                    pQueryName      =   ""
                    pRecState       =   0
                    ScrollBars      =   0  'None
                    TabIndex        =   32
                    Text            =   "Terry Tackbury - Confetti"
                    Top             =   600
                    Width           =   3015
                End
                Begin DB_TextClass DB_Text2
                    BorderStyle     =   1  'Fixed Single
                    Height          =   255
                    Index           =   5
                    Left            =   3120
                    MultiLine       =   0     'False
                    pChanged        =   0     'False
                    pFormatString   =   ""
                    pQBECase        =   0  'Case Sensitive
                    pQBEValue       =   ""
                    pQueryExpr      =   ""
                    pQueryName      =   ""
                    pRecState       =   0
                    ScrollBars      =   0  'None
                    TabIndex        =   31
                    Text            =   "C12"
                    Top             =   600
                    Width           =   1215
                End
                Begin DB_TextClass DB_Text3
                    BorderStyle     =   1  'Fixed Single
                    Height          =   255
                    Index           =   5
                    Left            =   4320
                    MultiLine       =   0     'False
                    pChanged        =   0     'False
                    pFormatString   =   ""
                    pQBECase        =   0  'Case Sensitive
                    pQBEValue       =   ""
                    pQueryExpr      =   ""
                    pQueryName      =   ""
                    pRecState       =   0
                    ScrollBars      =   0  'None
                    TabIndex        =   30
                    Text            =   "1"
                    Top             =   600
                    Width           =   1095
                End
                Begin DB_TextClass DB_Text4
                    BorderStyle     =   1  'Fixed Single
                    Height          =   255
```

```
            Index           =   5
            Left            =   5400
            MultiLine       =   0   'False
            pChanged        =   0   'False
            pFormatString   =   ""
            pQBECase        =   0   'Case Sensitive
            pQBEValue       =   ""
            pQueryExpr      =   ""
            pQueryName      =   ""
            pRecState       =   0
            ScrollBars      =   0   'None
            TabIndex        =   29
            Text            =   ".45"
            Top             =   600
            Width           =   1095
         End
         Begin Label Label14
            Alignment       =   2   'Center
            BackStyle       =   0   'Transparent
            Caption         =   "NO"
            Height          =   255
            Left            =   3120
            TabIndex        =   40
            Top             =   120
            Width           =   1215
         End
         Begin Label Label13
            Alignment       =   2   'Center
            BackStyle       =   0   'Transparent
            Caption         =   "VOL"
            Height          =   255
            Left            =   4320
            TabIndex        =   39
            Top             =   120
            Width           =   1095
         End
         Begin Label Label12
            Alignment       =   2   'Center
            BackStyle       =   0   'Transparent
            Caption         =   "TOTAL"
            Height          =   255
            Left            =   5400
            TabIndex        =   38
            Top             =   120
            Width           =   1095
         End
         Begin Label Label8
            BackStyle       =   0   'Transparent
            Caption         =   "DESCRIPTION"
            Height          =   255
            Left            =   120
            TabIndex        =   37
            Top             =   120
            Width           =   3015
         End
      End
   End
   Begin SSFrame Frame3D3
      ForeColor       =   &H00808080&
      Height          =   1455
      Left            =   120
      TabIndex        =   11
      Top             =   1320
      Width           =   6615
      Begin DB_TextClass DB_Text1
```

```
    BorderStyle      =   1    'Fixed Single
    Height           =   255
    Index            =   2
    Left             =   120
    MultiLine        =   0    'False
    pChanged         =   0    'False
    pFormatString    =   ""
    pQBECase         =   0    'Case Sensitive
    pQBEValue        =   ""
    pQueryExpr       =   ""
    pQueryName       =   ""
    pRecState        =   0
    ScrollBars       =   0    'None
    TabIndex         =   56
    Text             =   "Hillary Clinton - Special"
    Top              =   840
    Width            =   3015
End
Begin DB_TextClass DB_Text2
    BorderStyle      =   1    'Fixed Single
    Height           =   255
    Index            =   2
    Left             =   3120
    MultiLine        =   0    'False
    pChanged         =   0    'False
    pFormatString    =   ""
    pQBECase         =   0    'Case Sensitive
    pQBEValue        =   ""
    pQueryExpr       =   ""
    pQueryName       =   ""
    pRecState        =   0
    ScrollBars       =   0    'None
    TabIndex         =   55
    Text             =   "110"
    Top              =   840
    Width            =   1215
End
Begin DB_TextClass DB_Text3
    BorderStyle      =   1    'Fixed Single
    Height           =   255
    Index            =   2
    Left             =   4320
    MultiLine        =   0    'False
    pChanged         =   0    'False
    pFormatString    =   ""
    pQBECase         =   0    'Case Sensitive
    pQBEValue        =   ""
    pQueryExpr       =   ""
    pQueryName       =   ""
    pRecState        =   0
    ScrollBars       =   0    'None
    TabIndex         =   54
    Text             =   "1"
    Top              =   840
    Width            =   1095
End
Begin DB_TextClass DB_Text4
    BorderStyle      =   1    'Fixed Single
    Height           =   255
    Index            =   2
    Left             =   5400
    MultiLine        =   0    'False
    pChanged         =   0    'False
    pFormatString    =   ""
```

```
                                94 pQBECase        =   0    'Case Sensitive
        pQBEValue       =   ""
        pQueryExpr      =   ""
        pQueryName      =   ""
        pRecState       =   0
        ScrollBars      =   0    'None
        TabIndex        =   53
        Text            =   "1.50"
        Top             =   840
        Width           =   1095
    End
    Begin DB_TextClass DB_Text1
        BorderStyle     =   1    'Fixed Single
        Height          =   255
        Index           =   3
        Left            =   120
        MultiLine       =   0    'False
        pChanged        =   0    'False
        pFormatString   =   ""
        pQBECase        =   0    'Case Sensitive
        pQBEValue       =   ""
        pQueryExpr      =   ""
        pQueryName      =   ""
        pRecState       =   0
        ScrollBars      =   0    'None
        TabIndex        =   52
        Text            =   "Lists - Christmas"
        Top             =   1080
        Width           =   3015
    End
    Begin DB_TextClass DB_Text2
        BorderStyle     =   1    'Fixed Single
        Height          =   255
        Index           =   3
        Left            =   3120
        MultiLine       =   0    'False
        pChanged        =   0    'False
        pFormatString   =   ""
        pQBECase        =   0    'Case Sensitive
        pQBEValue       =   ""
        pQueryExpr      =   ""
        pQueryName      =   ""
        pRecState       =   0
        ScrollBars      =   0    'None
        TabIndex        =   51
        Text            =   "32806"
        Top             =   1080
        Width           =   1215
    End
    Begin DB_TextClass DB_Text3
        BorderStyle     =   1    'Fixed Single
        Height          =   255
        Index           =   3
        Left            =   4320
        MultiLine       =   0    'False
        pChanged        =   0    'False
        pFormatString   =   ""
        pQBECase        =   0    'Case Sensitive
        pQBEValue       =   ""
        pQueryExpr      =   ""
        pQueryName      =   ""
        pRecState       =   0
        ScrollBars      =   0    'None
        TabIndex        =   50
```

INTOUCH.DOC printed 5/3/94

```
            Text            =   "52"
            Top             =   1080
            Width           =   1095
         End
         Begin DB_TextClass DB_Text4
            BorderStyle     =   1  'Fixed Single
            Height          =   255
            Index           =   3
            Left            =   5400
            MultiLine       =   0   'False
            pChanged        =   0   'False
            pFormatString   =   ""
            pQBECase        =   0   'Case Sensitive
            pQBEValue       =   ""
            pQueryExpr      =   ""
            pQueryName      =   ""
            pRecState       =   0
            ScrollBars      =   0   'None
            TabIndex        =   49
            Text            =   "49.40"
            Top             =   1080
            Width           =   1095
         End
         Begin DB_TextClass DB_Text4
            BorderStyle     =   1  'Fixed Single
            Height          =   255
            Index           =   1
            Left            =   5400
            MultiLine       =   0   'False
            pChanged        =   0   'False
            pFormatString   =   ""
            pQBECase        =   0   'Case Sensitive
            pQBEValue       =   ""
            pQueryExpr      =   ""
            pQueryName      =   ""
            pRecState       =   0
            ScrollBars      =   0   'None
            TabIndex        =   27
            Text            =   "1.25"
            Top             =   600
            Width           =   1095
         End
         Begin DB_TextClass DB_Text3
            BorderStyle     =   1  'Fixed Single
            Height          =   255
            Index           =   1
            Left            =   4320
            MultiLine       =   0   'False
            pChanged        =   0   'False
            pFormatString   =   ""
            pQBECase        =   0   'Case Sensitive
            pQBEValue       =   ""
            pQueryExpr      =   ""
            pQueryName      =   ""
            pRecState       =   0
            ScrollBars      =   0   'None
            TabIndex        =   26
            Text            =   "1"
            Top             =   600
            Width           =   1095
         End
         Begin DB_TextClass DB_Text2
            BorderStyle     =   1  'Fixed Single
            Height          =   255
```

INTOUCH.DOC printed 5/3/94

96

```
        Index           =   1
        Left            =   3120
        MultiLine       =   0    'False
        pChanged        =   0    'False
        pFormatString   =   ""
        pQBECase        =   0    'Case Sensitive
        pQBEValue       =   ""
        pQueryExpr      =   ""
        pQueryName      =   ""
        pRecState       =   0
        ScrollBars      =   0    'None
        TabIndex        =   25
        Text            =   "12513"
        Top             =   600
        Width           =   1215
     End
     Begin DB_TextClass DB_Text1
        BorderStyle     =   1    'Fixed Single
        Height          =   255
        Index           =   1
        Left            =   120
        MultiLine       =   0    'False
        pChanged        =   0    'False
        pFormatString   =   ""
        pQBECase        =   0    'Case Sensitive
        pQBEValue       =   ""
        pQueryExpr      =   ""
        pQueryName      =   ""
        pRecState       =   0
        ScrollBars      =   0    'None
        TabIndex        =   24
        Text            =   "Dan Friedrich - Thank You"
        Top             =   600
        Width           =   3015
     End
     Begin DB_TextClass DB_Text4
        BorderStyle     =   1    'Fixed Single
        Height          =   255
        Index           =   0
        Left            =   5400
        MultiLine       =   0    'False
        pChanged        =   0    'False
        pFormatString   =   ""
        pQBECase        =   0    'Case Sensitive
        pQBEValue       =   ""
        pQueryExpr      =   ""
        pQueryName      =   ""
        pRecState       =   0
        ScrollBars      =   0    'None
        TabIndex        =   23
        Text            =   "1.75"
        Top             =   360
        Width           =   1095
     End
     Begin DB_TextClass DB_Text3
        BorderStyle     =   1    'Fixed Single
        Height          =   255
        Index           =   0
        Left            =   4320
        MultiLine       =   0    'False
        pChanged        =   0    'False
        pFormatString   =   ""
        pQBECase        =   0    'Case Sensitive
        pQBEValue       =   ""
```

INTOUCH.DOC printed 5/3/94

```
            pQueryExpr      =   ""
            pQueryName      =   ""
            pRecState       =   0
            ScrollBars      =   0  'None
            TabIndex        =   22
            Text            =   "1"
            Top             =   360
            Width           =   1095
         End
         Begin DB_TextClass DB_Text2
            BorderStyle     =   1  'Fixed Single
            Height          =   255
            Index           =   0
            Left            =   3120
            MultiLine       =   0  'False
            pChanged        =   0  'False
            pFormatString   =   ""
            pQBECase        =   0  'Case Sensitive
            pQBEValue       =   ""
            pQueryExpr      =   ""
            pQueryName      =   ""
            pRecState       =   0
            ScrollBars      =   0  'None
            TabIndex        =   21
            Text            =   "702"
            Top             =   360
            Width           =   1215
         End
         Begin DB_TextClass T
            BorderStyle     =   1  'Fixed Single
            Height          =   255
            Index           =   0
            Left            =   120
            MultiLine       =   0  'False
            pChanged        =   0  'False
            pFormatString   =   ""
            pQBECase        =   0  'Case Sensitive
            pQBEValue       =   ""
            pQueryExpr      =   ""
            pQueryName      =   ""
            pRecState       =   0
            ScrollBars      =   0  'None
            TabIndex        =   20
            Text            =   "Terry Tackbury - Birthday"
            Top             =   360
            Width           =   3015
         End
         Begin Label Label11
            BackStyle       =   0  'Transparent
            Caption         =   "DESCRIPTION"
            Height          =   255
            Left            =   120
            TabIndex        =   19
            Top             =   120
            Width           =   3015
         End
         Begin Label Label10
            Alignment       =   2  'Center
            BackStyle       =   0  'Transparent
            Caption         =   "TOTAL"
            Height          =   255
            Left            =   5400
            TabIndex        =   18
            Top             =   120
```

INTOUCH.DOC printed 5/3/94

```
            Width            =    1095
         End
         Begin Label Label9
            Alignment        =    2  'Center
            BackStyle        =    0  'Transparent
            Caption          =    "VOL"
            Height           =    255
            Left             =    4320
            TabIndex         =    17
            Top              =    120
            Width            =    1095
         End
         Begin Label Label7
            Alignment        =    2  'Center
            BackStyle        =    0  'Transparent
            Caption          =    "NO"
            Height           =    255
            Left             =    3120
            TabIndex         =    16
            Top              =    120
            Width            =    1215
         End
      End
      Begin SSFrame Frame3D2
         ForeColor           =    &H00808080&
         Height              =    855
         Left                =    4560
         TabIndex            =    8
         Top                 =    120
         Width               =    2175
         Begin Label Label6
            BackStyle        =    0  'Transparent
            Caption          =    "Order No"
            Height           =    255
            Left             =    120
            TabIndex         =    10
            Top              =    120
            Width            =    1695
         End
         Begin Label Label5
            BackStyle        =    0  'Transparent
            Caption          =    "1233"
            Height           =    255
            Left             =    120
            TabIndex         =    9
            Top              =    360
            Width            =    1695
         End
      End
      Begin SSFrame Frame3D1
         ForeColor           =    &H00808080&
         Height              =    855
         Left                =    120
         TabIndex            =    4
         Top                 =    120
         Width               =    4455
         Begin Label Label3
            BackStyle        =    0  'Transparent
            Caption          =    "Chicago, IL 60201"
            Height           =    255
            Left             =    120
            TabIndex         =    7
            Top              =    600
            Width            =    1695
```

INTOUCH.DOC printed 5/3/94

```
            End
            Begin Label Label2
                BackStyle       =   0  'Transparent
                Caption         =   "1135 North"
                Height          =   255
                Left            =   120
                TabIndex        =   6
                Top             =   360
                Width           =   1695
            End
            Begin Label Label1
                BackStyle       =   0  'Transparent
                Caption         =   "Susan Wayde"
                Height          =   255
                Left            =   120
                TabIndex        =   5
                Top             =   120
                Width           =   1695
            End
        End
        Begin Label Label17
            Alignment       =   1  'Right Justify
            BackStyle       =   0  'Transparent
            Caption         =   "TOTAL:"
            Height          =   255
            Left            =   4320
            TabIndex        =   12
            Top             =   4800
            Width           =   1215
        End
        Begin Label Label16
            Alignment       =   1  'Right Justify
            BackStyle       =   0  'Transparent
            Caption         =   "TAX:"
            Height          =   255
            Left            =   4320
            TabIndex        =   13
            Top             =   4560
            Width           =   1215
        End
        Begin Label Label15
            BackColor       =   &H00C0C0C0&
            Caption         =   "CUSTOM FEATURES"
            ForeColor       =   &H00800000&
            Height          =   255
            Left            =   240
            TabIndex        =   14
            Top             =   2880
            Width           =   2175
        End
        Begin Label Label4
            BackColor       =   &H00C0C0C0&
            Caption         =   "CARDS"
            ForeColor       =   &H00800000&
            Height          =   255
            Index           =   0
            Left            =   240
            TabIndex        =   15
            Top             =   1080
            Width           =   1695
        End
    End
End
Sub Command3D1_Click ()
```

INTOUCH.DOC printed 5/3/94

```
  Unload OrderSum
  Load Choices
  MsgBox "Your order has been placed."
End Sub Sub Return_Click ()
  Unload OrderSum
End Sub Sub SendOrder_Click ()
  Unload OrderSum
End Sub
```

SENDLIST.FRM

```
VERSION 2.00
Begin Form sendlist
    BackColor       =   &H00E0FFFF&
    Caption         =   "Send List"
    ClientHeight    =   6885
    ClientLeft      =   75
    ClientTop       =   1845
    ClientWidth     =   9465
    Height          =   7290
    Left            =   15
    LinkTopic       =   "Form1"
    MDIChild        =   -1  'True
    ScaleHeight     =   6885
    ScaleWidth      =   9465
    Top             =   1500
    Width           =   9585
    Begin MhTree OccasionList
        Archive         =   0   'False
        BackColor       =   &H00FFFFFF&
        BitmapTransparent=  -1  'True
        BorderColor     =   &H80000006&
        Caption         =   "OccasionList"
        ColBackColor    =   SENDLIST.FRX:0000
        ColForeColor    =   SENDLIST.FRX:0084
        ColHighColor    =   SENDLIST.FRX:0108
        ColTitle        =   SENDLIST.FRX:018C
        Column          =   0
        Columns         =   32
        ColWidth        =   SENDLIST.FRX:01D0
        ControlBox      =   0   'False
        DefaultPics     =   0   'False
        Dir             =   0   'False
        FillColor       =   &H00FFFFFF&
        Fonts           =   0
        GroupBackColor  =   SENDLIST.FRX:0214
        GroupForeColor  =   SENDLIST.FRX:0220
        GroupHighColor  =   SENDLIST.FRX:022C
        Groups          =   2
        Height          =   1515
        Hidden          =   0   'False
        HighColor       =   &H8000000E&
        Left            =   3360
        LightColor      =   &H80000005&
        LineColor       =   &H00000000&
        LineWidth       =   1
        ListCount       =   1000
        MaxButton       =   0   'False
        MDI             =   0   'False
```

INTOUCH.DOC printed 5/3/94

```
                                        101

MinButton       =   0       'False
        Normal          =   0       'False
        Path            =   "."
        ReadOnly        =   -1      'True
        ScaleMode       =   3       'Pixel
        ScreenUpdate    =   -1      'True
        SelectedColor   =   &H00800000&
        ShadowColor     =   &H00FFFFFF&
        SingleSelect    =   0       'False
        Sizeable        =   0       'False
        System          =   0       'False
        TabIndex        =   127
        TabStop         =   0       'False
        TextColor       =   &H80000008&
        TitleBold       =   0       'False
        Top             =   360
        Visible         =   0       'False
        Width           =   1695
    End
    Begin CommandButton Command1
        Caption         =   "Select Occasions"
        Height          =   315
        Left            =   3360
        TabIndex        =   126
        Top             =   60
        Width           =   1695
    End
    Begin DB_TextClass FirstName
        BorderStyle     =   1       'Fixed Single
        Height          =   375
        Index           =   11
        Left            =   3360
        MultiLine       =   0       'False
        pChanged        =   0       'False
        pFormatString   =   ""
        pQBECase        =   0       'Case Sensitive
        pQBEValue       =   ""
        pQueryExpr      =   "FirstName"
        pQueryName      =   "NameQuery"
        pRecState       =   0
        ScrollBars      =   0       'None
        TabIndex        =   51
        Text            =   ""
        Top             =   4680
        Width           =   1695
    End
    Begin DB_TextClass Lastname
        BorderStyle     =   1       'Fixed Single
        Height          =   375
        Index           =   11
        Left            =   1680
        MultiLine       =   0       'False
        pChanged        =   0       'False
        pFormatString   =   ""
        pQBECase        =   0       'Case Sensitive
        pQBEValue       =   ""
        pQueryExpr      =   "LASTNAME"
        pQueryName      =   "NameQuery"
        pRecState       =   0
        ScrollBars      =   0       'None
        TabIndex        =   125
        Text            =   ""
        Top             =   4680
        Width           =   1695
```

INTOUCH.DOC printed 5/3/94

```
                         102

End
Begin MhMultiple AnniversaryStatus
    Autosize        =   -1  'True
    AutoSwitch      =   0   'No 'auto' switching
    Height          =   225
    Index           =   11
    Left            =   5280
    Style           =   1   'Large Colored Buttons
    TabIndex        =   124
    Top             =   4680
    Width           =   225
End
Begin MhMultiple BirthdayStatus
    Autosize        =   -1  'True
    AutoSwitch      =   0   'No 'auto' switching
    Height          =   225
    Index           =   11
    Left            =   5640
    Style           =   1   'Large Colored Buttons
    TabIndex        =   123
    Top             =   4680
    Width           =   225
End
Begin MhMultiple XmasStatus
    Autosize        =   -1  'True
    AutoSwitch      =   0   'No 'auto' switching
    Height          =   225
    Index           =   11
    Left            =   6000
    Style           =   1   'Large Colored Buttons
    TabIndex        =   122
    Top             =   4680
    Value           =   3   ''Greyed' out
    Width           =   225
End
Begin MhMultiple MhMultiple1
    Autosize        =   -1  'True
    AutoSwitch      =   0   'No 'auto' switching
    Height          =   225
    Index           =   0
    Left            =   5040
    Style           =   1   'Large Colored Buttons
    TabIndex        =   121
    Top             =   5160
    Value           =   3   ''Greyed' out
    Width           =   225
End
Begin MhMultiple MhMultiple1
    Autosize        =   -1  'True
    AutoSwitch      =   0   'No 'auto' switching
    Height          =   225
    Index           =   1
    Left            =   840
    Style           =   1   'Large Colored Buttons
    TabIndex        =   120
    Top             =   5160
    Width           =   225
End
Begin MhMultiple MhMultiple1
    Autosize        =   -1  'True
    AutoSwitch      =   0   'No 'auto' switching
    Height          =   225
    Index           =   2
    Left            =   1800
```

INTOUCH.DOC printed 5/3/94

```
              Style         =   1   'Large Colored Buttons
              TabIndex      =   119
              Top           =   5160
              Value         =   1   'Warning / Yellow
              Width         =   225
           End
           Begin MhMultiple MhMultiple1
              Autosize      =   -1  'True
              AutoSwitch    =   0   'No 'auto' switching
              Height        =   225
              Index         =   3
              Left          =   3240
              Style         =   1   'Large Colored Buttons
              TabIndex      =   118
              Top           =   5160
              Value         =   2   'Go / Green
              Width         =   225
           End
           Begin MhMultiple XmasStatus
              Autosize      =   -1  'True
              AutoSwitch    =   0   'No 'auto' switching
              Height        =   225
              Index         =   10
              Left          =   6000
              Style         =   1   'Large Colored Buttons
              TabIndex      =   113
              Top           =   4320
              Value         =   3   ''Greyed' out
              Width         =   225
           End
           Begin MhMultiple XmasStatus
              Autosize      =   -1  'True
              AutoSwitch    =   0   'No 'auto' switching
              Height        =   225
              Index         =   9
              Left          =   6000
              Style         =   1   'Large Colored Buttons
              TabIndex      =   112
              Top           =   3960
              Value         =   3   ''Greyed' out
              Width         =   225
           End
           Begin MhMultiple XmasStatus
              Autosize      =   -1  'True
              AutoSwitch    =   0   'No 'auto' switching
              Height        =   225
              Index         =   8
              Left          =   6000
              Style         =   1   'Large Colored Buttons
              TabIndex      =   111
              Top           =   3600
              Value         =   3   ''Greyed' out
              Width         =   225
           End
           Begin MhMultiple XmasStatus
              Autosize      =   -1  'True
              AutoSwitch    =   0   'No 'auto' switching
              Height        =   225
              Index         =   7
              Left          =   6000
              Style         =   1   'Large Colored Buttons
              TabIndex      =   110
              Top           =   3240
              Value         =   3   ''Greyed' out
```

104

```
        Width           =   225
End
Begin MhMultiple XmasStatus
    Autosize        =   -1  'True
    AutoSwitch      =   0   'No 'auto' switching
    Height          =   225
    Index           =   6
    Left            =   6000
    Style           =   1   'Large Colored Buttons
    TabIndex        =   109
    Top             =   2880
    Value           =   3   ''Greyed' out
    Width           =   225
End
Begin MhMultiple XmasStatus
    Autosize        =   -1  'True
    AutoSwitch      =   0   'No 'auto' switching
    Height          =   225
    Index           =   5
    Left            =   6000
    Style           =   1   'Large Colored Buttons
    TabIndex        =   108
    Top             =   2520
    Value           =   3   ''Greyed' out
    Width           =   225
End
Begin MhMultiple XmasStatus
    Autosize        =   -1  'True
    AutoSwitch      =   0   'No 'auto' switching
    Height          =   225
    Index           =   4
    Left            =   6000
    Style           =   1   'Large Colored Buttons
    TabIndex        =   107
    Top             =   2160
    Value           =   3   ''Greyed' out
    Width           =   225
End
Begin MhMultiple XmasStatus
    Autosize        =   -1  'True
    AutoSwitch      =   0   'No 'auto' switching
    Height          =   225
    Index           =   3
    Left            =   6000
    Style           =   1   'Large Colored Buttons
    TabIndex        =   106
    Top             =   1800
    Value           =   3   ''Greyed' out
    Width           =   225
End
Begin MhMultiple XmasStatus
    Autosize        =   -1  'True
    AutoSwitch      =   0   'No 'auto' switching
    Height          =   225
    Index           =   2
    Left            =   6000
    Style           =   1   'Large Colored Buttons
    TabIndex        =   105
    Top             =   1440
    Value           =   3   ''Greyed' out
    Width           =   225
End
Begin MhMultiple XmasStatus
    Autosize        =   -1  'True
```

INTOUCH.DOC printed 5/3/94

```
                            105

AutoSwitch     =    0   'No 'auto' switching
    Height         =    225
    Index          =    1
    Left           =    6000
    Style          =    1   'Large Colored Buttons
    TabIndex       =    104
    Top            =    1080
    Value          =    3   ''Greyed' out
    Width          =    225
End
Begin MhMultiple XmasStatus
    Autosize       =    -1  'True
    AutoSwitch     =    0   'No 'auto' switching
    Height         =    225
    Index          =    0
    Left           =    6000
    Style          =    1   'Large Colored Buttons
    TabIndex       =    103
    Top            =    720
    Value          =    3   ''Greyed' out
    Width          =    225
End
Begin MhMultiple BirthdayStatus
    Autosize       =    -1  'True
    AutoSwitch     =    0   'No 'auto' switching
    Height         =    225
    Index          =    10
    Left           =    5640
    Style          =    1   'Large Colored Buttons
    TabIndex       =    102
    Top            =    4320
    Width          =    225
End
Begin MhMultiple BirthdayStatus
    Autosize       =    -1  'True
    AutoSwitch     =    0   'No 'auto' switching
    Height         =    225
    Index          =    9
    Left           =    5640
    Style          =    1   'Large Colored Buttons
    TabIndex       =    101
    Top            =    3960
    Width          =    225
End
Begin MhMultiple BirthdayStatus
    Autosize       =    -1  'True
    AutoSwitch     =    0   'No 'auto' switching
    Height         =    225
    Index          =    8
    Left           =    5640
    Style          =    1   'Large Colored Buttons
    TabIndex       =    100
    Top            =    3600
    Width          =    225
End
Begin MhMultiple BirthdayStatus
    Autosize       =    -1  'True
    AutoSwitch     =    0   'No 'auto' switching
    Height         =    225
    Index          =    7
    Left           =    5640
    Style          =    1   'Large Colored Buttons
    TabIndex       =    99
    Top            =    3240
```

INTOUCH.DOC printed 5/3/94

```
                            106

Width           =   225
   End
   Begin MhMultiple BirthdayStatus
        Autosize        =   -1  'True
        AutoSwitch      =   0   'No 'auto' switching
        Height          =   225
        Index           =   6
        Left            =   5640
        Style           =   1   'Large Colored Buttons
        TabIndex        =   98
        Top             =   2880
        Width           =   225
   End
   Begin MhMultiple BirthdayStatus
        Autosize        =   -1  'True
        AutoSwitch      =   0   'No 'auto' switching
        Height          =   225
        Index           =   5
        Left            =   5640
        Style           =   1   'Large Colored Buttons
        TabIndex        =   97
        Top             =   2520
        Width           =   225
   End
   Begin MhMultiple BirthdayStatus
        Autosize        =   -1  'True
        AutoSwitch      =   0   'No 'auto' switching
        Height          =   225
        Index           =   4
        Left            =   5640
        Style           =   1   'Large Colored Buttons
        TabIndex        =   96
        Top             =   2160
        Width           =   225
   End
   Begin MhMultiple BirthdayStatus
        Autosize        =   -1  'True
        AutoSwitch      =   0   'No 'auto' switching
        Height          =   225
        Index           =   3
        Left            =   5640
        Style           =   1   'Large Colored Buttons
        TabIndex        =   95
        Top             =   1800
        Width           =   225
   End
   Begin MhMultiple BirthdayStatus
        Autosize        =   -1  'True
        AutoSwitch      =   0   'No 'auto' switching
        Height          =   225
        Index           =   2
        Left            =   5640
        Style           =   1   'Large Colored Buttons
        TabIndex        =   94
        Top             =   1440
        Width           =   225
   End
   Begin MhMultiple BirthdayStatus
        Autosize        =   -1  'True
        AutoSwitch      =   0   'No 'auto' switching
        Height          =   225
        Index           =   1
        Left            =   5640
        Style           =   1   'Large Colored Buttons
```

INTOUCH.DOC printed 5/3/94

```
         TabIndex        =    93
         Top             =    1080
         Width           =    225
      End
      Begin MhMultiple BirthdayStatus
         Autosize        =    -1  'True
         AutoSwitch      =    0   'No 'auto' switching
         Height          =    225
         Index           =    0
         Left            =    5640
         Style           =    1   'Large Colored Buttons
         TabIndex        =    92
         Top             =    720
         Width           =    225
      End
      Begin DB_TextClass DBBirthdayStatus
         BorderStyle     =    1   'Fixed Single
         Height          =    195
         Index           =    11
         Left            =    4920
         MultiLine       =    0   'False
         pChanged        =    0   'False
         pFormatString   =    ""
         pQBECase        =    0   'Case Sensitive
         pQBEValue       =    ""
         pQueryExpr      =    "BIRTHSTATU"
         pQueryName      =    "NameQuery"
         pRecState       =    0
         ScrollBars      =    0   'None
         TabIndex        =    91
         Text            =    "DB_Text2"
         Top             =    6180
         Width           =    255
      End
      Begin DB_TextClass DBBirthdayStatus
         BorderStyle     =    1   'Fixed Single
         Height          =    195
         Index           =    10
         Left            =    4560
         MultiLine       =    0   'False
         pChanged        =    0   'False
         pFormatString   =    ""
         pQBECase        =    0   'Case Sensitive
         pQBEValue       =    ""
         pQueryExpr      =    "BIRTHSTATU"
         pQueryName      =    "NameQuery"
         pRecState       =    0
         ScrollBars      =    0   'None
         TabIndex        =    90
         Text            =    "DB_Text2"
         Top             =    6180
         Width           =    255
      End
      Begin DB_TextClass DBBirthdayStatus
         BorderStyle     =    1   'Fixed Single
         Height          =    195
         Index           =    9
         Left            =    4200
         MultiLine       =    0   'False
         pChanged        =    0   'False
         pFormatString   =    ""
         pQBECase        =    0   'Case Sensitive
         pQBEValue       =    ""
         pQueryExpr      =    "BIRTHSTATU"
```

INTOUCH.DOC printed 5/3/94

```
                pQueryName      =   "NameQuery"
                pRecState       =   0
                ScrollBars      =   0  'None
                TabIndex        =   89
                Text            =   "DB_Text2"
                Top             =   6180
                Width           =   255
             End
             Begin DB_TextClass DBBirthdayStatus
                BorderStyle     =   1  'Fixed Single
                Height          =   195
                Index           =   8
                Left            =   3840
                MultiLine       =   0  'False
                pChanged        =   0  'False
                pFormatString   =   ""
                pQBECase        =   0  'Case Sensitive
                pQBEValue       =   ""
                pQueryExpr      =   "BIRTHSTATU"
                pQueryName      =   "NameQuery"
                pRecState       =   0
                ScrollBars      =   0  'None
                TabIndex        =   88
                Text            =   "DB_Text2"
                Top             =   6180
                Width           =   255
             End
             Begin DB_TextClass DBBirthdayStatus
                BorderStyle     =   1  'Fixed Single
                Height          =   195
                Index           =   7
                Left            =   3480
                MultiLine       =   0  'False
                pChanged        =   0  'False
                pFormatString   =   ""
                pQBECase        =   0  'Case Sensitive
                pQBEValue       =   ""
                pQueryExpr      =   "BIRTHSTATU"
                pQueryName      =   "NameQuery"
                pRecState       =   0
                ScrollBars      =   0  'None
                TabIndex        =   87
                Text            =   "DB_Text2"
                Top             =   6180
                Width           =   255
             End
             Begin DB_TextClass DBBirthdayStatus
                BorderStyle     =   1  'Fixed Single
                Height          =   195
                Index           =   6
                Left            =   3120
                MultiLine       =   0  'False
                pChanged        =   0  'False
                pFormatString   =   ""
                pQBECase        =   0  'Case Sensitive
                pQBEValue       =   ""
                pQueryExpr      =   "BIRTHSTATU"
                pQueryName      =   "NameQuery"
                pRecState       =   0
                ScrollBars      =   0  'None
                TabIndex        =   86
                Text            =   "DB_Text2"
                Top             =   6180
                Width           =   255
```

INTOUCH.DOC printed 5/3/94

109

```
End
Begin DB_TextClass DBBirthdayStatus
    BorderStyle     =   1   'Fixed Single
    Height          =   195
    Index           =   5
    Left            =   2760
    MultiLine       =   0   'False
    pChanged        =   0   'False
    pFormatString   =   ""
    pQBECase        =   0   'Case Sensitive
    pQBEValue       =   ""
    pQueryExpr      =   "BIRTHSTATU"
    pQueryName      =   "NameQuery"
    pRecState       =   0
    ScrollBars      =   0   'None
    TabIndex        =   85
    Text            =   "DB_Text2"
    Top             =   6180
    Width           =   255
End
Begin DB_TextClass DBBirthdayStatus
    BorderStyle     =   1   'Fixed Single
    Height          =   195
    Index           =   4
    Left            =   2400
    MultiLine       =   0   'False
    pChanged        =   0   'False
    pFormatString   =   ""
    pQBECase        =   0   'Case Sensitive
    pQBEValue       =   ""
    pQueryExpr      =   "BIRTHSTATU"
    pQueryName      =   "NameQuery"
    pRecState       =   0
    ScrollBars      =   0   'None
    TabIndex        =   84
    Text            =   "DB_Text2"
    Top             =   6180
    Width           =   255
End
Begin DB_TextClass DBBirthdayStatus
    BorderStyle     =   1   'Fixed Single
    Height          =   195
    Index           =   3
    Left            =   2040
    MultiLine       =   0   'False
    pChanged        =   0   'False
    pFormatString   =   ""
    pQBECase        =   0   'Case Sensitive
    pQBEValue       =   ""
    pQueryExpr      =   "BIRTHSTATU"
    pQueryName      =   "NameQuery"
    pRecState       =   0
    ScrollBars      =   0   'None
    TabIndex        =   83
    Text            =   "DB_Text2"
    Top             =   6180
    Width           =   255
End
Begin DB_TextClass DBBirthdayStatus
    BorderStyle     =   1   'Fixed Single
    Height          =   195
    Index           =   2
    Left            =   1680
    MultiLine       =   0   'False
```

INTOUCH.DOC printed 5/3/94

110

```
            pChanged        =   0     'False
            pFormatString   =   ""
            pQBECase        =   0     'Case Sensitive
            pQBEValue       =   ""
            pQueryExpr      =   "BIRTHSTATU"
            pQueryName      =   "NameQuery"
            pRecState       =   0
            ScrollBars      =   0     'None
            TabIndex        =   82
            Text            =   "DB_Text2"
            Top             =   6180
            Width           =   255
         End
         Begin DB_TextClass DBBirthdayStatus
            BorderStyle     =   1     'Fixed Single
            Height          =   195
            Index           =   1
            Left            =   1320
            MultiLine       =   0     'False
            pChanged        =   0     'False
            pFormatString   =   ""
            pQBECase        =   0     'Case Sensitive
            pQBEValue       =   ""
            pQueryExpr      =   "BIRTHSTATU"
            pQueryName      =   "NameQuery"
            pRecState       =   0
            ScrollBars      =   0     'None
            TabIndex        =   81
            Text            =   "DB_Text2"
            Top             =   6180
            Width           =   255
         End
         Begin DB_TextClass DBBirthdayStatus
            BorderStyle     =   1     'Fixed Single
            Height          =   195
            Index           =   0
            Left            =   960
            MultiLine       =   0     'False
            pChanged        =   0     'False
            pFormatString   =   ""
            pQBECase        =   0     'Case Sensitive
            pQBEValue       =   ""
            pQueryExpr      =   "BIRTHSTATU"
            pQueryName      =   "NameQuery"
            pRecState       =   0
            ScrollBars      =   0     'None
            TabIndex        =   80
            Text            =   "DB_Text2"
            Top             =   6180
            Width           =   255
         End
         Begin MhMultiple AnniversaryStatus
            Autosize        =   -1    'True
            AutoSwitch      =   0     'No 'auto' switching
            Height          =   225
            Index           =   10
            Left            =   5280
            Style           =   1     'Large Colored Buttons
            TabIndex        =   79
            Top             =   4320
            Width           =   225
         End
         Begin MhMultiple AnniversaryStatus
            Autosize        =   -1    'True
```

INTOUCH.DOC printed 5/3/94

```
                                111

AutoSwitch      =    0   'No 'auto' switching
   Height          =    225
   Index           =    9
   Left            =    5280
   Style           =    1   'Large Colored Buttons
   TabIndex        =    78
   Top             =    3960
   Width           =    225
End
Begin MhMultiple AnniversaryStatus
   Autosize        =    -1  'True
   AutoSwitch      =    0   'No 'auto' switching
   Height          =    225
   Index           =    8
   Left            =    5280
   Style           =    1   'Large Colored Buttons
   TabIndex        =    77
   Top             =    3600
   Width           =    225
End
Begin MhMultiple AnniversaryStatus
   Autosize        =    -1  'True
   AutoSwitch      =    0   'No 'auto' switching
   Height          =    225
   Index           =    7
   Left            =    5280
   Style           =    1   'Large Colored Buttons
   TabIndex        =    76
   Top             =    3240
   Width           =    225
End
Begin MhMultiple AnniversaryStatus
   Autosize        =    -1  'True
   AutoSwitch      =    0   'No 'auto' switching
   Height          =    225
   Index           =    6
   Left            =    5280
   Style           =    1   'Large Colored Buttons
   TabIndex        =    75
   Top             =    2880
   Width           =    225
End
Begin MhMultiple AnniversaryStatus
   Autosize        =    -1  'True
   AutoSwitch      =    0   'No 'auto' switching
   Height          =    225
   Index           =    5
   Left            =    5280
   Style           =    1   'Large Colored Buttons
   TabIndex        =    74
   Top             =    2520
   Width           =    225
End
Begin MhMultiple AnniversaryStatus
   Autosize        =    -1  'True
   AutoSwitch      =    0   'No 'auto' switching
   Height          =    225
   Index           =    4
   Left            =    5280
   Style           =    1   'Large Colored Buttons
   TabIndex        =    73
   Top             =    2160
   Width           =    225
End INTOUCH.DOC printed 5/3/94
```

112

```
Begin MhMultiple AnniversaryStatus
    Autosize        =   -1     'True
    AutoSwitch      =   0      'No 'auto' switching
    Height          =   225
    Index           =   3
    Left            =   5280
    Style           =   1      'Large Colored Buttons
    TabIndex        =   72
    Top             =   1800
    Width           =   225
End
Begin MhMultiple AnniversaryStatus
    Autosize        =   -1     'True
    AutoSwitch      =   0      'No 'auto' switching
    Height          =   225
    Index           =   2
    Left            =   5280
    Style           =   1      'Large Colored Buttons
    TabIndex        =   71
    Top             =   1440
    Width           =   225
End
Begin MhMultiple AnniversaryStatus
    Autosize        =   -1     'True
    AutoSwitch      =   0      'No 'auto' switching
    Height          =   225
    Index           =   1
    Left            =   5280
    Style           =   1      'Large Colored Buttons
    TabIndex        =   70
    Top             =   1080
    Width           =   225
End
Begin MhMultiple AnniversaryStatus
    Autosize        =   -1     'True
    AutoSwitch      =   0      'No 'auto' switching
    Height          =   225
    Index           =   0
    Left            =   5280
    Style           =   1      'Large Colored Buttons
    TabIndex        =   69
    Top             =   720
    Width           =   225
End
Begin DB_TextClass DBAnniversaryStatus
    BorderStyle     =   1      'Fixed Single
    Height          =   195
    Index           =   11
    Left            =   4920
    MultiLine       =   0      'False
    pChanged        =   0      'False
    pFormatString   =   ""
    pQBECase        =   0      'Case Sensitive
    pQBEValue       =   ""
    pQueryExpr      =   "ANNIVSTATU"
    pQueryName      =   "NameQuery"
    pRecState       =   0
    ScrollBars      =   0      'None
    TabIndex        =   68
    Text            =   "DB_Text2"
    Top             =   5880
    Width           =   255
End
Begin DB_TextClass DBAnniversaryStatus
```

INTOUCH.DOC printed 5/3/94

113

```
        BorderStyle     =   1   'Fixed Single
        Height          =   195
        Index           =   10
        Left            =   4560
        MultiLine       =   0       'False
        pChanged        =   0       'False
        pFormatString   =   ""
        pQBECase        =   0       'Case Sensitive
        pQBEValue       =   ""
        pQueryExpr      =   "ANNIVSTATU"
        pQueryName      =   "NameQuery"
        pRecState       =   0
        ScrollBars      =   0       'None
        TabIndex        =   67
        Text            =   "DB_Text2"
        Top             =   5880
        Width           =   255
     End
     Begin DB_TextClass DBAnniversaryStatus
        BorderStyle     =   1   'Fixed Single
        Height          =   195
        Index           =   9
        Left            =   4200
        MultiLine       =   0       'False
        pChanged        =   0       'False
        pFormatString   =   ""
        pQBECase        =   0       'Case Sensitive
        pQBEValue       =   ""
        pQueryExpr      =   "ANNIVSTATU"
        pQueryName      =   "NameQuery"
        pRecState       =   0
        ScrollBars      =   0       'None
        TabIndex        =   66
        Text            =   "DB_Text2"
        Top             =   5880
        Width           =   255
     End
     Begin DB_TextClass DBAnniversaryStatus
        BorderStyle     =   1   'Fixed Single
        Height          =   195
        Index           =   8
        Left            =   3840
        MultiLine       =   0       'False
        pChanged        =   0       'False
        pFormatString   =   ""
        pQBECase        =   0       'Case Sensitive
        pQBEValue       =   ""
        pQueryExpr      =   "ANNIVSTATU"
        pQueryName      =   "NameQuery"
        pRecState       =   0
        ScrollBars      =   0       'None
        TabIndex        =   65
        Text            =   "DB_Text2"
        Top             =   5880
        Width           =   255
     End
     Begin DB_TextClass DBAnniversaryStatus
        BorderStyle     =   1   'Fixed Single
        Height          =   195
        Index           =   7
        Left            =   3480
        MultiLine       =   0       'False
        pChanged        =   0       'False
        pFormatString   =   ""
```

INTOUCH.DOC printed 5/3/94

114

```
        pQBECase        =   0    'Case Sensitive
        pQBEValue       =   ""
        pQueryExpr      =   "ANNIVSTATU"
        pQueryName      =   "NameQuery"
        pRecState       =   0
        ScrollBars      =   0    'None
        TabIndex        =   64
        Text            =   "DB_Text2"
        Top             =   5880
        Width           =   255
     End
     Begin DB_TextClass DBAnniversaryStatus
        BorderStyle     =   1    'Fixed Single
        Height          =   195
        Index           =   6
        Left            =   3120
        MultiLine       =   0    'False
        pChanged        =   0    'False
        pFormatString   =   ""
        pQBECase        =   0    'Case Sensitive
        pQBEValue       =   ""
        pQueryExpr      =   "ANNIVSTATU"
        pQueryName      =   "NameQuery"
        pRecState       =   0
        ScrollBars      =   0    'None
        TabIndex        =   63
        Text            =   "DB_Text2"
        Top             =   5880
        Width           =   255
     End
     Begin DB_TextClass DBAnniversaryStatus
        BorderStyle     =   1    'Fixed Single
        Height          =   195
        Index           =   5
        Left            =   2760
        MultiLine       =   0    'False
        pChanged        =   0    'False
        pFormatString   =   ""
        pQBECase        =   0    'Case Sensitive
        pQBEValue       =   ""
        pQueryExpr      =   "ANNIVSTATU"
        pQueryName      =   "NameQuery"
        pRecState       =   0
        ScrollBars      =   0    'None
        TabIndex        =   62
        Text            =   "DB_Text2"
        Top             =   5880
        Width           =   255
     End
     Begin DB_TextClass DBAnniversaryStatus
        BorderStyle     =   1    'Fixed Single
        Height          =   195
        Index           =   4
        Left            =   2400
        MultiLine       =   0    'False
        pChanged        =   0    'False
        pFormatString   =   ""
        pQBECase        =   0    'Case Sensitive
        pQBEValue       =   ""
        pQueryExpr      =   "ANNIVSTATU"
        pQueryName      =   "NameQuery"
        pRecState       =   0
        ScrollBars      =   0    'None
        TabIndex        =   61
```

INTOUCH.DOC printed 5/3/94

```
            Text           =   "DB_Text2"
            Top            =   5880
            Width          =   255
         End
         Begin DB_TextClass DBAnniversaryStatus
            BorderStyle    =   1  'Fixed Single
            Height         =   195
            Index          =   3
            Left           =   2040
            MultiLine      =   0  'False
            pChanged       =   0  'False
            pFormatString  =   ""
            pQBECase       =   0  'Case Sensitive
            pQBEValue      =   ""
            pQueryExpr     =   "ANNIVSTATU"
            pQueryName     =   "NameQuery"
            pRecState      =   0
            ScrollBars     =   0  'None
            TabIndex       =   60
            Text           =   "DB_Text2"
            Top            =   5880
            Width          =   255
         End
         Begin DB_TextClass DBAnniversaryStatus
            BorderStyle    =   1  'Fixed Single
            Height         =   195
            Index          =   2
            Left           =   1680
            MultiLine      =   0  'False
            pChanged       =   0  'False
            pFormatString  =   ""
            pQBECase       =   0  'Case Sensitive
            pQBEValue      =   ""
            pQueryExpr     =   "ANNIVSTATU"
            pQueryName     =   "NameQuery"
            pRecState      =   0
            ScrollBars     =   0  'None
            TabIndex       =   59
            Text           =   "DB_Text2"
            Top            =   5880
            Width          =   255
         End
         Begin DB_TextClass DBAnniversaryStatus
            BorderStyle    =   1  'Fixed Single
            Height         =   195
            Index          =   1
            Left           =   1320
            MultiLine      =   0  'False
            pChanged       =   0  'False
            pFormatString  =   ""
            pQBECase       =   0  'Case Sensitive
            pQBEValue      =   ""
            pQueryExpr     =   "ANNIVSTATU"
            pQueryName     =   "NameQuery"
            pRecState      =   0
            ScrollBars     =   0  'None
            TabIndex       =   58
            Text           =   "DB_Text2"
            Top            =   5880
            Width          =   255
         End
         Begin DB_TextClass DBAnniversaryStatus
            BorderStyle    =   1  'Fixed Single
            Height         =   195
```

116

```
            Index           =   0
            Left            =   960
            MultiLine       =   0   'False
            pChanged        =   0   'False
            pFormatString   =   ""
            pQBECase        =   0   'Case Sensitive
            pQBEValue       =   ""
            pQueryExpr      =   "ANNIVSTATU"
            pQueryName      =   "NameQuery"
            pRecState       =   0
            ScrollBars      =   0   'None
            TabIndex        =   57
            Text            =   "DB_Text2"
            Top             =   5880
            Width           =   255
         End
         Begin DB_ComboClass NameSort
            Height          =   300
            Left            =   960
            pChanged        =   0   'False
            pFormatString   =   ""
            pListQExpr      =   ""
            pListQName      =   ""
            pQBECase        =   0   'Case Sensitive
            pQBEValue       =   ""
            pQueryExpr      =   ""
            pQueryName      =   ""
            pRecState       =   0
            Sorted          =   0   'False
            Style           =   0   'Dropdown Combo
            TabIndex        =   55
            Top             =   60
            Width           =   1815
         End
         Begin Mh3dLabel Mh3dLabel1
            AutoSize        =   -1  'True
            BackColor       =   &H00E0FFFF&
            BorderColor     =   &H80000006&
            Caption         =   "Anniv."
            FillColor       =   &H00E0FFFF&
            FontBold        =   -1  'True
            FontEscapement  =   900
            FontItalic      =   0   'False
            FontName        =   "Arial"
            FontOrientation =   900
            FontSize        =   8.25
            FontStrikethru  =   0   'False
            FontUnderline   =   0   'False
            Height          =   855
            Index           =   2
            Left            =   5280
            LightColor      =   &H80000005&
            ShadowColor     =   &H80000010&
            TabIndex        =   54
            TextColor       =   &H80000008&
            Top             =   0
            VAlignment      =   1   'Bottom
            Width           =   255
         End
         Begin Mh3dLabel Mh3dLabel1
            AutoSize        =   -1  'True
            BackColor       =   &H00E0FFFF&
            BorderColor     =   &H80000006&
            Caption         =   "Birthday"
```

INTOUCH.DOC printed 5/3/94

```
         FillColor       =   &H00E0FFFF&
         FontBold        =   -1  'True
         FontEscapement  =   900
         FontItalic      =   0   'False
         FontName        =   "Arial"
         FontOrientation =   900
         FontSize        =   8.25
         FontStrikethru  =   0   'False
         FontUnderline   =   0   'False
         Height          =   855
         Index           =   1
         Left            =   5640
         LightColor      =   &H80000005&
         ShadowColor     =   &H80000010&
         TabIndex        =   53
         TextColor       =   &H80000008&
         Top             =   0
         VAlignment      =   1   'Bottom
         Width           =   255
      End
      Begin Mh3dLabel Mh3dLabel1
         AutoSize        =   -1  'True
         BackColor       =   &H00E0FFFF&
         BorderColor     =   &H80000006&
         Caption         =   "Xmas"
         FillColor       =   &H00E0FFFF&
         FontBold        =   -1  'True
         FontEscapement  =   900
         FontItalic      =   0   'False
         FontName        =   "Arial"
         FontOrientation =   900
         FontSize        =   8.25
         FontStrikethru  =   0   'False
         FontUnderline   =   0   'False
         Height          =   615
         Index           =   0
         Left            =   6000
         LightColor      =   &H80000005&
         ShadowColor     =   &H80000010&
         TabIndex        =   52
         TextColor       =   &H80000008&
         Top             =   240
         VAlignment      =   1   'Bottom
         Width           =   255
      End
      Begin DB_TextClass Notes
         BorderStyle     =   1   'Fixed Single
         Height          =   1095
         Left            =   6480
         MultiLine       =   -1  'True
         pChanged        =   0   'False
         pFormatString   =   ""
         pQBECase        =   0   'Case Sensitive
         pQBEValue       =   ""
         pQueryExpr      =   "NOTES"
         pQueryName      =   "CurrNameQuery"
         pRecState       =   0
         ScrollBars      =   2   'Vertical
         TabIndex        =   49
         Text            =   ""
         Top             =   4080
         Width           =   2895
      End
      Begin DB_TextClass Birthdate
```

INTOUCH.DOC printed 5/3/94

```
        BorderStyle     =   1   'Fixed Single
        Height          =   372
        Left            =   9840
        MultiLine       =   0   'False
        pChanged        =   0   'False
        pFormatString   =   ""
        pQBECase        =   0   'Case Sensitive
        pQBEValue       =   ""
        pQueryExpr      =   "BIRTHDATE"
        pQueryName      =   "CurrNameQuery"
        pRecState       =   0
        ScrollBars      =   0   'None
        TabIndex        =   47
        Text            =   ""
        Top             =   3480
        Width           =   1452
     End
     Begin DB_TextClass DB_Text1
        BorderStyle     =   1   'Fixed Single
        Height          =   375
        Left            =   7800
        MultiLine       =   0   'False
        pChanged        =   0   'False
        pFormatString   =   ""
        pQBECase        =   0   'Case Sensitive
        pQBEValue       =   ""
        pQueryExpr      =   "WORKPHONE"
        pQueryName      =   "CurrNameQuery"
        pRecState       =   0
        ScrollBars      =   0   'None
        TabIndex        =   44
        Text            =   ""
        Top             =   3480
        Width           =   1605
     End
     Begin DB_TextClass HomePhone
        BorderStyle     =   1   'Fixed Single
        Height          =   375
        Left            =   6480
        MultiLine       =   0   'False
        pChanged        =   0   'False
        pFormatString   =   ""
        pQBECase        =   0   'Case Sensitive
        pQBEValue       =   ""
        pQueryExpr      =   "HOMEPHONE"
        pQueryName      =   "CurrNameQuery"
        pRecState       =   0
        ScrollBars      =   0   'None
        TabIndex        =   43
        Text            =   ""
        Top             =   3480
        Width           =   1215
     End
     Begin DB_TextClass Zip
        BorderStyle     =   1   'Fixed Single
        Height          =   375
        Left            =   8520
        MultiLine       =   0   'False
        pChanged        =   0   'False
        pFormatString   =   ""
        pQBECase        =   0   'Case Sensitive
        pQBEValue       =   ""
        pQueryExpr      =   "ZIP"
        pQueryName      =   "CurrNameQuery"
```

119

```
      pRecState        =   0
      ScrollBars       =   0   'None
      TabIndex         =   41
      Text             =   ""
      Top              =   2880
      Width            =   855
   End
   Begin DB_TextClass State
      BorderStyle      =   1   'Fixed Single
      Height           =   372
      Left             =   8040
      MultiLine        =   0   'False
      pChanged         =   0   'False
      pFormatString    =   ""
      pQBECase         =   0   'Case Sensitive
      pQBEValue        =   ""
      pQueryExpr       =   "STATE"
      pQueryName       =   "CurrNameQuery"
      pRecState        =   0
      ScrollBars       =   0   'None
      TabIndex         =   39
      Text             =   ""
      Top              =   2880
      Width            =   372
   End
   Begin DB_TextClass Title
      BorderStyle      =   1   'Fixed Single
      Height           =   375
      Left             =   6480
      MultiLine        =   0   'False
      pChanged         =   0   'False
      pFormatString    =   ""
      pQBECase         =   0   'Case Sensitive
      pQBEValue        =   ""
      pQueryExpr       =   "TITLE"
      pQueryName       =   "CurrNameQuery"
      pRecState        =   0
      ScrollBars       =   0   'None
      TabIndex         =   37
      Text             =   ""
      Top              =   720
      Width            =   2895
   End
   Begin SSCommand Return
      Caption          =   "&Return"
      Height           =   852
      Left             =   240
      Picture          =   SENDLIST.FRX:0238
      TabIndex         =   35
      Top              =   3960
      Width            =   852
   End
   Begin DB_VScrollClass DB_VScroll1
      Height           =   4335
      LargeChange      =   1
      Left             =   1320
      Max              =   10
      Min              =   1
      pMaxOption       =   0   'Use a heuristic for max
      pQueryName       =   "NameQuery"
      SmallChange      =   1
      TabIndex         =   34
      Top              =   720
      Value            =   1
```

INTOUCH.DOC printed 5/3/94

```
   Width           =   375
End
Begin QueryClass CurrNameQuery
   Height          =   495
   Left            =   120
   pConnectName    =   "Connect1"
   pDistinct       =   0   'False
   pErrorOption    =   0   'Display All Errors
   pHDBC           =   0
   pHSTMT          =   0
   pRandEnabled    =   0   'False
   pRecCount       =   1539251482
   pRecNumber      =   -1
   pRowIndex       =   0
   pTables         =   "NAME.DBF NAME1"
   pTranPending    =   0   'False
   pVersion        =   2
   pWhere          =   ""
   Top             =   2160
   Width           =   1215
End
Begin DB_TextClass Lastname
   BorderStyle     =   1   'Fixed Single
   Height          =   375
   Index           =   10
   Left            =   1680
   MultiLine       =   0   'False
   pChanged        =   0   'False
   pFormatString   =   ""
   pQBECase        =   0   'Case Sensitive
   pQBEValue       =   ""
   pQueryExpr      =   "LASTNAME"
   pQueryName      =   "NameQuery"
   pRecState       =   0
   ScrollBars      =   0   'None
   TabIndex        =   33
   Text            =   ""
   Top             =   4320
   Width           =   1695
End
Begin DB_TextClass FirstName
   BorderStyle     =   1   'Fixed Single
   Height          =   375
   Index           =   10
   Left            =   3360
   MultiLine       =   0   'False
   pChanged        =   0   'False
   pFormatString   =   ""
   pQBECase        =   0   'Case Sensitive
   pQBEValue       =   ""
   pQueryExpr      =   "FirstName"
   pQueryName      =   "NameQuery"
   pRecState       =   0
   ScrollBars      =   0   'None
   TabIndex        =   32
   Text            =   ""
   Top             =   4320
   Width           =   1695
End
Begin DB_TextClass Lastname
   BorderStyle     =   1   'Fixed Single
   Height          =   375
   Index           =   9
   Left            =   1680
```

INTOUCH.DOC printed 5/3/94

```
            MultiLine       =   0     'False
            pChanged        =   0     'False
            pFormatString   =   ""
            pQBECase        =   0     'Case Sensitive
            pQBEValue       =   ""
            pQueryExpr      =   "LASTNAME"
            pQueryName      =   "NameQuery"
            pRecState       =   0
            ScrollBars      =   0     'None
            TabIndex        =   31
            Text            =   ""
            Top             =   3960
            Width           =   1695
         End
         Begin DB_TextClass FirstName
            BorderStyle     =   1     'Fixed Single
            Height          =   375
            Index           =   9
            Left            =   3360
            MultiLine       =   0     'False
            pChanged        =   0     'False
            pFormatString   =   ""
            pQBECase        =   0     'Case Sensitive
            pQBEValue       =   ""
            pQueryExpr      =   "FirstName"
            pQueryName      =   "NameQuery"
            pRecState       =   0
            ScrollBars      =   0     'None
            TabIndex        =   30
            Text            =   ""
            Top             =   3960
            Width           =   1695
         End
         Begin DB_TextClass Lastname
            BorderStyle     =   1     'Fixed Single
            Height          =   375
            Index           =   8
            Left            =   1680
            MultiLine       =   0     'False
            pChanged        =   0     'False
            pFormatString   =   ""
            pQBECase        =   0     'Case Sensitive
            pQBEValue       =   ""
            pQueryExpr      =   "LASTNAME"
            pQueryName      =   "NameQuery"
            pRecState       =   0
            ScrollBars      =   0     'None
            TabIndex        =   29
            Text            =   ""
            Top             =   3600
            Width           =   1695
         End
         Begin DB_TextClass FirstName
            BorderStyle     =   1     'Fixed Single
            Height          =   375
            Index           =   8
            Left            =   3360
            MultiLine       =   0     'False
            pChanged        =   0     'False
            pFormatString   =   ""
            pQBECase        =   0     'Case Sensitive
            pQBEValue       =   ""
            pQueryExpr      =   "FirstName"
            pQueryName      =   "NameQuery"
```

122

```
        pRecState       =   0
        ScrollBars      =   0   'None
        TabIndex        =   28
        Text            =   ""
        Top             =   3600
        Width           =   1695
     End
     Begin DB_TextClass Lastname
        BorderStyle     =   1   'Fixed Single
        Height          =   375
        Index           =   7
        Left            =   1680
        MultiLine       =   0   'False
        pChanged        =   0   'False
        pFormatString   =   ""
        pQBECase        =   0   'Case Sensitive
        pQBEValue       =   ""
        pQueryExpr      =   "LASTNAME"
        pQueryName      =   "NameQuery"
        pRecState       =   0
        ScrollBars      =   0   'None
        TabIndex        =   27
        Text            =   ""
        Top             =   3240
        Width           =   1695
     End
     Begin DB_TextClass FirstName
        BorderStyle     =   1   'Fixed Single
        Height          =   375
        Index           =   7
        Left            =   3360
        MultiLine       =   0   'False
        pChanged        =   0   'False
        pFormatString   =   ""
        pQBECase        =   0   'Case Sensitive
        pQBEValue       =   ""
        pQueryExpr      =   "FirstName"
        pQueryName      =   "NameQuery"
        pRecState       =   0
        ScrollBars      =   0   'None
        TabIndex        =   26
        Text            =   ""
        Top             =   3240
        Width           =   1695
     End
     Begin DB_TextClass Lastname
        BorderStyle     =   1   'Fixed Single
        Height          =   375
        Index           =   6
        Left            =   1680
        MultiLine       =   0   'False
        pChanged        =   0   'False
        pFormatString   =   ""
        pQBECase        =   0   'Case Sensitive
        pQBEValue       =   ""
        pQueryExpr      =   "LASTNAME"
        pQueryName      =   "NameQuery"
        pRecState       =   0
        ScrollBars      =   0   'None
        TabIndex        =   25
        Text            =   ""
        Top             =   2880
        Width           =   1695
     End
```

INTOUCH.DOC printed 5/3/94

123

```
Begin DB_TextClass FirstName
    BorderStyle     =   1   'Fixed Single
    Height          =   375
    Index           =   6
    Left            =   3360
    MultiLine       =   0   'False
    pChanged        =   0   'False
    pFormatString   =   ""
    pQBECase        =   0   'Case Sensitive
    pQBEValue       =   ""
    pQueryExpr      =   "FirstName"
    pQueryName      =   "NameQuery"
    pRecState       =   0
    ScrollBars      =   0   'None
    TabIndex        =   24
    Text            =   ""
    Top             =   2880
    Width           =   1695
End
Begin DB_TextClass Lastname
    BorderStyle     =   1   'Fixed Single
    Height          =   375
    Index           =   5
    Left            =   1680
    MultiLine       =   0   'False
    pChanged        =   0   'False
    pFormatString   =   ""
    pQBECase        =   0   'Case Sensitive
    pQBEValue       =   ""
    pQueryExpr      =   "LASTNAME"
    pQueryName      =   "NameQuery"
    pRecState       =   0
    ScrollBars      =   0   'None
    TabIndex        =   23
    Text            =   ""
    Top             =   2520
    Width           =   1695
End
Begin DB_TextClass FirstName
    BorderStyle     =   1   'Fixed Single
    Height          =   375
    Index           =   5
    Left            =   3360
    MultiLine       =   0   'False
    pChanged        =   0   'False
    pFormatString   =   ""
    pQBECase        =   0   'Case Sensitive
    pQBEValue       =   ""
    pQueryExpr      =   "FirstName"
    pQueryName      =   "NameQuery"
    pRecState       =   0
    ScrollBars      =   0   'None
    TabIndex        =   22
    Text            =   ""
    Top             =   2520
    Width           =   1695
End
Begin DB_TextClass Lastname
    BorderStyle     =   1   'Fixed Single
    Height          =   375
    Index           =   4
    Left            =   1680
    MultiLine       =   0   'False
    pChanged        =   0   'False
```

INTOUCH.DOC printed 5/3/94

124

```
        pFormatString   =   ""
        pQBECase        =   0     'Case Sensitive
        pQBEValue       =   ""
        pQueryExpr      =   "LASTNAME"
        pQueryName      =   "NameQuery"
        pRecState       =   0
        ScrollBars      =   0     'None
        TabIndex        =   21
        Text            =   ""
        Top             =   2160
        Width           =   1695
     End
     Begin DB_TextClass FirstName
        BorderStyle     =   1     'Fixed Single
        Height          =   375
        Index           =   4
        Left            =   3360
        MultiLine       =   0     'False
        pChanged        =   0     'False
        pFormatString   =   ""
        pQBECase        =   0     'Case Sensitive
        pQBEValue       =   ""
        pQueryExpr      =   "FirstName"
        pQueryName      =   "NameQuery"
        pRecState       =   0
        ScrollBars      =   0     'None
        TabIndex        =   20
        Text            =   ""
        Top             =   2160
        Width           =   1695
     End
     Begin DB_TextClass Lastname
        BorderStyle     =   1     'Fixed Single
        Height          =   375
        Index           =   3
        Left            =   1680
        MultiLine       =   0     'False
        pChanged        =   0     'False
        pFormatString   =   ""
        pQBECase        =   0     'Case Sensitive
        pQBEValue       =   ""
        pQueryExpr      =   "LASTNAME"
        pQueryName      =   "NameQuery"
        pRecState       =   0
        ScrollBars      =   0     'None
        TabIndex        =   19
        Text            =   ""
        Top             =   1800
        Width           =   1695
     End
     Begin DB_TextClass FirstName
        BorderStyle     =   1     'Fixed Single
        Height          =   375
        Index           =   3
        Left            =   3360
        MultiLine       =   0     'False
        pChanged        =   0     'False
        pFormatString   =   ""
        pQBECase        =   0     'Case Sensitive
        pQBEValue       =   ""
        pQueryExpr      =   "FirstName"
        pQueryName      =   "NameQuery"
        pRecState       =   0
        ScrollBars      =   0     'None
```

INTOUCH.DOC printed 5/3/94

125

```
        TabIndex        =   18
        Text            =   ""
        Top             =   1800
        Width           =   1695
     End
     Begin DB_TextClass Lastname
        BorderStyle     =   1   'Fixed Single
        Height          =   375
        Index           =   2
        Left            =   1680
        MultiLine       =   0   'False
        pChanged        =   0   'False
        pFormatString   =   ""
        pQBECase        =   0   'Case Sensitive
        pQBEValue       =   ""
        pQueryExpr      =   "LASTNAME"
        pQueryName      =   "NameQuery"
        pRecState       =   0
        ScrollBars      =   0   'None
        TabIndex        =   17
        Text            =   ""
        Top             =   1440
        Width           =   1695
     End
     Begin DB_TextClass FirstName
        BorderStyle     =   1   'Fixed Single
        Height          =   375
        Index           =   2
        Left            =   3360
        MultiLine       =   0   'False
        pChanged        =   0   'False
        pFormatString   =   ""
        pQBECase        =   0   'Case Sensitive
        pQBEValue       =   ""
        pQueryExpr      =   "FirstName"
        pQueryName      =   "NameQuery"
        pRecState       =   0
        ScrollBars      =   0   'None
        TabIndex        =   16
        Text            =   ""
        Top             =   1440
        Width           =   1695
     End
     Begin DB_TextClass Lastname
        BorderStyle     =   1   'Fixed Single
        Height          =   375
        Index           =   1
        Left            =   1680
        MultiLine       =   0   'False
        pChanged        =   0   'False
        pFormatString   =   ""
        pQBECase        =   0   'Case Sensitive
        pQBEValue       =   ""
        pQueryExpr      =   "LASTNAME"
        pQueryName      =   "NameQuery"
        pRecState       =   0
        ScrollBars      =   0   'None
        TabIndex        =   15
        Text            =   ""
        Top             =   1080
        Width           =   1695
     End
     Begin DB_TextClass FirstName
        BorderStyle     =   1   'Fixed Single
```

INTOUCH.DOC printed 5/3/94

```
                Height          =   375
                Index           =   1
                Left            =   3360
                MultiLine       =   0    'False
                pChanged        =   0    'False
                pFormatString   =   ""
                pQBECase        =   0    'Case Sensitive
                pQBEValue       =   ""
                pQueryExpr      =   "FirstName"
                pQueryName      =   "NameQuery"
                pRecState       =   0
                ScrollBars      =   0    'None
                TabIndex        =   14
                Text            =   ""
                Top             =   1080
                Width           =   1695
            End
            Begin DB_TextClass Lastname
                BorderStyle     =   1    'Fixed Single
                Height          =   375
                Index           =   0
                Left            =   1680
                MultiLine       =   0    'False
                pChanged        =   0    'False
                pFormatString   =   ""
                pQBECase        =   0    'Case Sensitive
                pQBEValue       =   ""
                pQueryExpr      =   "LASTNAME"
                pQueryName      =   "NameQuery"
                pRecState       =   0
                ScrollBars      =   0    'None
                TabIndex        =   13
                Text            =   ""
                Top             =   720
                Width           =   1695
            End
            Begin DB_TextClass FirstName
                BorderStyle     =   1    'Fixed Single
                Height          =   375
                Index           =   0
                Left            =   3360
                MultiLine       =   0    'False
                pChanged        =   0    'False
                pFormatString   =   ""
                pQBECase        =   0    'Case Sensitive
                pQBEValue       =   ""
                pQueryExpr      =   "FirstName"
                pQueryName      =   "NameQuery"
                pRecState       =   0
                ScrollBars      =   0    'None
                TabIndex        =   12
                Text            =   ""
                Top             =   720
                Width           =   1695
            End
            Begin DB_TextClass Company
                BorderStyle     =   1    'Fixed Single
                Height          =   375
                Left            =   6480
                MultiLine       =   0    'False
                pChanged        =   0    'False
                pFormatString   =   ""
                pQBECase        =   0    'Case Sensitive
                pQBEValue       =   ""
```

INTOUCH.DOC printed 5/3/94

127

```
         pQueryExpr      =   "Company"
         pQueryName      =   "CurrNameQuery"
         pRecState       =   0
         ScrollBars      =   0  'None
         TabIndex        =   11
         Text            =   ""
         Top             =   1320
         Width           =   2895
      End
      Begin DB_TextClass City
         BorderStyle     =   1  'Fixed Single
         Height          =   375
         Left            =   6480
         MultiLine       =   0  'False
         pChanged        =   0  'False
         pFormatString   =   ""
         pQBECase        =   0  'Case Sensitive
         pQBEValue       =   ""
         pQueryExpr      =   "City"
         pQueryName      =   "CurrNameQuery"
         pRecState       =   0
         ScrollBars      =   0  'None
         TabIndex        =   8
         Text            =   ""
         Top             =   2880
         Width           =   1455
      End
      Begin DB_TextClass Address2
         BorderStyle     =   1  'Fixed Single
         Height          =   375
         Left            =   6480
         MultiLine       =   0  'False
         pChanged        =   0  'False
         pFormatString   =   ""
         pQBECase        =   0  'Case Sensitive
         pQBEValue       =   ""
         pQueryExpr      =   "Address2"
         pQueryName      =   "CurrNameQuery"
         pRecState       =   0
         ScrollBars      =   0  'None
         TabIndex        =   6
         Text            =   ""
         Top             =   2280
         Width           =   2895
      End
      Begin DB_TextClass Address1
         BorderStyle     =   1  'Fixed Single
         Height          =   375
         Left            =   6480
         MultiLine       =   0  'False
         pChanged        =   0  'False
         pFormatString   =   ""
         pQBECase        =   0  'Case Sensitive
         pQBEValue       =   ""
         pQueryExpr      =   "Address1"
         pQueryName      =   "CurrNameQuery"
         pRecState       =   0
         ScrollBars      =   0  'None
         TabIndex        =   5
         Text            =   ""
         Top             =   1920
         Width           =   2895
      End
      Begin DB_CommandClass Prev
```

INTOUCH.DOC printed 5/3/94

128

```
        Caption         =   "&Prev"
        Height          =   372
        Left            =   240
        pBefore         =   -1  'True
        pConnectName    =   ""
        pFunction       =   4   ' 4 - Previous
        pQueryName      =   "NameQuery"
        pRecNumber      =   1
        pRowIndex       =   0
        pSQL            =   ""
        TabIndex        =   3
        Top             =   720
        Width           =   852
    End
    Begin DB_CommandClass Next
        Caption         =   "&Next"
        Height          =   372
        Left            =   240
        pBefore         =   -1  'True
        pConnectName    =   ""
        pFunction       =   3   ' 3 - Next
        pQueryName      =   "NameQuery"
        pRecNumber      =   1
        pRowIndex       =   0
        pSQL            =   ""
        TabIndex        =   2
        Top             =   1080
        Width           =   852
    End
    Begin DB_CommandClass New
        Caption         =   "Ne&w"
        Height          =   372
        Left            =   240
        pBefore         =   -1  'True
        pConnectName    =   ""
        pFunction       =   6   ' 6 - New
        pQueryName      =   "NameQuery"
        pRecNumber      =   1
        pRowIndex       =   0
        pSQL            =   ""
        TabIndex        =   0
        Top             =   2880
        Width           =   852
    End
    Begin QueryClass NameQuery
        Height          =   495
        Left            =   120
        pConnectName    =   "Connect1"
        pDistinct       =   0   'False
        pErrorOption    =   0   'Display All Errors
        pHDBC           =   0
        pHSTMT          =   0
        pRandEnabled    =   0   'False
        pRecCount       =   1539251482
        pRecNumber      =   -1
        pRowIndex       =   0
        pTables         =   "NAME.DBF NAME1"
        pTranPending    =   0   'False
        pVersion        =   2
        pWhere          =   " ORDER BY LASTNAME, FIRSTNAME"
        Top             =   1680
        Width           =   1215
    End
    Begin ConnectClass Connect1
```

INTOUCH.DOC printed 5/3/94

```
        Height          =   492
        Left            =   120
        pAutoLogon      =   -1  'True
        pErrorOption    =   0   'Display All Errors
        pLogonInfo      =   ""
        pLogonOption    =   0   'Display logon dialog box on error
        pSource         =   "dBASEFile"
        Top             =   1200
        Width           =   1452
     End
     Begin Label Label2
        BackColor       =   &H00E0FFFF&
        Caption         =   "= Late"
        Height          =   255
        Index           =   0
        Left            =   1080
        TabIndex        =   114
        Top             =   5160
        Width           =   615
     End
     Begin Label Label2
        BackColor       =   &H00E0FFFF&
        Caption         =   "= Send List"
        Height          =   255
        Index           =   1
        Left            =   2040
        TabIndex        =   115
        Top             =   5160
        Width           =   975
     End
     Begin Label Label2
        BackColor       =   &H00E0FFFF&
        Caption         =   "= Card Ordered"
        Height          =   255
        Index           =   2
        Left            =   3480
        TabIndex        =   116
        Top             =   5160
        Width           =   1335
     End
     Begin Label Label2
        BackColor       =   &H00E0FFFF&
        Caption         =   "= Idle"
        Height          =   240
        Index           =   3
        Left            =   5280
        TabIndex        =   117
        Top             =   5160
        Width           =   615
     End
     Begin Label Label1
        BackColor       =   &H00E0FFFF&
        Caption         =   "Sort by:"
        Height          =   255
        Left            =   240
        TabIndex        =   56
        Top             =   120
        Width           =   735
     End
     Begin Line Line1
        X1              =   6360
        X2              =   6360
        Y1              =   120
        Y2              =   5400
```

INTOUCH.DOC printed 5/3/94

```
                                130

End
Begin Label DetailsLabel
   Alignment       =   2    'Center
   BackStyle       =   0    'Transparent
   Caption         =   "Details about Current Name"
   FontBold        =   -1   'True
   FontItalic      =   0    'False
   FontName        =   "Arial"
   FontSize        =   9.75
   FontStrikethru  =   0    'False
   FontUnderline   =   0    'False
   Height          =   255
   Left            =   6480
   TabIndex        =   50
   Top             =   120
   Width           =   2895
End
Begin Label NotesLabel
   BackStyle       =   0    'Transparent
   Caption         =   "Notes"
   Height          =   252
   Left            =   6480
   TabIndex        =   48
   Top             =   3840
   Width           =   1332
End
Begin Label BirthdateLabel
   BackStyle       =   0    'Transparent
   Caption         =   "Birthdate"
   Height          =   252
   Left            =   9840
   TabIndex        =   46
   Top             =   3240
   Width           =   1332
End
Begin Label WorkPhoneLabel
   BackStyle       =   0    'Transparent
   Caption         =   "Work Phone"
   Height          =   255
   Left            =   7800
   TabIndex        =   45
   Top             =   3240
   Width           =   1335
End
Begin Label HomePhoneLabel
   BackStyle       =   0    'Transparent
   Caption         =   "Home Phone"
   Height          =   252
   Left            =   6480
   TabIndex        =   42
   Top             =   3240
   Width           =   1332
End
Begin Label ZipLabel
   BackStyle       =   0    'Transparent
   Caption         =   "Zip"
   Height          =   255
   Left            =   8520
   TabIndex        =   40
   Top             =   2640
   Width           =   375
End
Begin Label StateLabel
   BackStyle       =   0    'Transparent
```

INTOUCH.DOC printed 5/3/94

```
        Caption         =   "State"
        Height          =   255
        Left            =   7920
        TabIndex        =   38
        Top             =   2640
        Width           =   495
    End
    Begin Label TitleLabel
        BackStyle       =   0  'Transparent
        Caption         =   "Title"
        Height          =   252
        Left            =   6480
        TabIndex        =   36
        Top             =   480
        Width           =   1332
    End
    Begin Label CompanyLabel
        BackStyle       =   0  'Transparent
        Caption         =   "Company"
        Height          =   252
        Left            =   6480
        TabIndex        =   10
        Top             =   1080
        Width           =   1332
    End
    Begin Label CityLabel
        BackStyle       =   0  'Transparent
        Caption         =   "City"
        Height          =   252
        Left            =   6480
        TabIndex        =   9
        Top             =   2640
        Width           =   1332
    End
    Begin Label AddressLabel
        BackStyle       =   0  'Transparent
        Caption         =   "Address"
        Height          =   252
        Left            =   6480
        TabIndex        =   7
        Top             =   1680
        Width           =   1332
    End
    Begin Label FirstNameLabel
        BackStyle       =   0  'Transparent
        Caption         =   "First name"
        Height          =   255
        Left            =   3600
        TabIndex        =   4
        Top             =   480
        Width           =   1335
    End
    Begin Label LastNameLabel
        BackStyle       =   0  'Transparent
        Caption         =   "Last name"
        Height          =   255
        Left            =   1680
        TabIndex        =   1
        Top             =   480
        Width           =   1335
    End
End
Sub Command1_Click ()
    If OccasionList.Visible = False Then
```

```
      OccasionList.Visible = True
      OccasionList.SetFocus
    Else
      If OccasionList.Visible = True Then
        OccasionList.Visible = False
      End If
    End If
End Sub Sub CurrNameQuery_eRecLeave (RowIndex As Integer, AbortFunction As Integer)
  res% = fUpdate(CurrNameQuery, 0)
End Sub Sub DBAnniversaryStatus_Change (Index As Integer)
  ShowAnniversaryStatus
End Sub Sub DBBirthdayStatus_Change (Index As Integer)
  ShowBirthdayStatus
End Sub Sub FirstName_GotFocus (Index As Integer)
  RefreshCurrNameQuery Index
End Sub Sub Form_Load ()
  'Start the query to pull name records
  res% = fDoQuery(NameQuery)
  res% = fDoQuery(CurrNameQuery)

'Fill the combo box with dummy sorts
  NameSort.AddItem "All"
  NameSort.AddItem "Clients"
  NameSort.AddItem "Family"
  NameSort.AddItem "Friends"
  NameSort.AddItem "Prospects"

'Set the values for the status lights
  ShowAnniversaryStatus
  ShowBirthdayStatus 'Fill the occasion list with holidays
  OccasionList.AddItem "Anniversary", 0
  OccasionList.AddItem "Birthday", 1
  OccasionList.AddItem "Christmas", 2
  OccasionList.AddItem "Easter", 3
  OccasionList.AddItem "Mother's Day", 4
  OccasionList.AddItem "St. Patrick's Day", 5
  OccasionList.AddItem "Valentine's Day", 6

'Select the appropriate occasions
  OccasionList.ListTagged(0) = True
  OccasionList.ListTagged(1) = True
  OccasionList.ListTagged(2) = True
End Sub Sub Form_Unload (Cancel As Integer)
  'Shut down the Q&E name query
  res% = fEndQuery(NameQuery)
  res% = fEndQuery(CurrNameQuery)
End Sub Sub LastName_Change (Index As Integer)
```

INTOUCH.DOC printed 5/3/94

```
    'MsgBox "Lastname " & Str$(Index) & " changed"
End Sub

Sub Lastname_GotFocus (Index As Integer)
    'MsgBox "Lastname " & Str$(Index) & " got focus"
    RefreshCurrNameQuery Index
End Sub Sub NameQuery_eFetch (RowIndex As Integer)
    'MsgBox "Got record " & Str$(RowIndex)
End Sub Sub NameQuery_eRecLeave (RowIndex As Integer, AbortFunction As Integer)
    'MsgBox "Left record " & Str$(RowIndex)
    'Update automatically every time we leave
    res% = fUpdate(NameQuery, 0)
End Sub Sub RefreshCurrNameQuery (Index As Integer)
    'Refresh current name query
    res% = fEndQuery(CurrNameQuery)
    CurrNameQuery.pWhere = "LastName = '" & LastName(Index).Text & "' AND FirstName = '" &
FirstName(Index).Text & "'"
    res% = fDoQuery(CurrNameQuery)
End Sub Sub Return_Click ()
    Unload SendList
End Sub Sub ShowAnniversaryStatus ()
    'Make the status symbols for anniversary change colors
    For IndexNum = 0 To 11 Step 1
        If DBAnniversaryStatus(IndexNum).Text = "" Then
            AnniversaryStatus(IndexNum).Value = 3
        Else
            Select Case DBAnniversaryStatus(IndexNum).Text
                Case "0"
                    AnniversaryStatus(IndexNum).Value = 0
                Case "1"
                    AnniversaryStatus(IndexNum).Value = 1
                Case "2"
                    AnniversaryStatus(IndexNum).Value = 2
            End Select
        End If
    Next IndexNum
End Sub Sub ShowBirthdayStatus ()
    'Make the status symbols for birthday change colors
    For IndexNum = 0 To 11 Step 1
        If DBBirthdayStatus(IndexNum).Text = "" Then
            BirthdayStatus(IndexNum).Value = 3
        Else
            Select Case DBBirthdayStatus(IndexNum).Text
                Case "0"
                    BirthdayStatus(IndexNum).Value = 0
                Case "1"
                    BirthdayStatus(IndexNum).Value = 1
                Case "2"
                    BirthdayStatus(IndexNum).Value = 2
            End Select
        End If
```

```
    Next IndexNum
End Sub
```

ZOOMIMAG.FRM

```
VERSION 2.00
Begin Form ZoomImage
    BackColor       =   &H00E0FFFF&
    Caption         =   " "
    ClientHeight    =   6825
    ClientLeft      =   75
    ClientTop       =   330
    ClientWidth     =   9465
    Height          =   7230
    Left            =   15
    LinkTopic       =   "Form1"
    ScaleHeight     =   6825
    ScaleWidth      =   9465
    Top             =   -15
    Width           =   9585
    Begin SSCheck Check3D3
        Height          =   195
        Left            =   8925
        TabIndex        =   20
        Top             =   5880
        Width           =   160
    End
    Begin Mh3dButn SelectCards
        Alignment       =   2  'Center
        Caption         =   "Sign?"
        CaptionBottom   =   100
        CaptionLeft     =   45
        CaptionRight    =   45
        FontTransParent =   -1  'True
        Height          =   615
        Left            =   8640
        LightColor      =   &H00FFFFFF&
        MultiLine       =   -1  'True
        OuterFillColor  =   &H00C0C0C0&
        PictureAutosize =   0   'False
        ShadowColor     =   &H00808080&
        TabIndex        =   23
        TextFillColor   =   &H00C0C0C0&
        Top             =   5520
        Width           =   735
    End
    Begin SSCommand Send
        Caption         =   "&Send"
        Height          =   615
        Left            =   8640
        TabIndex        =   19
        Top             =   6120
        Width           =   735
    End
    Begin SSPanel Panel3D4
        BevelInner      =   1  'Inset
        BevelWidth      =   2
        Height          =   1215
        Left            =   2760
        TabIndex        =   12
        Top             =   7800
        Visible         =   0  'False
        Width           =   2655
```

INTOUCH.DOC printed 5/3/94

```
                Begin SSCommand InsertDone
                    Caption         =   "&Done"
                    Height          =   375
                    Left            =   240
                    TabIndex        =   18
                    Top             =   600
                    Width           =   615
                End
                Begin SSCheck Letter
                    Caption         =   "Letter"
                    Height          =   255
                    Left            =   960
                    TabIndex        =   16
                    Top             =   840
                    Width           =   1095
                End
                Begin SSCheck Confetti
                    Caption         =   "Confetti"
                    Height          =   255
                    Left            =   960
                    TabIndex        =   15
                    Top             =   120
                    Width           =   975
                End
                Begin SSCheck Donation
                    Caption         =   "Donation"
                    Height          =   255
                    Left            =   960
                    TabIndex        =   14
                    Top             =   360
                    Width           =   1095
                End
                Begin SSCheck GiftCertificate
                    Caption         =   "Gift Certificate"
                    Height          =   255
                    Left            =   960
                    TabIndex        =   13
                    Top             =   600
                    Width           =   1575
                End
                Begin Label Insert
                    BackStyle       =   0   'Transparent
                    Caption         =   "Insert:"
                    Height          =   255
                    Left            =   240
                    TabIndex        =   17
                    Top             =   240
                    Width           =   615
                    WordWrap        =   -1  'True
                End
            End
            Begin SSCommand ChooseInsert
                Caption             =   "&Insert"
                Height              =   615
                Left                =   8640
                TabIndex            =   11
                Top                 =   4320
                Width               =   735
            End
            Begin SSCommand Preview
                Caption             =   "P&review"
                Height              =   615
                Left                =   8640
                TabIndex            =   9
```

INTOUCH.DOC printed 5/3/94

```
            Top             =   4920
            Width           =   735
        End
        Begin CommonDialog CMDialog1
            Flags           =   3
            Left            =   8880
            Top             =   3000
        End
        Begin SSCommand Font
            Caption         =   "&Font"
            Height          =   615
            Left            =   8640
            TabIndex        =   8
            Top             =   3720
            Width           =   735
        End
        Begin TextBox InsideMessage
            Alignment       =   2  'Center
            BorderStyle     =   0  'None
            FontBold        =   0  'False
            FontItalic      =   0  'False
            FontName        =   "CG Times"
            FontSize        =   13.5
            FontStrikethru  =   0  'False
            FontUnderline   =   0  'False
            Height          =   2175
            Left            =   4560
            MultiLine       =   -1 'True
            TabIndex        =   6
            Text            =   "Inside Message"
            Top             =   840
            Width           =   3615
        End
        Begin DB_CommandClass Prev
            Caption         =   "&Prev"
            Height          =   375
            Left            =   8640
            pBefore         =   -1 'True
            pConnectName    =   ""
            pFunction       =   4  ' 4 - Previous
            pQueryName      =   "Cards.CardQuery"
            pRecNumber      =   1
            pRowIndex       =   0
            pSQL            =   ""
            TabIndex        =   4
            Top             =   960
            Width           =   735
        End
        Begin DB_CommandClass Next
            Caption         =   "&Next"
            Height          =   375
            Left            =   8640
            pBefore         =   -1 'True
            pConnectName    =   ""
            pFunction       =   3  ' 3 - Next
            pQueryName      =   "Cards.CardQuery"
            pRecNumber      =   1
            pRowIndex       =   0
            pSQL            =   ""
            TabIndex        =   3
            Top             =   1320
            Width           =   735
        End
        Begin SSCommand Return
```

INTOUCH.DOC printed 5/3/94

```
            Caption         =   "&Return"
            Height          =   855
            Left            =   8640
            Picture         =   ZOOMIMAG.FRX:0000
            TabIndex        =   2
            Top             =   2040
            Width           =   735
         End
         Begin ImageMan ImageMan1
            AutoDraw        =   -1  'True
            BackColor       =   &H00FFFFFF&
            Ext             =   ""
            Height          =   6615
            Left            =   120
            Picture         =   ""
            ScaleHeight     =   0
            ScaleLeft       =   0
            ScaleMode       =   0   'User
            ScaleTop        =   0
            ScaleWidth      =   0
            Scrollbars      =   0   'False
            Select          =   0   'False
            TabIndex        =   1
            Top             =   180
            Width           =   4095
         End
         Begin DB_TextClass YourMessage
            BorderStyle     =   1   'Fixed Single
            Height          =   2655
            Index           =   0
            Left            =   4560
            MultiLine       =   -1  'True
            pChanged        =   0   'False
            pFormatString   =   ""
            pQBECase        =   0   'Case Sensitive
            pQBEValue       =   ""
            pQueryExpr      =   ""
            pQueryName      =   ""
            pRecState       =   0
            ScrollBars      =   0   'None
            TabIndex        =   0
            Text            =   ""
            Top             =   3360
            Width           =   3615
         End
         Begin DB_TextClass YourMessage
            BorderStyle     =   0   'None
            Height          =   2655
            Index           =   1
            Left            =   4560
            MultiLine       =   -1  'True
            pChanged        =   0   'False
            pFormatString   =   ""
            pQBECase        =   0   'Case Sensitive
            pQBEValue       =   ""
            pQueryExpr      =   ""
            pQueryName      =   ""
            pRecState       =   0
            ScrollBars      =   0   'None
            TabIndex        =   10
            Text            =   ""
            Top             =   3360
            Visible         =   0   'False
            Width           =   3615
```

INTOUCH.DOC printed 5/3/94

138

```
        End
        Begin Label Label3
            Alignment       =   2  'Center
            BackColor       =   &H00E0FFFF&
            Caption         =   "Card for Terry"
            Height          =   495
            Left            =   8640
            TabIndex        =   22
            Top             =   120
            Width           =   735
        End
        Begin Label Signature
            Alignment       =   2  'Center
            Caption         =   "Susan Wayde"
            FontBold        =   0   'False
            FontItalic      =   0   'False
            FontName        =   "Script"
            FontSize        =   22.5
            FontStrikethru  =   0   'False
            FontUnderline   =   0   'False
            Height          =   550
            Left            =   5880
            TabIndex        =   21
            Top             =   6120
            Visible         =   0   'False
            Width           =   2055
        End
        Begin Label YourMessageLabel
            Caption         =   "Your message:"
            Height          =   255
            Left            =   4560
            TabIndex        =   7
            Top             =   3120
            Width           =   1335
        End
        Begin Label Label1
            BorderStyle     =   1  'Fixed Single
            Height          =   6615
            Left            =   4200
            TabIndex        =   5
            Top             =   180
            Width           =   4335
        End
    End
End
'Force all variables to be declared
Option Explicit Sub Check3D3_Click (Value As Integer)
  Select Case Value
    Case True
      Signature.Visible = True
    Case False
      Signature.Visible = False
  End Select
End Sub Sub ChooseInsert_Click ()
  Panel3D4.Visible = True
End Sub Sub Command3D1_Click ()
  'Panel3D1.Visible = True
End Sub
```

INTOUCH.DOC printed 5/3/94

```
Sub Command3D2_Click ()
  'Panel3D1.Visible = False
End Sub

Sub Font_Click ()
  'Open font selection dialog box
  CMDialog1.Action = 4
  'Assign the selected font
  If YourMessage(0).Text = "" Then
    Else
       YourMessage(0).FontName = CMDialog1.FontName
       YourMessage(0).FontSize = CMDialog1.FontSize
       YourMessage(0).FontItalic = CMDialog1.FontItalic
       YourMessage(0).FontBold = CMDialog1.FontBold
  End If
End Sub Sub Form_Load ()
  'Place borderless control and make it borderless
  'YourMessage(1).Top = 3360
  'YourMessage(1).Left = 4560

Panel3D4.Left = 6720
  Panel3D4.Top = 4080
  'Panel3D1.Left = 7920
  'Panel3D1.Top = 5880
End Sub Sub InsertDone_Click ()
  Panel3D4.Visible = False
End Sub Sub Next_Click ()
  If CurrIndex = 5 Then
    CurrIndex = 0
  Else
    CurrIndex = CurrIndex + 1
  End If
  AssignZoomImage
End Sub Sub Prev_Click ()
  If CurrIndex = 0 Then
    CurrIndex = 5
  Else
    CurrIndex = CurrIndex - 1
  End If
  AssignZoomImage
End Sub Sub Preview_Click ()
  'Set the borderless message box to the same properties as the bordered one
  'YourMessage(1) is the borderless box; YourMessage(0) has a border
  If YourMessage(0).Text = "" Then
    YourMessage(1).Text = ""
  Else
    YourMessage(1).Text = YourMessage(0).Text
    YourMessage(1).FontName = YourMessage(0).FontName
    YourMessage(1).FontSize = YourMessage(0).FontSize
    YourMessage(1).FontItalic = YourMessage(0).FontItalic
    YourMessage(1).FontBold = YourMessage(0).FontBold
  End If
  'Replace the bordered message box with the borderless one
```

INTOUCH.DOC printed 5/3/94

```
   Select Case YourMessage(0).Visible
      Case False
         YourMessage(0).Visible = True
      Case True
         YourMessage(0).Visible = False
   End Select
   Select Case YourMessage(1).Visible
      Case False
         YourMessage(1).Visible = True
      Case True
         YourMessage(1).Visible = False
   End Select
   Select Case YourMessageLabel.Visible
      Case False
         YourMessageLabel.Visible = True
      Case True
         YourMessageLabel.Visible = False
   End Select
End Sub Sub Return_Click ()
   Unload ZoomImage
End Sub Sub SelectCards_Click ()
   'Check3D3_Click
End Sub Sub Send_Click ()
   Load Order
   Unload ZoomImage
   Unload Cards
End Sub Sub YourMessage_Change (Index As Integer)
   'YourMessage(1).Text = YourMessage(0).Text
End Sub
```

GLOBAL.BAS

```
'Force all variables to be declared
Option Explicit

'Declare variable to hold original directory (so we can set it back after options that change it)
Global StartupCurDir As String 'Declare variable to hold current index value on card selection and zoom screens
Global CurrIndex As Integer Sub AssignZoomImage ()
   ZoomImage.ImageMan1.Picture = Cards.ImageMan1(CurrIndex).Picture
   ZoomImage.InsideMessage.Text = Cards.DBMessage(CurrIndex).Text
End Sub
```

Summary

Project Name: J:\VBWIN30\CONTACK\INTOUCH.DOC

05/03/94

File Name　　　　　　　　　　　　　　File Size

INTOUCH.DOC printed 5/3/94

| File Name | File Size |
|---|---|
| CARDMAIN.FRM | 15169 |
| CARDS.FRM | 38660 |
| CHOICES.FRM | 14886 |
| DATES.FRM | 29732 |
| MAINMENU.FRM | 10615 |
| NAMES.FRM | 46293 |
| ORDER.FRM | 12028 |
| ORDERSUM.FRM | 34746 |
| SENDLIST.FRM | 71079 |
| ZOOMIMAG.FRM | 11882 |
| GLOBAL.BAS | 471 |
| Summary | |

What is claimed is:

1. A method for on-going management, selection, and delivery of social expression cards, the method comprising the steps of:
   (a) storing data in one or more databases, the data including recipient data and social expression card data;
   (b) linking the recipient data with the social expression card data thereby forming linked data to facilitate the on-going management, selection, and delivery of the social expression cards;
   (c) providing a user interface to permit a user to access the data to permit the user to manage, select, and facilitate the delivery of the social expression cards;
   (d) receiving and accepting a social expression card order from the user, the social expression card order indicating a user-selected method of delivering the social expression card; and
   (e) delivering the social expression card to a recipient according to the user-selected method of delivery.

2. The method as recited in claim 1 further comprising the step of graphically displaying the social expression card data and the recipient data on a display device, the display device providing the user with the user interface through which the user selects the social expression cards to be delivered and manages the selection and delivery of the social expression cards.
   a) providing at least one of a recipient name and a recipient address;
   b) selecting a social expression card to which to send to the recipient address;
   c) displaying an icon on the display device representative of a social expression card order; and
   d) clicking on an icon to cause the order to be processed.

3. The method as recited in claim 2, further including the steps of:
   a) providing at least one of a recipient name and a recipient address;
   b) selecting a social expression card to which to send to the recipient address;
   c) displaying an icon on the display device representative of a social expression card order; and
   d) clicking on an icon to cause the order to be processed.

4. The method as recited in claim 2, further comprising the steps of:
   (a) displaying a recipient name on the display device;
   (b) displaying an icon representative of a recipient occasion associated with the recipient name; and
   (c) displaying a graphical representation of an envelope indicating a social expression card status for the recipient occasion associated with the recipient name.

5. The method as recited in claim 4 wherein the graphical representation of the envelope is an envelope icon configured to indicate at least one of status and a degree of urgency associated with the occasion.

6. The method as recited in claim 2, further including the step of selectively displaying the data on the display device, based on a user-selected filter to facilitate displaying a selected portion of the data.

7. The method as recited in claim 2, further including the step of displaying at least a portion of at least one of the recipient data and the social expression card data according to a user-selected sorting algorithm to place the data displayed on the display device in a predetermined ordered arrangement.

8. The method as recited in claim 2, further comprising the step of displaying a graphical image of a social expression card on the display device.

9. The method recited in claim 2, further comprising the step of displaying textual data and graphical data associated with the social expression card on the display device.

10. The method as recited in claim 2 further including the step of arranging into a list, preselected portions of the recipient data, the list representing a plurality of preselected recipients to whom cards are to be sent.

11. The method as recited in claim 2 further including the step of accessing the databases at remote computing location via the user interface.

12. The method as recited in claim 11 wherein the databases at the remote computing location are accessed by the user via an interactive television device operatively linked to the user interface.

13. The method as recited in claim 1, wherein the user interface facilitates design of a social expression card by the user by permitting the user to modify the social expression card data.

14. The method as recited in claim 1, wherein the user interface facilitates design of a social expression card by the user by permitting the user to enter new social expression card data.

15. The method as recited in claim 1, wherein the step of storing the recipient data includes the steps of:
   a) storing recipient identification data, including a recipient name and a recipient address; and
   b) storing recipient occasion data, including a recipient occasion identification and recipient order history data.

16. The method as recited in claim 15, further comprising the step of linking the recipient data and the social expression card data, with the recipient occasion identification data and the recipient order history data to associate the recipient occasion identification and the recipient order history data with the social expression card data.

17. The method as recited in claim 15 further including the steps of:
   (a) selecting the social expression card for delivery to the recipient according to an occasion, the occasion corresponding to the recipient occasion identification;
   (b) selecting the social expression card according to a predetermined user preference; and
   (c) facilitating the delivery of the social expression card to the recipient.

18. The method as recited in claim 17 wherein delivery of the social expression card is performed by electronic mail such that the recipient receives a graphical representation of the social expression card and an electronic message on a display device.

19. The method as recited in claim 1, wherein the step of storing data in one or more databases includes the steps of storing card design data representative of the social expression card and storing card selection data associating the social expression card with a recipient.

20. The method recited in claim 1, further comprising the step of selecting a group of recipients to whom to deliver the social expression cards.

21. The method recited in claim 1, further comprising the step of printing the social expression card on a printing device located at a user location.

22. The method recited in claim 1, further comprising the step of printing the social expression card on a printing device remotely located from a user location.

23. The method recited in claim 1, further comprising the step of maintaining recipient order history data to facilitate on-going tracking of information pertaining to user selection and delivery of the social expression cards over time.

24. The method as recited in claim 1, further comprising the steps of storing the social expression card data and storing gift data in one or more databases and linking the gift data to the recipient data to maintain an on-going history of the social expression cards and gifts received over time by the recipients.

25. The method recited in claim 1, further comprising the steps of:
   a) selecting a recipient to which the social expression card is to be sent;
   b) selecting a send-by-date representing a date by which the social expression card is to be sent to the recipient; and
   c) placing a social expression card order so that the social expression card is sent to the recipient at least by the send-by-date.

26. The method recited in claim 25, further comprising the step of sending a gift to the recipient by the send-by-date.

27. The method recited in claim 26, further comprising the step of notifying the user when at least one of the social expression card and a gift has been sent to the recipient.

28. The method recited in claim 27, further comprising the step of notifying the user by sending the user an electronic message.

29. The method recited in claim 25 wherein the social expression card is represented by data entered by the user through the user interface.

30. The method recited in claim 1, further including the step of notifying the user when an occasion for which a social expression card is typically sent is approaching, the notification occurring prior to a date of the occasion.

31. The method recited in claim 30, wherein the step of notifying the user is performed by sending the user an electronic message.

32. A computer program product for causing a computer to provide a user interface to permit a user to direct the management, selection, and delivery of social expression cards, the computer program product comprising:
   a) a computer-usable medium having encoded therein
   b) a first computer-readable program code to cause the computer to store data, including at least recipient data and social expression card data, in one or more databases;
   c) a second computer-readable program code to cause the computer to link at least the recipient data with the social expression card data thereby forming linked data to facilitate on-going management, selection, and delivery of the social expression cards;
   d) a third computer-readable program code to cause the computer to provide a user interface to permit the user to access at least a portion of the recipient data and the social expression card data to permit the user to manage, select, and facilitate the delivery of the social expression card to a recipient;
   e) a fourth computer-readable program code encoded therein to cause the computer to permit the user to select a recipient to whom the social expression card is to be sent;
   f) a fifth computer-readable program code encoded therein to cause the computer to permit the user to select a send-by-date representing a date by which the social expression card is to be sent to the recipient;
   g) a sixth computer-readable program code encoded therein to cause the computer to permit the user to place a social expression card order so that the social expression card is sent to the recipient and received by the recipient by the send-by-date, the send-by-date selected to be a predetermined number of days prior to a date of a recipient occasion associated with the recipient; and
   h) a seventh computer-readable program code encoded therein to cause the computer to facilitate sending a gift to the recipient by the send-by-date.

33. The computer program product as recited in claim 32, further comprising an eighth computer-readable program code encoded therein to cause the computer to notify the user when at least one of the social expression card and the gift has been sent to the recipient, the step of notifying the user performed by sending the user an electronic message.

34. The computer program product as recited in claim 32, wherein the social expression card is represented by data entered by the user through the user interface.

35. The computer program product as recited in claim 32, further comprising an eighth computer-readable program code encoded therein to cause the computer to graphically display at least a portion of the social expression card data and the recipient data on a display device, the display device providing the user with the user interface through which the user selects the social expression cards to be delivered and manages the on-going delivery of the social expression cards.

36. The computer program product as recited in claim 35, further comprising a ninth computer-readable program code encoded therein to cause the computer to permit the user to design a social expression card by permitting the user to modify the social expression card data.

37. The computer program product as recited in claim 35, further comprising a ninth computer-readable program code encoded therein to cause the computer to permit the user to design a social expression card by permitting the user to enter social expression card data.

38. A computer program product for causing a computer to provide a user interface to permit a user to direct the management, selection, and delivery of social expression cards, the computer program product comprising:
   a) a computer-usable medium having encoded therein
   b) a first computer-readable program code to cause the computer to store data, including at least recipient data and social expression card data, in one or more databases;
   c) a second computer-readable program code to cause the computer to link at least the recipient data with the social expression card data thereby forming linked data to facilitate on-going management, selection, and delivery of the social expression cards,
   d) a third computer-readable program code to cause the computer to provide a user interface to permit the user to access at least a portion of the recipient data and the social expression card data, to permit the user to manage, select, and facilitate the delivery of the social expression card to a recipient;
   e) a fourth computer-readable program code encoded therein to cause the computer to accept a social expression card order from the user, the social expression card order indicating a user-selected method of delivering the social expression card; and
   f) a fifth computer-readable program code encoded therein to cause the computer to facilitate the delivery of the social expression card to the recipient according to the user-selected method.

39. The computer program product as recited in claim 38, further comprising:

a) a sixth computer-readable program code encoded therein to cause the computer to accept one of a recipient name and a recipient address selected by the user;

b) a seventh computer-readable program code encoded therein to cause the computer to accept a social expression card selection determined by the user, the social expression card selection facilitating the sending of a social expression card to the recipient address;

c) an eighth computer-readable program code encoded therein to cause the computer to display an icon on the display device representative of a social expression card order; and d) a ninth computer-readable program code encoded therein to cause the computer to permit the user to click on the icon to cause the order to be processed and the social expression card to be sent to the recipient address.

40. The computer program product as recited in claim 38, further comprising:

a) a sixth computer-readable program code encoded therein to cause the computer to display a recipient name;

b) a seventh computer-readable program code encoded therein to cause the computer to display an icon representative of a recipient occasion associated with said recipient name; and c) an eighth computer-readable program code encoded therein to cause the computer to display a graphical representation of an envelope indicating a social expression card status for the recipient occasion associated with the recipient name.

41. The computer program product as recited in claim 38, further comprising a sixth computer-readable program code encoded therein to cause the computer to selectively display at least a portion of the recipient data and the social expression card data, including the linked data, based on a user-selected filter to facilitate displaying a selected portion of the data.

42. The computer program product as recited in claim 38, further comprising a sixth computer-readable program code encoded therein to cause the computer to display at least a portion of the recipient data and the social expression card data, according to a user selected sorting algorithm.

43. The computer program product as recited in claim 38, further comprising a sixth computer-readable program code encoded therein to cause the computer to print the social expression card on a printing device located at a user location.

44. The computer program product as recited in claim 38, further comprising a sixth computer-readable program code encoded therein to cause the computer to print the social expression card on a printing device remotely located from a user location.

45. A computer program product for causing a computer to provide a user interface to permit a user to direct the management, selection, and delivery of social expression cards, the computer program product comprising:

a) a computer-usable medium having encoded therein;

b) a first computer-readable program code to cause the computer to store data, including at least recipient data and social expression card data, in one or more databases;

c) a second computer-readable program code to cause the computer to link at least the recipient data with the social expression card data thereby forming linked data to facilitate on-going management selection, and delivery of the social expression cards;

d) a third computer-readable program code to cause the computer to provide a user interface to permit the user to access at least a portion of the recipient data and the social expression card data, to permit the user to manage, select, and facilitate the delivery of the social expression card to a recipient; and e) a fourth computer-readable program code encoded therein to cause the computer to link the recipient data and the social expression card data with recipient occasion identification data and recipient order history data, to operatively associate the recipient occasion identification data and the recipient order history data with the social expression card data.

46. A computer program product for causing a computer to provide a user interface to permit a user to direct the management, selection, and delivery of social expression cards, the computer program product comprising:

a) a computer-usable medium having encoded therein;

b) a first computer-readable program code to cause the computer to store data, including at least recipient data and social expression card data, in one or more databases;

c) a second computer-readable program code to cause the computer to link at least the recipient data with the social expression card data thereby forming linked data to facilitate on-going management, selection, and delivery of the social expression cards;

d) a third computer-readable program code to cause the computer to provide a user interface to permit the user to access at least a portion of the recipient data and the social expression card data, to permit the user to manage, select, and facilitate the delivery of the social expression card to a recipient;

e) a fourth computer-readable program code encoded therein to cause the computer to store the social expression card data and gift data; and f) a fifth computer-readable program code encoded therein to cause the computer to link the gift data to the recipient data to maintain an on-going history of social expression cards and gifts received over time by the recipients.

47. A computer program product for causing a computer to provide a user interface to permit a user to direct the management, selection, and delivery of social expression cards, the computer program product comprising:

a) a computer-usable medium having encoded therein;

b) a first computer-readable program code to cause the computer to store data, including at least recipient data and social expression card data, in one or more databases;

c) a second computer-readable program code to cause the computer to link at least the recipient data with the social expression card data thereby forming linked data to facilitate on-going management, selection, and delivery of the social expression cards;

d) a third computer-readable program code to cause the computer to provide a user interface to permit the user to access at least a portion of the recipient data and the social expression card data, to permit the user to manage, select, and facilitate the delivery of the social expression card to a recipient; and e) a fourth computer-readable program code encoded therein to cause the computer to notify the user when an occasion for which a social expression card is to be sent is approaching, the notification occurring prior to a date of the occasion.

48. The computer program product as recited in claim 47, further comprising
   a fifth computer-readable program code encoded therein to cause the computer to prepare a social expression card for delivery to the recipient according to the occasion and according to a predetermined user preference; and
   a sixth computer-readable program code encoded therein to cause the computer to facilitate the delivery of the social expression card to the recipient.

49. The computer program product as recited in claim 48, further comprising a seventh computer-readable program code encoded therein to cause the computer to deliver the social expression card to the recipient by electronic means.

50. The computer program product as recited in claim 48, wherein the sixth computer-readable program code causes the computer to deliver the social expression card to the recipient by electronic means such that the recipient receives an electronic message, including a graphical representation of the social expression card.

51. A computer system for on-going management, selection, and delivery of social expression cards, the system comprising:
   a) storage means for storing data, including at least card recipient data and social expression card data, in one or more databases;
   b) linking means coupled to the storage means, for linking the card recipient data with the social expression card data thereby forming linked data to facilitate on-going management of social expression card selection and social expression card delivery;
   c) a user interface coupled to the storage means permitting a user to access said at least card recipient data and the social expression card data to permit the user to manage, select, and facilitate the delivery of the social expression card;
   d) social expression card order means for accepting a social expression card order from the user, the social expression card order indicating a user-selected method of delivering the social expression card to the recipient; and
   e) delivery means responsive to the social expression card order means for facilitating delivery of the social expression card to the recipient according to the user-selected method.

52. The computer system as recited in claim 51, further comprising a display device for graphically displaying at least the card recipient data and the social expression card data, the display device providing the user with the user interface through which the user selects the social expression cards to be delivered and manages the delivery of the social expression cards.

53. The computer system as recited in claim 52, further comprising:
   a) first display means for displaying a recipient name on the display device, the recipient name corresponding to the recipient data;
   b) second display means for displaying an icon on the display device, the icon representative of a recipient occasion, the recipient occasion associated with the recipient name; and
   c) third display means for displaying a graphical representation of an envelope on the display device, the graphical representation indicating a social expression card status for the recipient occasion associated with the recipient name.

54. The computer system as recited in claim 52, wherein the display device is responsive to a user-selected filter to permit selective displaying of a portion of the social expression card data.

55. The computer system as recited in claim 52, wherein the display device displays at least a portion of at least of the recipient data and the social expression card data according to a user-selected sorting algorithm to place the data in a predetermined ordered arrangement.

56. The computer system as recited in claim 51, further comprising a social expression card design means for permitting the user to create a social expression card design by creating social expression card data, the design means providing the computer system with the social expression card data for storage.

57. The computer system as recited in claim 51, further comprising notifying means for notifying the user when an occasion for which a card is to be sent is approaching.

58. The computer system as recited in claim 57 wherein the user is notified by receiving an electronic message.

59. The computer system as recited in claim 57, further comprising:
   a) preparing means for preparing a social expression card for delivery to a recipient, the preparing performed according to the occasion and according to a predetermined user preference; and
   b) delivery means for delivering the social expression card to the recipient.

60. The computer system as recited in claim 57, wherein the delivery means delivers the social expression card to the recipient by electronic means such that the recipient views the social expression card on a display device.

61. The computer system as recited in claim 51 wherein the social expression card data is stored at an external location and is accessed via a communication link.

62. The computer system as recited in claim 51 including means for permitting the user to add a personal message to the card recipient data.

63. The computer system as recited in claim 51 including means for permitting the user to add a digitized personal signature to the card recipient data.

64. The computer system as recited in claim 51, including means for permitting the user to select a mode of card delivery.

65. The computer system as recited in claim 51, including means for arranging into a list, preselected portions of the card recipient data, the list representing a plurality of preselected recipients to whom cards are to be sent.

66. The computer system as recited in claim 51 wherein the databases are located at a remote computing location.

67. The computer system as recited in claim 66 further including an interactive television device operatively linked to the user interface, the interactive television device permitting the user to access the databases located at the remote computing location.

68. A computer system for on-going management, selection, and delivery of social expression cards, the system comprising:
   a) storage means for storing data, including at least card recipient data and social expression card data, in one or more databases;
   b) linking means coupled to the storage means, for linking the card recipient data with the social expression card data thereby forming linked data to facilitate on-going management of social expression card selection and social expression card delivery;

c) a user interface coupled to the storage means permitting a user to access said at least card recipient data and the social expression card data to permit the user to manage, select, and facilitate the delivery of the social expression card; and d) second linking means for linking the card recipient data and the social expression card data with recipient occasion identification and recipient order history data, to associate the recipient occasion identification and the recipient order history data with the social expression card data.

69. The computer system as recited in claim 68, further comprising a printing device located at a user location to print the social expression card.

70. The computer system as recited in claim 68, further comprising a printing device remotely located from a user location to print the social expression card.

71. The computer system as recited in claim 68, further comprising maintenance means for maintaining order history data to facilitate tracking of information pertaining to user selection and delivery of the social expression cards over time.

72. A computer system for on-going management, selection, and delivery of social expression cards, the system comprising:

a) storage means for storing data, including at least card recipient data and social expression card data, in one or more databases;

b) linking means coupled to the storage means, for linking the card recipient data with the social expression card data thereby forming linked data to facilitate on-going management of social expression card selection and social expression card delivery;

c) a user interface coupled to the storage means permitting a user to access said at least card recipient data and the social expression card data to permit the user to manage, select, and facilitate the delivery of the social expression card, d) second storage means for storing social expression card data and gift data; and e) second linking means for linking the gift data to the recipient data to maintain an on-going history of social expression cards and gifts received by a recipient over time.

73. A computer system for on-going management, selection, and delivery of social expression cards, the system comprising:

a) a memory configured to store at least card recipient data and social expression card data, in one or more databases;

b) a processor coupled to the memory programmed to link the card recipient data with the social expression card data thereby forming linked data to facilitate on-going management of social expression card selection and social expression card delivery;

c) a user interface coupled to the memory and to the processor, configured to permit a user to access at least a portion of the card recipient data and the social expression card data to permit the user to manage, select, and facilitate the delivery of the social expression card;

d) first display means for displaying a recipient name on the display device, the recipient name corresponding to the recipient data;

e) second display means for displaying an icon on the display device, the icon representative of a recipient occasion, the recipient occasion associated with the recipient name; and f) third display means for displaying a graphical representation of an envelope on the display device, the graphical representation indicating a social expression card status for the recipient occasion associated with the recipient name.

74. The computer system as recited in claim 73, further comprising a display device for graphically displaying at least the card recipient data and the social expression card data, the display device providing the user with the user interface through which the user selects the social expression cards to be delivered and manages the delivery of the social expression cards.

75. The computer system as recited in claim 74, wherein the display device is responsive to a user-selected filter to permit selective displaying of a portion of the social expression card data.

76. The computer system as recited in claim 74, wherein the display device displays at least a portion of at least the recipient data and the social expression card data according to a user-selected sorting algorithm to place the data in a predetermined ordered arrangement.

77. The computer system as recited in claim 73, further comprising a social expression card design means for permitting the user to create a social expression card design by creating social expression card data, the design means providing the computer system with the social expression card data for storage.

78. The computer system as recited in claim 73, further comprising a printing device located at a user location to print the social expression card.

79. The computer system as recited in claim 73, further comprising a printing device remotely located from a user location to print the social expression card.

80. The computer system as recited in claim 73, wherein the third display means for displaying the graphical representation of the envelope is an envelope icon configured to indicate at least one of status and a degree of urgency associated with the occasion.

81. A computer system for on-going management, selection, and delivery of social expression cards, the system comprising:

a) a memory configured to store at least card recipient data and social expression card data, in one or more databases;

b) a processor coupled to the memory programmed to link the card recipient data with the social expression card data thereby forming linked data to facilitate on-going management of social expression card selection and social expression card delivery;

c) a user interface coupled to the memory and to the processor, configured to permit a user to access at least a portion of the card recipient data and the social expression card data to permit the user to manage, select, and facilitate the delivery of the social expression card; and d) notifying means for notifying the user when an occasion for which a card is to be sent is approaching.

82. The computer system as recited in claim 81 wherein the user is notified by receiving an electronic message.

83. The computer system as recited in claim 81, wherein the processor is operatively coupled to a personal information device so that data transmitted by the personal information device is added to the card recipient data.

84. The computer system as recited in claim 83, wherein the personal information device is selected from the group of devices consisting of a personal information manager, a personal digital assistant, and an electronic list device.

85. The computer system as recited in claim 81, further including a list containing preselected portions of the card recipient data, the list representing a plurality of preselected recipients for whom cards are to be sent.

* * * * *